United States Patent [19]

Shimbo et al.

[11] Patent Number: 5,835,601
[45] Date of Patent: Nov. 10, 1998

[54] FILE EDITING SYSTEM AND SHARED FILE EDITING SYSTEM WITH FILE CONTENT SECRECY, FILE VERSION MANAGEMENT, AND ASYNCHRONOUS EDITING

[75] Inventors: Atsushi Shimbo, Chiba-ken; Toshinari Takahashi; Ichiro Tomoda, both of Tokyo; Masao Murota, Kanagawa-ken, all of Japan

[73] Assignee: Kabushiki Kaisha Toshiba, Kawasaki, Japan

[21] Appl. No.: 404,871

[22] Filed: Mar. 15, 1995

[30] Foreign Application Priority Data

Mar. 15, 1994 [JP] Japan .................................. 6-044456
Mar. 17, 1994 [JP] Japan .................................. 6-047381
Aug. 12, 1994 [JP] Japan .................................. 6-190696

[51] Int. Cl.[6] ............................. H04L 9/00; G06F 17/24
[52] U.S. Cl. ................................. 380/49; 380/3; 380/4; 707/203; 707/530
[58] Field of Search .................................. 380/49, 9, 29, 380/37, 42, 3, 4; 395/612, 617, 619, 761, 792; 707/100, 201, 203, 500, 530, 49

[56] References Cited

U.S. PATENT DOCUMENTS

| | | | |
|---|---|---|---|
| 4,912,637 | 3/1990 | Sheedy et al. | 707/203 |
| 5,185,887 | 2/1993 | Takahashi et al. | 395/619 |
| 5,278,979 | 1/1994 | Foster et al. | 395/619 |
| 5,357,631 | 10/1994 | Howell et al. | 395/619 |
| 5,418,945 | 5/1995 | Carter et al. | 707/8 |
| 5,548,648 | 8/1996 | Yorke-Smith | 380/49 |
| 5,574,906 | 11/1996 | Morris et al. | 707/1 |
| 5,596,718 | 1/1997 | Boebert et al. | 395/187.01 |
| 5,634,052 | 5/1997 | Morris | 707/1 |

FOREIGN PATENT DOCUMENTS

| | | | |
|---|---|---|---|
| 0 550 370 | 7/1993 | European Pat. Off. | G06F 9/46 |
| 94/01821 | 1/1994 | WIPO | G06F 12/14 |

OTHER PUBLICATIONS

T. Takahashi et al., "A Design of Privacy Enhanced File Sharing System", Proc. 49th Annual Convention IPS Japan, Sep. 20, 1994, pp. 1–283–284.

A. Shimbo et al., "Security Mechanism of Privacy Enhanced File Sharing System", Proc. 49th Annual Convention IPS Japan, Sep. 20, 1994, pp. 1–281–282.

T. Takahashi et al., "A Concept of Distributed File System for Asynchronous Shared Editing and its Application", Proc. 36th Programming Symposium, Jan. 10, 1995, pp. 1–8.

M. Blaze, "A Cryptographic File System or UNIX", Proceedings of 1st ACM Conference on Computer and Communications Security, AT&T Bell Laboratories, Nov. 1993.

UNIX Reference Manual, Sun Release 4.1, CVS(1).

A. Shimbo et al., "Security Mechanism of Privacy Enhanced Shared File System", Proc. SCIS 95, The 1995 Symposium on Cryptography and Information Security, IEICE Japan, Jan. 1995, pp. 1–10.

Ellis et al., "Groupware: Some Issues And Experiences", *Communications of the ACM*, vol. 34, No. 1, pp. 38–58, (1991).

*Primary Examiner*—Thomas H. Tarcza
*Assistant Examiner*—Pinchus M. Laufer
*Attorney, Agent, or Firm*—Foley & Lardner

[57] ABSTRACT

A file editing system that provides a high file content secrecy, a file version management, and an asynchronous editing is disclosed. For a high file content secrecy, the block data of files managed by a file management server device are enciphered in units of blocks, and a client device obtains the block data of the desired file in enciphered state, deciphers the obtained block data in units of blocks, carries out an editing of the desired file to obtain editing data, enciphers the editing data in units of blocks, and transmits the enciphered editing data to the file management server device. For asynchronous editing, the system includes a unit for generating editing procedure data that indicates a procedure to obtain the editing made in the desired version of the desired file by each client device, a unit for converting the editing procedure data for the desired version of the converted desired file into the editing procedure data for the latest version of the desired file, and a unit for generating record management information indicating a result of the converted editing made by each client device according to the converted editing procedure data for the latest version of the desired file.

15 Claims, 37 Drawing Sheets

FIG.6

VERSION V.2

| LINE 1 | 1 |
| LINE 2 | 2 |
| LINE 3 | 3 |
| LINE 4 | 4 |
| LINE 5 | 5 |
| LINE 6 | 6 |
| LINE 7 | 7 |
| LINE 8 | 8 |
| LINE 9 | 9 |
| LINE 10 | 10 |

EDITING PROCEDURE △ 1
- i 4
  Newly inserted from here.
  Can it be merged well ?
- d8、9

DIFFERENCE V.3-V.2
- d2、3
- i 5
  This is line 5 of v.2.

VERSION V.3

| LINE 1 |
| LINE 4 |
| This is line 5 of v.2. |
| LINE 5 |
| LINE 6 |
| LINE 7 |
| LINE 8 |
| LINE 9 |
| LINE 10 |

IN V.2
1 — 1
2 — 4
3 — –
4 — 5
5 — 6
6 — 7
7 — 8
8 — 9
9 — 10

CONVERSION

DIFFERENCE V.4-V.3
- d5、7
- i 8
  This part is changed this way as I didn't like it.

VERSION V.4

| LINE 1 |
| LINE 4 |
| This is line 5 of v.2. |
| LINE 5 |
| This part is changed this way as I didn't like it. |
| LINE 9 |
| LINE 10 |

IN V.3   IN V.2
1 — 1 — 1
2 — 2 — 4
3 — 3 — –
4 — – — 5
5 — – — –
6 — – — –
7 — 8 — 9
8 — 9 — 10

EDITING PROCEDURE △ 1'
- i2
  Newly inserted from here.
  Can it be merged well ?
- d7

DIFFERENCE V.5-V.4

VERSION V.5

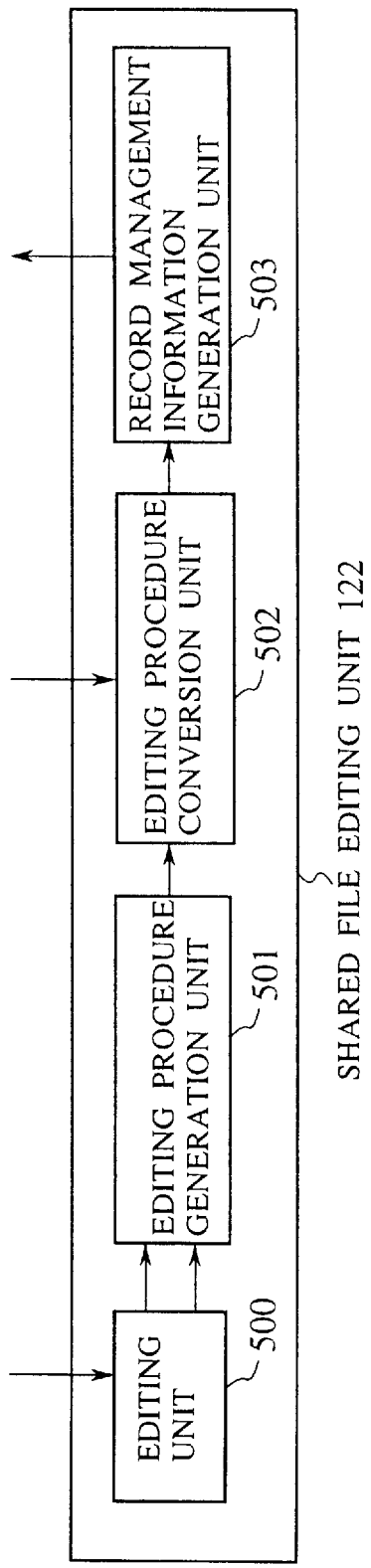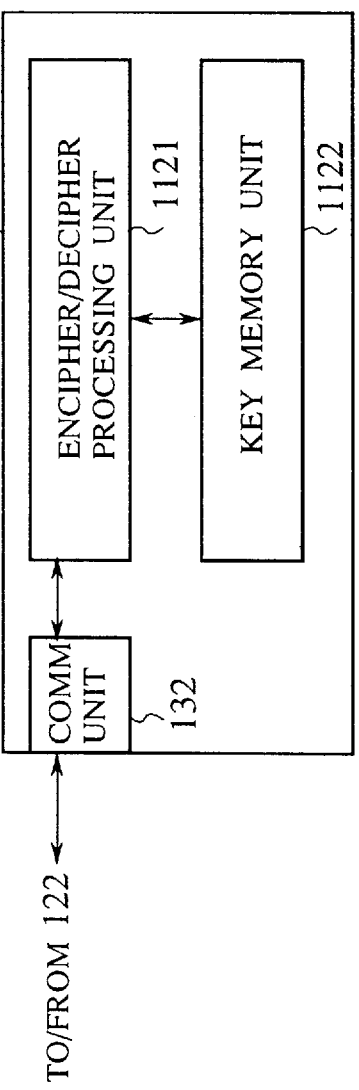

SHARED FILE EDITING UNIT 222

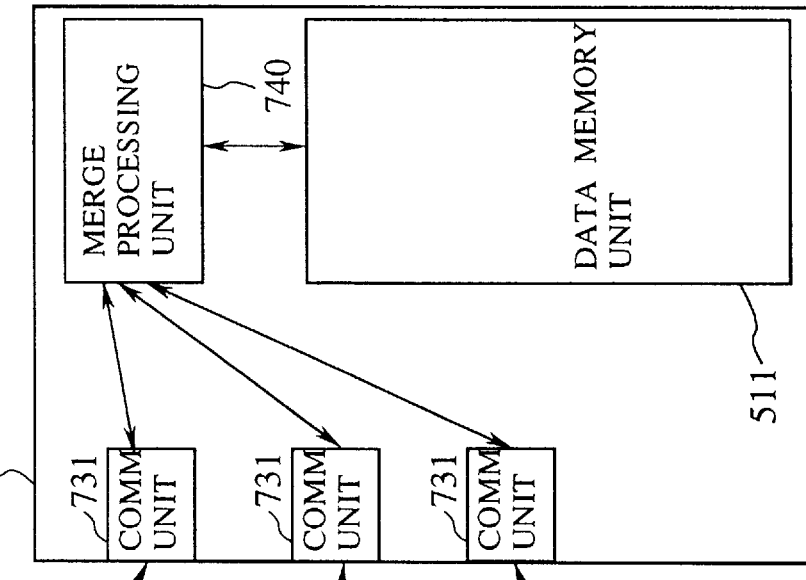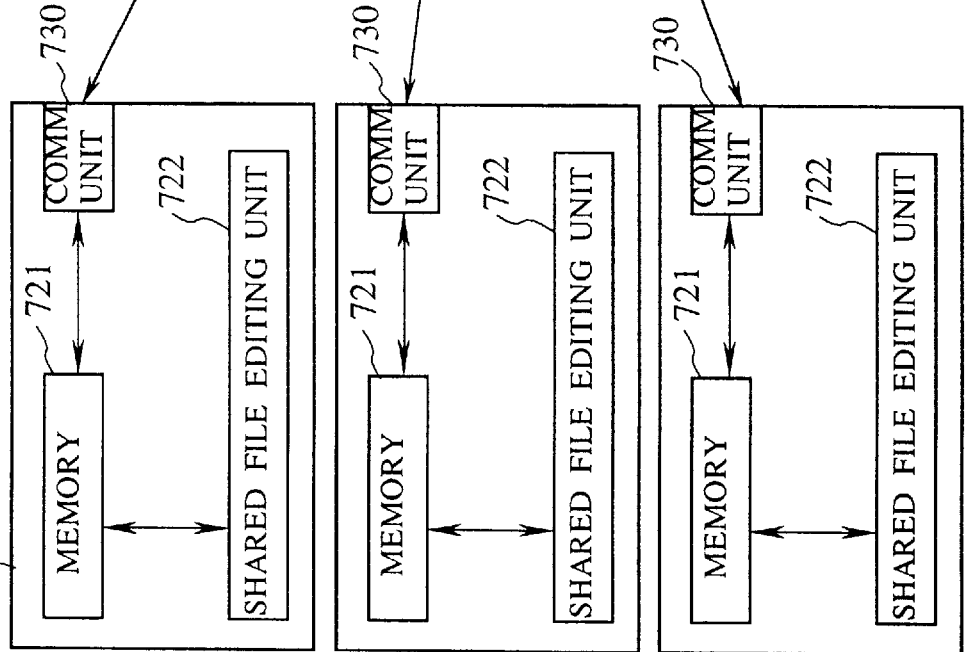
FIG.20

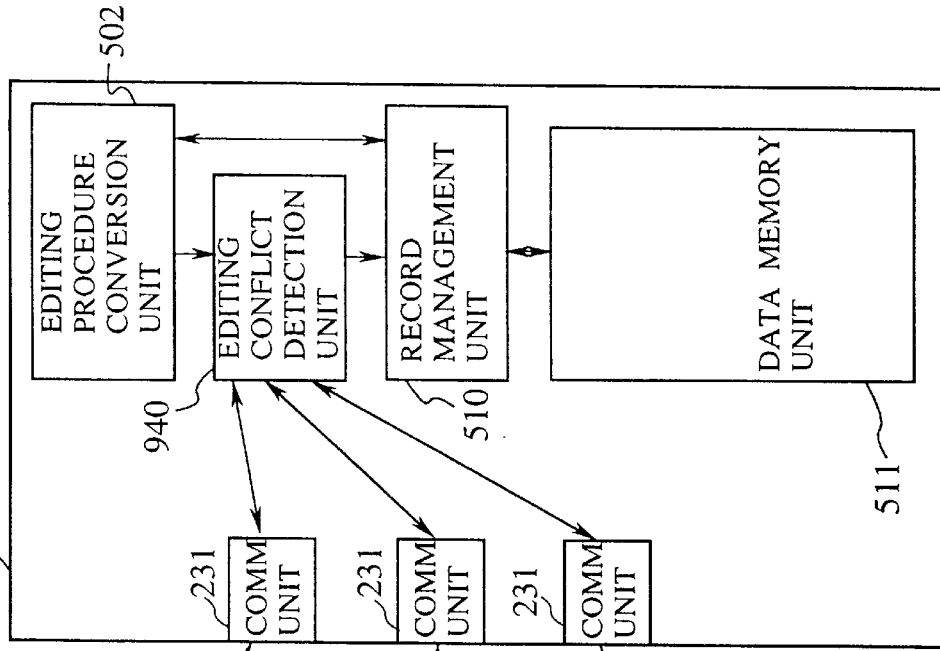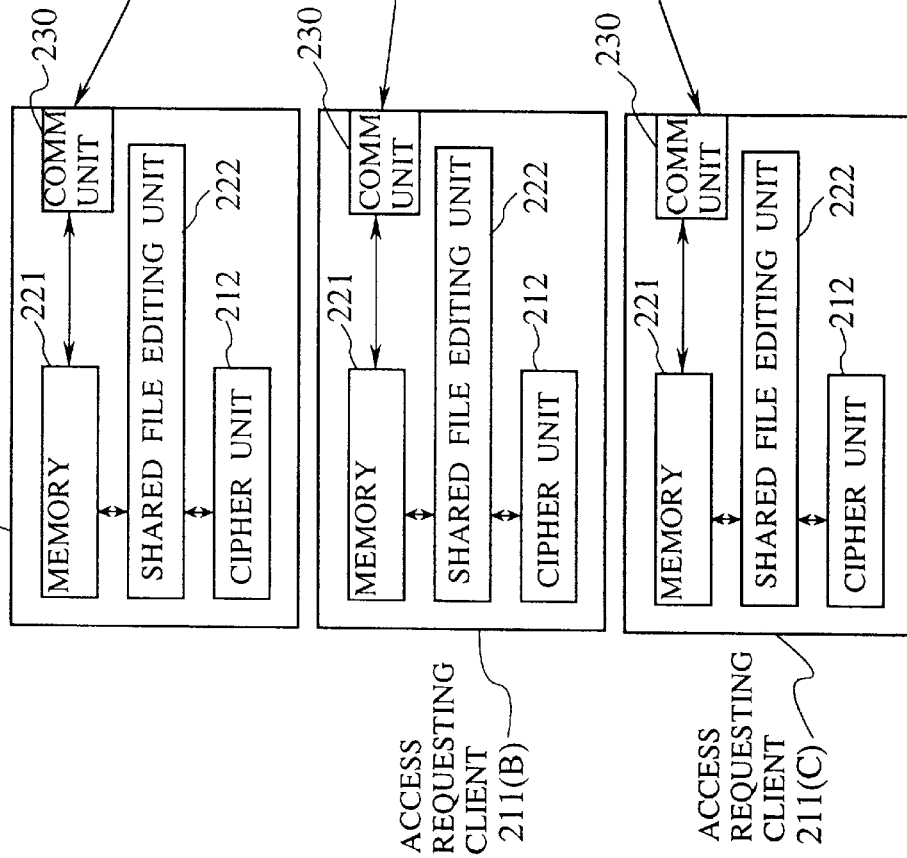
FIG.41

FIG.43

| FILE ID | MODE | OPEN TIME | CLOSE TIME | VERSION | CURRENT |
|---------|------|-----------|------------|---------|---------|
| ID1 | r | t1 |  | V10 | #70 |
| ID2 | w | t2 | t5 |  |  |
| ID3 | r | t3 |  | V13 | #30 |
| ID4 | w | t4 |  | V12 | #120 |

FILE EDITING SYSTEM AND SHARED FILE EDITING SYSTEM WITH FILE CONTENT SECRECY, FILE VERSION MANAGEMENT, AND ASYNCHRONOUS EDITING

BACKGROUND OF THE INVENTION

1. Field of the Invention

The present invention relates to a file editing system for realizing asynchronous editing of a shared file by a plurality of users and a file content reading protection in a computer based shared file system or database system.

2. Description of the Background Art

In a computer system, in order to manage the accesses from a plurality of users with respect to a resource within the system, it has been pointed out that it is necessary to provide an authentication mechanism for confirming whether a user issuing an access request is a proper user who has an access right with respect to that resource or not. In particular, under an environment of a large scale system in which an access from a remote user is permitted, such an authentication mechanism becomes very important. A representative conventional system for realizing such an authentication mechanism is the Kerberos.

A typical conventional system which requires such an authentication mechanism is the CSCW (Computer Supported Cooperative Work). The CSCW is a generic name for computer systems which assist the cooperative work of a plurality of users, and the shared file system is its most basic and typical example. In the shared file system, a plurality of users have access rights such as "read" and "write" with respect to the identical file, and the system can realize the editing work without causing any contradiction while allowing the accesses by these users with respect to the identical file simultaneously.

Conventionally, a general format for realizing such a shared file system has been the client server type in which the client as a subject which makes accesses to the files and the server which manages the files are separated, and the authentication system for carrying out the authentication of the accesses from the client is implemented therein. That is, the server authenticates the proper access right of the client, and if necessary, the server also carries out the enciphering of the data to be transmitted between the client, while the client authenticates the connected server. Conventionally known examples of such a shared file system include the Lotus Notes. There is also a system called CFS (Cryptographic File System) which is known as an example of a file system in which the enciphering of the file contents can be carried out by the client.

As this type of a shared file system becomes more wide ranging in its service, it can be expected that there arises a need for a service format in which only a file server is required at a certain site. Namely, it is a format in which the file management and the access management are provided, but the file contents cannot be read out at the server itself. However, this type of service cannot be realized by using the conventional security system because the conventional security system only protects the communication data and the file contents at the server are managed in forms of plain texts.

Also, in the conventional mechanism for realizing the simultaneous editing on the shared file, while one user is carrying out the editing which uses the writing with respect to a certain file, what the other users can do with respect to the same file is restricted to the reading at est. Thus, this is not a real simultaneous editing strictly speaking, and it is merely realizing a synchronous editing in which the synchronization is made by utilizing the locking mechanism so as to avoid the contradiction among the accesses from a plurality of users. Namely, while the first access requesting user makes an access, the locking mechanism is activated such that the file access request for writing from the other user is not permitted, and the other user is forced to suspend the file access temporarily, await for the release of the lock, and try the file access again after the lock is released.

In this regard, a more flexible system can be realized if it is possible to allow one user to carry out the editing which uses the writing with respect to a certain file even when the other user is carrying out the editing which uses the writing with respect to the same file. In the following, this type of operation will be referred as asynchronous editing in a sense that there is no need to make the synchronization among the accesses which are randomly generated by a plurality of users.

On the other hand, another technique related to the shared file system is the version management technique. The conventionally known version management schemes include the SCCS (Source Code Control System) and the RCS (Revision Control System). Such a version management scheme achieves the compression of the file size by maintaining only a difference between different versions instead of maintaining the files at a given moment entirely, in a circumstance such as that of a program development by a plurality of programmers. However, despite of its advantage regarding the reduced file size, its incorporation into the shared file system has been limited so far to a case of the synchronous editing using the locking mechanism.

SUMMARY OF THE INVENTION

It is therefore an object of the present invention to provide a file editing system capable of realizing a higher level of secrecy such that the file contents cannot be read from the file server.

It is another object of the present invention to provide a shared file editing system which supports the file version management, which is capable of realizing the asynchronous editing.

It is another object of the present invention to provide a shared file editing system which supports the file version management, which is capable of realizing the asynchronous editing while keeping the file contents secret from the file server.

The objects of the present invention are also achieved by providing a file editing system having a file management server device for managing files and a client device for editing the files. The client device includes an editor for editing a target version of a desired file and an editing procedure generation means that generates editing procedure data indicative of the editing to the target version of the desired file. The file management server includes an editing procedure conversion means that converts the editing procedure data to generate a converted editing procedure data that corresponds to a latest version of the desired file.

Other features and advantages of the present invention will become apparent from the following description taken in conjunction with the accompanying drawings.

BRIEF DESCRIPTION OF THE DRAWINGS

FIG. 6 is a diagram for explaining a manner of record management in the asynchronous editing system of FIG. 5 for a case of using the difference pile up scheme of FIG. 2.

FIG. 14 is a block diagram of a shared file editing unit in the system of FIG. 13.

FIG. 15 is a block diagram of a cipher unit in the system of FIG. 13.

FIG. 20 is a block diagram of the third embodiment of a shared file editing system according to the present invention.

FIG. 41 is a block diagram of the ninth embodiment of a shared file editing system according to the present invention.

FIG. 43 is a diagram of an exemplary access record list used by an access information memory unit in the system of FIG. 42.

DETAILED DESCRIPTION OF THE PREFERRED EMBODIMENTS

Now, the first embodiment of a shared file editing system according to the present invention will be described in detail.

This shared file editing system of the first embodiment incorporates two independently realizable features of the present invention. The first feature is directed to a provision for making it impossible to read out file contents from a file server in a shared file editing system which manages files in blocks, while the second feature concerns with a provision for making it possible to carry out the asynchronous editing operation in a shared file editing system which supports the file version management.

Figure 1:
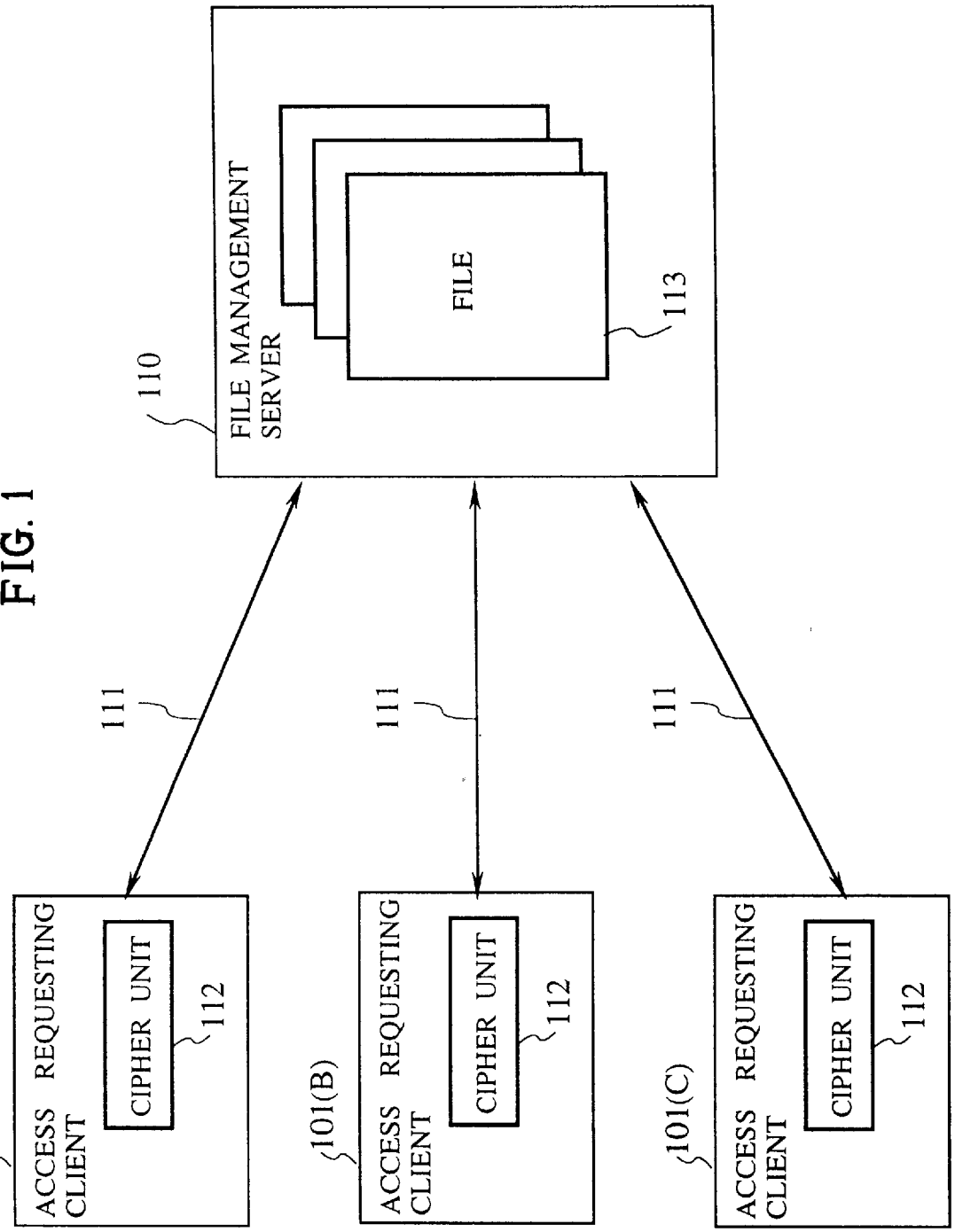
FIG. 1 is a schematic diagram of an overall configuration of the first embodiment of a shared file editing system according to the present invention.

In this First embodiment, the shared file editing system has a general configuration as shown in FIG. 1, which comprises one or a plurality of access requesting clients 101 (referred hereafter simply as clients) which issue file access requests with respect to shared files, and a file management server 110 (referred hereafter simply as a server) for carrying out the management of the files and the communication of requested data with respect to the clients 101. Here, between each client 101 and the server 110, there is provided a communication path 111 for transmitting and receiving request messages and response messages.

Here, the client 101 is an abstraction of a concept encompassing a user who issued the actual access request, a process on a computer used by that user, etc. Also, as shown in FIG. 1, each client 101 is equipped with a cipher unit 112 for carrying out the enciphering and deciphering operations. As will be described in detail below, this cipher unit 112 further includes an encipher/decipher processing unit for executing the cipher algorithm, and a key memory unit for storing a cipher key and a decipher key. Further details concerning functions of these encipher/decipher processing unit and the key memory unit will be described later on.

On the other hand, the server 110 may be a process on a computer for carrying out the file management, or an independent device having the file management function.

The communication path 111 can be any media which can exchange messages electronically, such as public network, LAN, Ethernet, or communication using sockets within a computer The server 110 is managing a plurality of files 113. Here, the files 113 contain not just data which represent the file contents, but also information for record management, a list of user names for whom the accesses are allowed, information utilized in encipher/decipher processing, etc. which will be described in detail later on. These files 113 are enciphered in a format which can be deciphered only by the respective proper clients 101.

In a case of utilizing a usual cipher scheme in which the cipher key and the decipher key are identical, the proper client 101 possesses that identical key, by means of which the files 113 can be enciphered or deciphered.

Now, the file 113 has a property that its content is changing from time to time as a result of the editing operations such as writing and deleting carried out at times of accesses, even though its file name itself remains unchanged. For this reason, there are cases in which it is necessary to store the file content of the file 113 at some selected timings, so as to be able to cope with a later request for reproducing a state of the file 113 at a desired one of the selected timings. This type of request is quite common in a case of the program development.

The most primitive scheme for realizing such a record management (version management) is to store the entire file content at each selected timing. However, the difference (discrepancy) between different versions is rather little in general, so that this primitive management scheme is wasteful in terms of file sizes. Consequently, a scheme such as the SCCS (Source Code Control System) and the RCS (Revision Control System) which only stores information on differences is usually employed.

In the following, the outline of the data structure in each record management scheme will be described.

Figure 2:
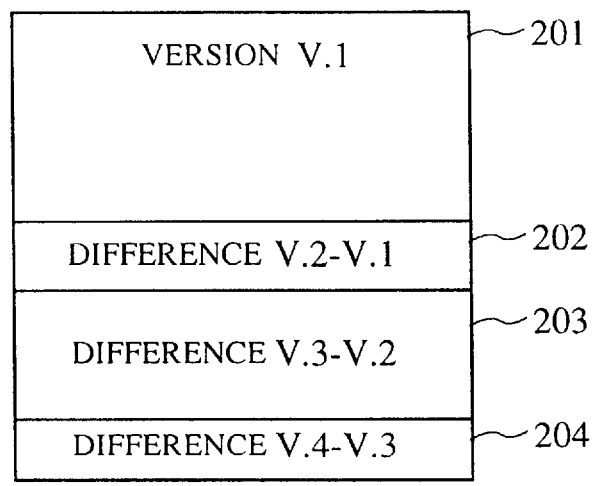
FIG. 2 is a diagram for explaining a file data structure in a difference pile up scheme that can be used in the system of FIG. 1 as a record management scheme.

First, a scheme that can be considered as a prototype of the RCS will be explained. Here, this scheme will be referred as a difference pile up scheme. A file data structure in this difference pile up scheme is shown in FIG. 2. In this scheme, the file in the first version at a time of its creation is stored in its entirety, and set as the version V. 1 (block 201). Next, when a new version V. 2 is created by deleting a part of the version V. 1 or inserting something to the version V. 1, a difference between the version V. 2 and the version V. 1 is obtained, and only the obtained difference V. 2–V. 1 (block 202) is stored. Here, the difference between versions is a set of data indicating facts such as "what is inserted where" and "from where to where is deleted" as provided by the "diff" command of the UNIX for example. A change affecting the entire file is rarely made, so that the size of the difference is usually smaller than the size of the entire file general. The data in such a stored state, i.e., the data for the version V. 1 and the data for the difference V. 2–V. 1, can provide sufficient information for restoring the version V. 2.

Subsequently, the difference between a new version after the editing and the latest stored version, such as the difference V. 3–V. 2 (block 203) between the versions V. 3 and V. 2, the difference V. 4–V. 3 (block 204) between the versions V. 4 and V. 3, etc. is obtained each time, and only the difference is additionally stored in a similar manner.

Consequently, in this difference pile up scheme, in order to restore the latest version (current version), it is necessary to utilize the records of all the versions complied up until then, but there is a significant improvement in terms of file sizes.

Figure 3:
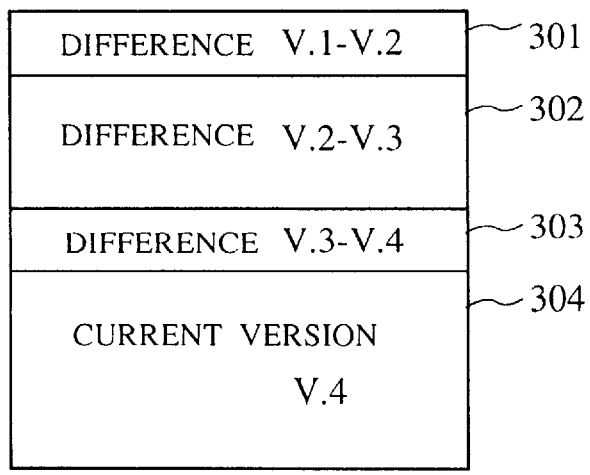
FIG. 3 is a diagram for explaining a file data structure in an RCS scheme that can be used in the system of FIG. 1 as a record management scheme.

Next, the RCS scheme will be explained. A file data structure for record management in this RCS scheme is shown in FIG. 3. In this RCS scheme, the records are managed as follows. First, the current version (block 304) is always stored in its entirety. In FIG. 3, a case in which the current version is version V. 4 is shown. Then, the version V. 3 which is immediately previous to the version V. 4 is stored in a format of the difference V. 3–V. 4 (block 303) with respect to the version V. 4. This scheme is characterized by taking the difference with reference to a timewise newer version in this manner. Thus, for the versions before the version V. 3, the difference V. 2–V. 3 (block 302) and the difference V. 1–V. 2 (block 301) are stored similarly. In this state, in a case of storing a new version V. 5, a processing for obtaining the difference V. 4–V. 5 and a processing for storing the obtained difference and the new version V. 5 will be executed.

When this data structure is utilized, there is an advantage that the current version can be taken out easily. On the other hand, a case of restoring the older version is going to require a longer time, but usually a newer version is going to be more frequently accessed, so that this scheme is in conformity with the general manner of usage.

Next, a scheme in which another representative record management scheme known as the SCCS scheme is modified will be explained. This is a version management scheme to memorize, in correspondence to each block data, information indicating in which version that block data has been inserted and information indicating in which version that block data has been deleted.

Figure 4:
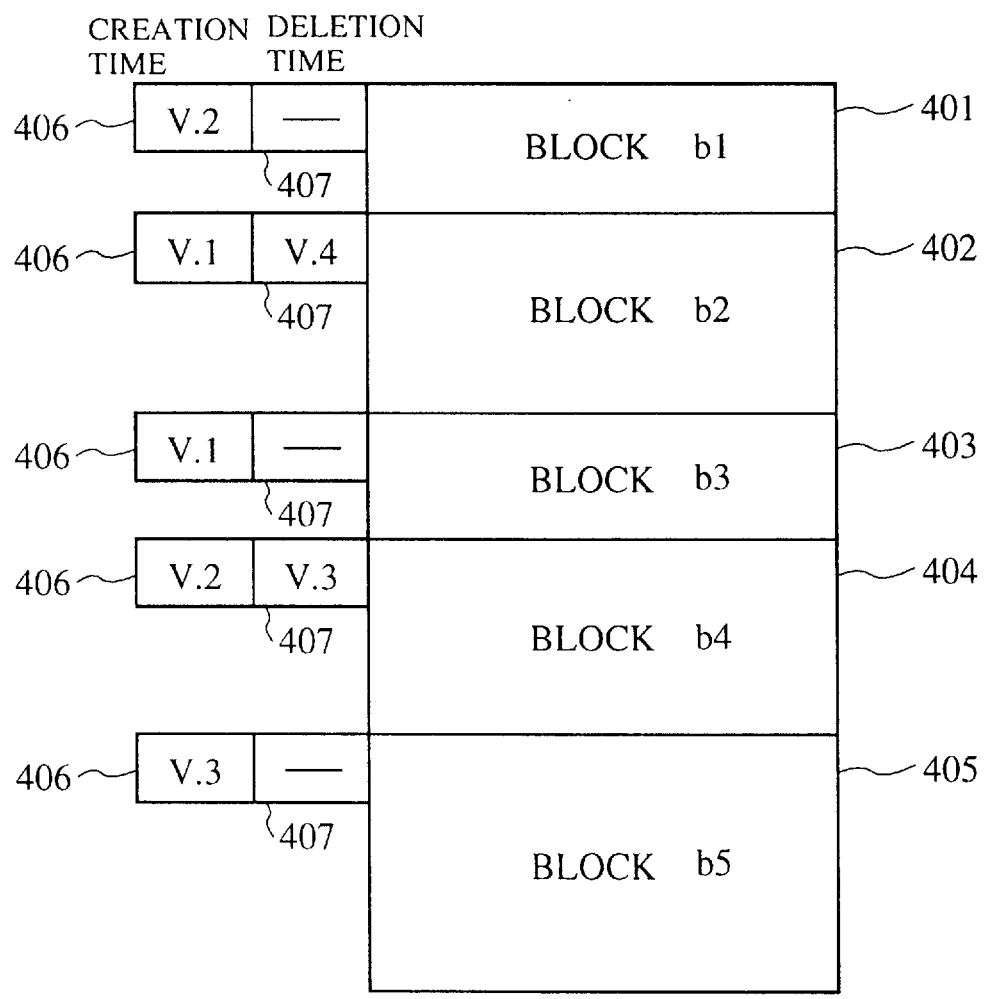
FIG. 4 is a diagram for explaining a file data structure in a modified SCCS scheme that can be used in the system of FIG. 1 as a record management scheme.

An exemplary file data structure for record management in this modified SCCS scheme is shown in FIG. 4. In the SCCS scheme, instead of storing the file data at a certain timing in its entirety, the file is managed in terms of blocks, and in a case of the insertion, a block of an inserted size from an inserted position is created. Here, each block is associated with two data fields 406 and 407, where a field 406 indicates a creation timing or a version number at a timing of the creation of each block (which serves as an example of information for identifying a creation timing of each block), and a field 407 indicates a deletion timing or a version number at a timing of the deletion of each block (which serves as an example of information for identifying a deletion timing of each block).

These two data fields 406 and 407 are just an example of a block identification information, which is information to be attached in order to facilitate the comprehension of a positioning of individual block. Even in the difference pile up scheme or the RCS scheme described above, the block identification information has been given in a form of a tag such as "difference V. X–V. Y" has been attached to the individual block. In other words, the block identification information is information indicating a relationship among blocks.

More specifically, as shown in FIG. 4, an exemplary file in this modified SCCS record management scheme comprises four different versions V. 1 to V. 4 for instance, and this file currently has five blocks including b1 (block 401), b2 (block 402), b3 (block 403), b4 (block 404), and b5 (block 405).

Then, by referring to the contents of the two data fields 406 and 407 described above, it is possible to see this file has been edited as follows.

First, in the version V. 1 (first version), this file comprised two blocks b2 and b3. Then, in the version V. 2, blocks b2 and b4 were added at a top and a bottom of the file, respectively, so that this file in the version V. 2 comprised four blocks b1, b2, b3, and b4. Next, in the version V. 3, a portion of the block b4 was changed and rewritten as the block b5. In this case, the block b4 is attached with a flag indicating that it was deleted in the version V. 3, and the record management to indicate that the block b5 was inserted is newly made immediately below the block b4. Consequently, this file in the version V. 3 comprised four blocks b1, b2, b3, and b5. Then, in the version V. 4 (current version), the block b2 was deleted so that the block b2 is attached with a flag indicating that it was deleted in the version V. 4 accordingly.

Consequently, this file in the version V. 4 comprises three blocks b1, b3, and b5. Note that, before the version V. 4, the blocks b2 and b3 have been a single block, but in the 20 version V. 4, a first half of that block corresponding to the block b2 was deleted.

As can be seen in the above example, in the modified SCCS record management scheme, the file in the current version does not exist as a continuous set, but any version can be taken out by connecting those blocks which had been created in that version or earlier versions and which had not been deleted by the time of that version, in an order from top to bottom, so that it is characterized by the fact that any version can be taken out without loading too much. Also, it can be seen that there is a tendency for blocks to be further divided as the version progresses. Thus, in this modified SCCS scheme, the record management can be realized easily as long as it is possible to specify the position of the block to be inserted and a range to be deleted together.

Now, in the shared file editing system of this first embodiment, the cipher technique is utilized in order to provide a protection for the reading of the file content. In this respect, the first feature of the present invention is characterized by that fact that it does not allow the server which is storing the file itself to read out file content, while the second feature of the present invention is characterized by the fact that it supports a plurality of subjects for carrying out the editing operation with respect to the file by realizing the asynchronous editing operation without using the exclusive actions such as locking as much as possible. Then, by combining the file data structure as described above with this cipher feature, it becomes possible to realize the shared file editing system in which the secrecy of the file content with respect to the server can be secured while the asynchronous editing operation by a plurality of subjects can be realized by utilizing the above described file data structure.

In the following, the feature concerning the asynchronous editing without using the locking will be described. In realizing the asynchronous editing, the following problem must be resolved. Namely, suppose that a certain client A has read out the file in the current version V. 4, and created a new version V. A by carrying out partial deletion and insertion with respect to the read out version, while almost at the same time, another client B has also read out the file in the current version V. 4 at that timing and created a new version V. B by carrying out partial deletion and insertion with respect to the read out version. Then, assume that the write-back of the editing made by the client A was executed before the write-back of the editing made by the client B. In such a case, the version V. A is going to be stored as a new version V. 5 and the necessary record management is going to be carried out, but then the write-back of the version V. B can give rise to a contradiction. That is, if the version V. B is stored as a still newer version V. 6, the latest version V. 6 is not going to reflect the changes made in the earlier version V. 5 . In order to prevent this problem, it is necessary for each new version to be always capable of merging all the changes that have been made up to then.

In order to realize this type of asynchronous editing, the shared file editing system of this first embodiment utilizes the record management as follows. Namely, the attention is paid to the fact that every editing action can be described as some combination of deletion and insertion, and this description can be determined uniquely as a difference with respect to the editing target version. With this fact in mind, one editing action E1 can be defined as a set $\Delta 1$ of editing procedures for inserting what to where and deleting from where to where with respect to the version V. 4, while another editing action E2 can be defined similarly as a set $\Delta 2$ of other editing procedures with respect to the same version V. 4.

Then, when the write-back of the editing action E1 is to be made first, the new version V. 5 is created by storing the editing procedures $\Delta 1$ as a difference with respect to the editing target version V. 4 in a format suitable for the record management scheme. Then, when the write-back of the editing action E2 is to be made, the editing procedures $\Delta 2$ which specify a difference with respect to the editing target version V. 4 are converted into converted editing procedures $\Delta 2'$ which specify a difference with respect to the latest version V. 5, and the new version V. 6 is created by storing converted editing procedures $\Delta 2'$ as a difference with respect to the previous version V. 5 in a format suitable for the record management scheme. By repeating this operation, it is possible to realize the asynchronous editing without any contradiction.

Here, what is important is to convert the editing procedures which are originally not defined as a difference with respect to the current version into a difference with respect to the current version without any contradiction. This mechanism can also be utilized to support an operation for carrying out the editing with respect to much older version, and merging the result of that editing with the current version.

Now, a configuration of an asynchronous editing system for realizing the above described operation will be described with reference to FIG. 5. In this FIG. 5, the asynchronous editing system comprises an editing unit 500, an editing procedure generation unit 501, an editing procedure conversion unit 502, a record management information generation unit 503, a record management unit 510, and a data memory unit 511. Note that this asynchronous editing system is to be distributed over the server 110 and the client 101 as described in the second embodiment, and a manner of distributedly arranging the elements of this system is to be set according to whether or not to utilize the ciphering of the file, although the editing unit 500 will be implemented on the client 101 and the data memory unit will be implemented on the server 110 in any case.

The editing unit 500 carries out the editing with respect to the file content in the editing target version obtained from the record management unit 510.

The editing procedure generation unit 501 receives the file content in the editing target version and the file content resulting from the editing carried out with respect to that file by the editing unit 500, and generates editing procedure data including insertion data, insertion positions, deletion start positions, and deletion end positions, which indicate "what is inserted where" and "from where to where is deleted".

The editing procedure conversion unit 502 receives these editing procedure data and record data described below, and generates the editing procedure data converted into the editing procedures with respect to the current version. For example, for given editing procedure data, the insertion data are left unchanged, while the insertion positions are converted into corresponding positions with respect to the current version, and the deletion start positions and the deletion end positions are similarly converted into corresponding positions with respect to the current version. In this conversion operation, the record data supplied from the record management unit 510 are utilized as necessary supplementary input.

The record management unit 510 carries out the management of the record data stored as an updating record of the editing target file. The editing procedure data outputted from the editing procedure conversion unit 502 are entered into the record management information generation unit 503 and converted into the record data in a format suitable for the record management scheme used by this record management information generation unit 503, and these record data are sent to the record management unit 510, so as to carry out the updating of the latest version.

The data memory unit 511 stores the file contents of a plurality of files.

Next, the operation of each element in this asynchronous editing system shown in FIG. 5 will be described for specific record management schemes. In any case, the editing procedure generation unit 501 carries out the operation corresponding to the "diff" command of the UNIX. Namely, the editing procedure generation unit 501 compares the file data in the editing target version and the file data after the editing, and outputs the editing procedure data such as "what is inserted where" and "from where to where is deleted".

First, a case of using the difference pile up scheme of FIG. 2 described above as the record management scheme will be described with reference to an exemplary situation depicted in FIG. 6.

In this example, the editing target version is the version V. 2 and the current version is the version V. 4. Then, it is assumed that the output $\Delta 1$ of the editing procedure generation unit 501 is as follows.

* i4
  Newly inserted from here.
  Can it be merged well?
* d8, 9

This output indicates that, with respect to the version V. 2, two lines ("Newly inserted from here." and "Can it be merged well?") are inserted at the line 4, and two lines from the line 8 to the line 9 are deleted.

The editing procedure conversion unit 502 functions to convert the above described editing procedure $\Delta 1$ into the editing procedure $\Delta 1'$ with respect to the current version V. 4. In this conversion, the record data from the record management unit 510 indicating the past records of editing made from the version V. 2 to the current version V. 4 are necessary.

As an example, suppose that the version V. 3 deleted the line 2 and the line 3 of the version V. 2 and inserted one line ("This is line 5 of V. 2.") at the line 5 of the version V. 2, while the version V. 4 deleted the line 5 to the line 7 of the version V. 3 and inserted two lines ("This part is changed this // way as I didn't like it." where // indicates the line change) at the line 8 of the version V. 3 . In this case, for the insertion position in the editing procedure $\Delta 1$, it is necessary to determine which line of the current version V. 4 does the line 4 of the version V. 2 corresponds to. To this end, the difference between versions V. 3 and V. 2 and the difference between versions V. 4 and V. 3 contain all the necessary information, and it can be recognized that the line 2 of the version V. 4 corresponds to the line 4 of the version V. 2, so that "insert two lines at the line 4 of the version V. 2" is converted into "insert two lines at the line 2 of the version V. 4" accordingly. Similarly, for the deletion, when the lines of the version V. 4 corresponding to the lines 8 and 9 of the version V. 2 are checked according to the record data, it can be recognized that the line 9 of the version V. 2 corresponds to the line 7 of the version V. 4 but the line 8 of the version V. 2 had already been deleted in the version V. 4. The deletion of a portion which had already been deleted normally does not make sense, so that "delete the line 8 to the line 9 of the version V. 2" is converted into "delete the line 7 of the version V. 4" in this case. The editing procedure conversion unit 502 carries out the conversion of the editing procedures (mainly comprising the search of the changed positions) as described above. Thus, the record data are indispensable in this editing procedure conversion unit 502.

The record management information generation unit 503 obtains the difference between the current version V. 4 and the new version according to the editing procedure data $\Delta 1'$ so obtained and entered thereto. Here, as the difference pile up scheme is used as the record management scheme, the above mentioned "insert two lines at the line 2 of the version V. 4" and "delete the line 7 of the version V. 4" are turned into the record data as they are, and these record data are sent to the record management unit 510 and added to the stored record.

Next, a case of using the modified SCCS scheme of FIG. 4 described above as the record management scheme will be described with reference to an exemplary situation depicted in FIG. 7. In this case, the operation for searching the changed positions at the editing procedure conversion unit 502 can be simplified as follows.

Figure 7:
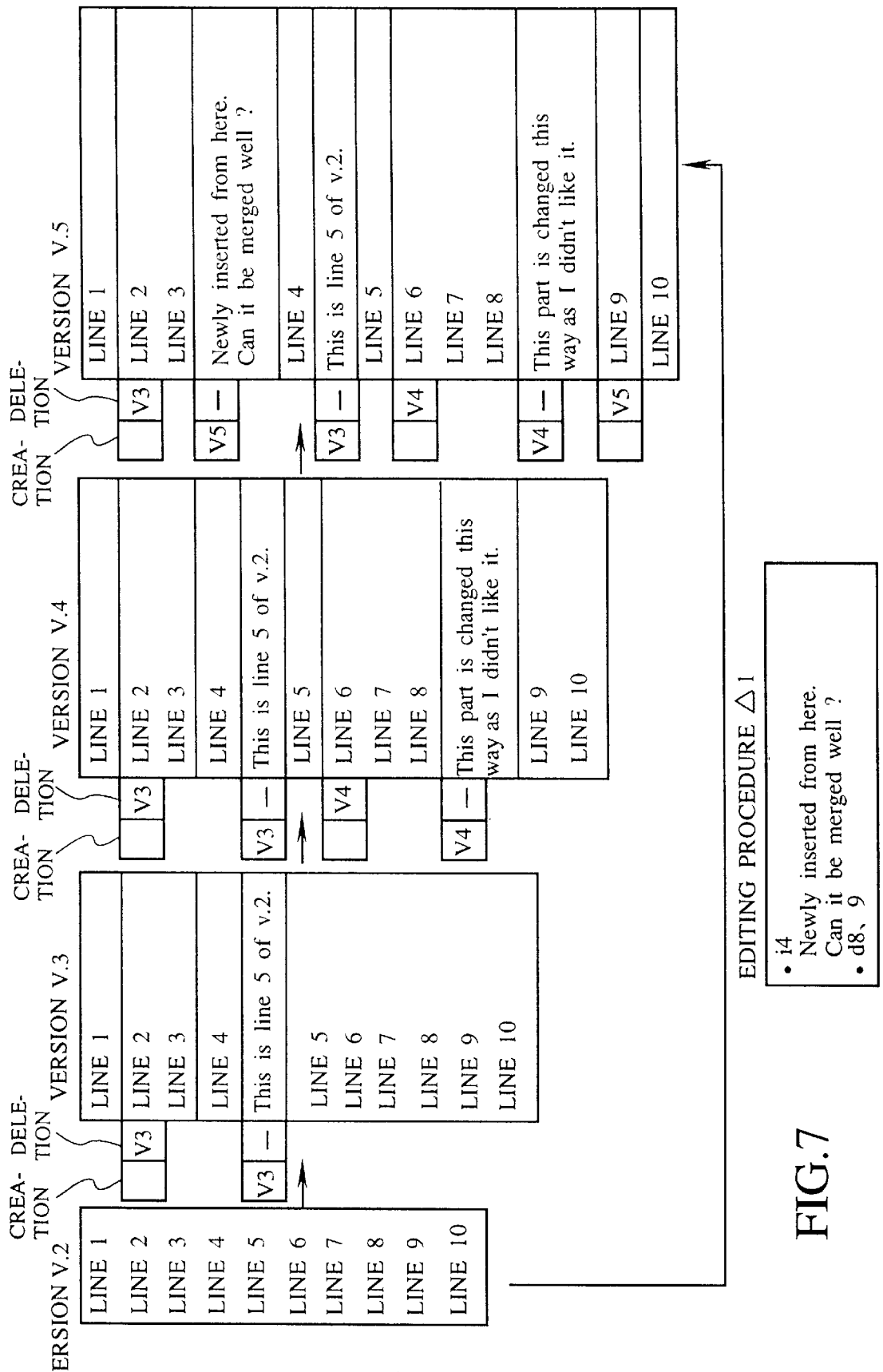
FIG. 7 is a diagram for explaining a manner of record management in the asynchronous editing system of FIG. 5 for a case of using the modified SCCS scheme of FIG. 4.

Namely, suppose that the version V. 2 had 10 lines as depicted in FIG. 7. Then, first, as the line 2 and the line 3 of the version V. 2 are deleted in the version V. 3, the portion of these lines 2 and 3 becomes one block with the deletion time flag indicating "V. 3". Also, as one line is inserted between the line 4 and the line 5 of the version V. 2, the line 4 of the version V. 2 becomes one block, while one line inserted in the version V. 3 becomes another block with the creation time flag indicating "V. 3".

Next, as the line 5 to the line 7 of the version V. 3 are deleted in the version V. 4, the line 5 to the line 7 in the version V. 3 by counting only those lines which are not deleted at a time of the version V. 3 from top becomes one block with the deletion time flag indicating "V. 4". Also, as two lines are inserted between the line 7 and the line 8 of the version V. 3, these two inserted lines forms one block with the creation time flag indicating "V. 4".

The editing procedure Δ1 outputted from the editing procedure generation unit 501 is similar to that described above, but the record data supplied from the record management unit 510 to the editing procedure conversion unit 502 are given in a form of the version V. 4 in FIG. 7. Then, at the editing procedure conversion unit 502, in order to determine the line 4 (insertion position), the line 8 (deletion start position), and the line 9 (deletion end position) at a time of the version V. 2, the fourth, eighth, and ninth lines from the top in the version V. 2 are figured out. Here, the point is to skip those portions which are inserted after the version V. 2.

To the insertion position so determined, the two newly inserted lines ("Newly inserted from there. // Can it be merged well?") are inserted as one block. In addition, as for the deletion, nothing is done for the line 8 of the version V. 2 as the deletion time flag is already set up for it, while the line 9 is divided as one block with the deletion time flag indicating "V. 5". The version V. 5 produced in this manner is then sent to the record management unit 510 so as to update the stored record data.

The record management information generation unit 503 accounts for the operation up to the updating at the record management unit 510 in the above described sequence.

As described, when a scheme such as the modified SCCS scheme is utilized as the record management scheme, the search of the changed positions can be achieved by the simple counting from the top, so that the necessary operation can be simplified considerably.

Figure 5:
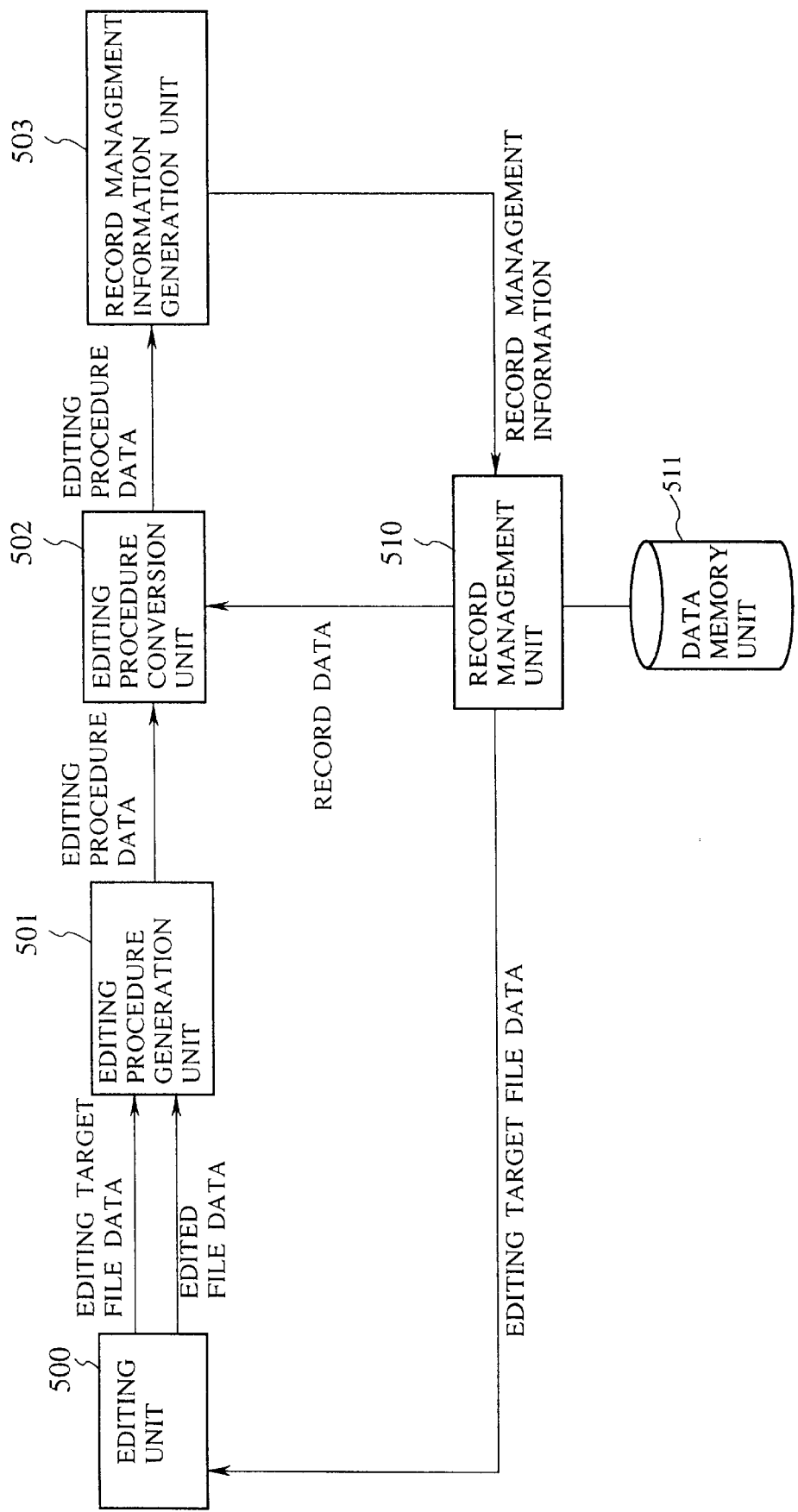
FIG. 5 is a block diagram of an asynchronous editing system to be incorporated into the system of FIG. 1.

Thus, in this first embodiment, it is possible to utilize the data structure of FIG. 4 for the modified SCCS scheme as the record management scheme, while realizing the asynchronous editing according to the configuration of FIG. 5 at the same time.

Now, another feature of this first embodiment concerning a cipher scheme for the file data will be described in detail.

The cipher scheme in this first embodiment is characterized by the fact that the file is enciphered/deciphered in units of data blocks produced in a course of the record management as described above, block by block, and that the file structure which enables the server to comprehend which data block corresponds to which portion of the file is adopted.

More specifically, as an example of such a file structure, in a case of using the difference pile up scheme of FIG. 2 as the record management scheme, each of the blocks 201, 202, 203, and 204 is enciphered independently and given in a form by which the server can recognize the correspondence relationship such as "a block 201 is the enciphered data of the first version V. 1", "a block 202 is the enciphered data of the difference V. 2-V. 1 between the version V. 2 and the version V. 1", etc. As a concrete example, it is possible to provide a flag field for the server management to each block to be enciphered, and enter an appropriate information such as V. 1 or V. 2-V. 1 therein, Such information to be utilized by the server to identify each data block will be referred as the block identification information. The flag field for the server management mentioned above, and the data fields 406 and 407 for the creation time and the deletion time in FIG. 4 described above are examples of this block identification information.

As another example of the file structure, in a case of using the RCS scheme of FIG. 3 as the record management scheme, each of the blocks 301, 302, 303, and 304 is enciphered independently, and given in a form by which the server can recognize the correspondence relationship such as "a block 301 is the enciphered data of the difference V. 1-V. 2", "a block 302 is the enciphered data of the difference V. 2-V. 3", etc.

As still another example of this file structure, in a case of using the modified SCCS scheme of FIG. 4 as the record management scheme, each of the blocks 401, 402, 403, and 404 is enciphered independently, and given in a form by which the server can recognize the correspondence relationship such as "a block 401 is a top block, a block 402 is a next-to-top block", etc. Here, it suffices to simply connect blocks such that the partitions among the block become apparent. Each block in FIG. 4 has two data fields 406 and 407 for the creation time and deletion time in correspondence as mentioned above, but these data fields are not to be enciphered.

This manner of enciphering each block independently has an advantage that the amount of processing required in the client and the amount of communication between the client and the server. Namely, when the client makes a request for the current version to the server in the record management system of FIG. 3, it suffices for the server to transmit the enciphered block 304 alone. In contrast, if the entire data file of FIG. 3 is enciphered together. It would be necessary for the server to transmit the entire enciphered data, and in addition, it would also be necessary for the client who received this transmitted data to decipher all the blocks 301 to 304 which are enciphered together, so that many otherwise unnecessary processings would become necessary.

Also, in the record management scheme of FIG. 2, only change that can be made by the client side as a result of a new editing action is an addition of an enciphered block for the difference V. 5-V. 4. In such a case, if the entire file is enciphered together, it would be particularly difficult to verify that a portion near the partition with respect to the difference V. 4-V. 3 has not been changed. Namely, the enciphering is usually made from a top of the file in a form of a chain of certain lengths dividing the file, so that it is possible for the server to conjecture the occurrence of an action to change a portion other than that near the end of the file from the cipher text, but such a detection of a change cannot be made at a portion near the end of the file (i.e., a portion near the newly added difference). In contrast, when the enciphering in units of blocks as described above is adopted for the data structure of FIG. 2, it suffices to sequentially add the enciphered data for a new difference, so that the server can easily carry out the management to prevent the change of the records.

In view of realizing the asynchronous editing without locking described above, it is particularly suitable to use the record management scheme using the data structure of FIG. 4 even from a point of view of the simplification of the merge processing. However, this type of record management scheme has a characteristic that the block which had been a single entity at one time is going to be subdivided sequentially at subsequent times. In general, in conjunction with the division of a block, there arises a need to re-encipher the block data, and for this reason, this first embodiment employs the cipher scheme capable of reducing the encipher/decipher processing, which will now be explained in detail.

The data within each block can be considered as given by bits or bytes as minimum units, and in the first cipher scheme for this first embodiment described below, in a case of dividing one block at several positions (point-1, point-2, and so on, in an order from the top of the block), it is unnecessary to re-encipher the enciphered data from the top of the block to the point-1 and the already enciphered data can be utilized as they are, so that only the data after the point-1 need to be re-enciphered.

Moreover, in the second cipher scheme for this first embodiment described below, there is absolutely no need to re-encipher any data and the already enciphered data can be utilized as they are.

Figure 8:
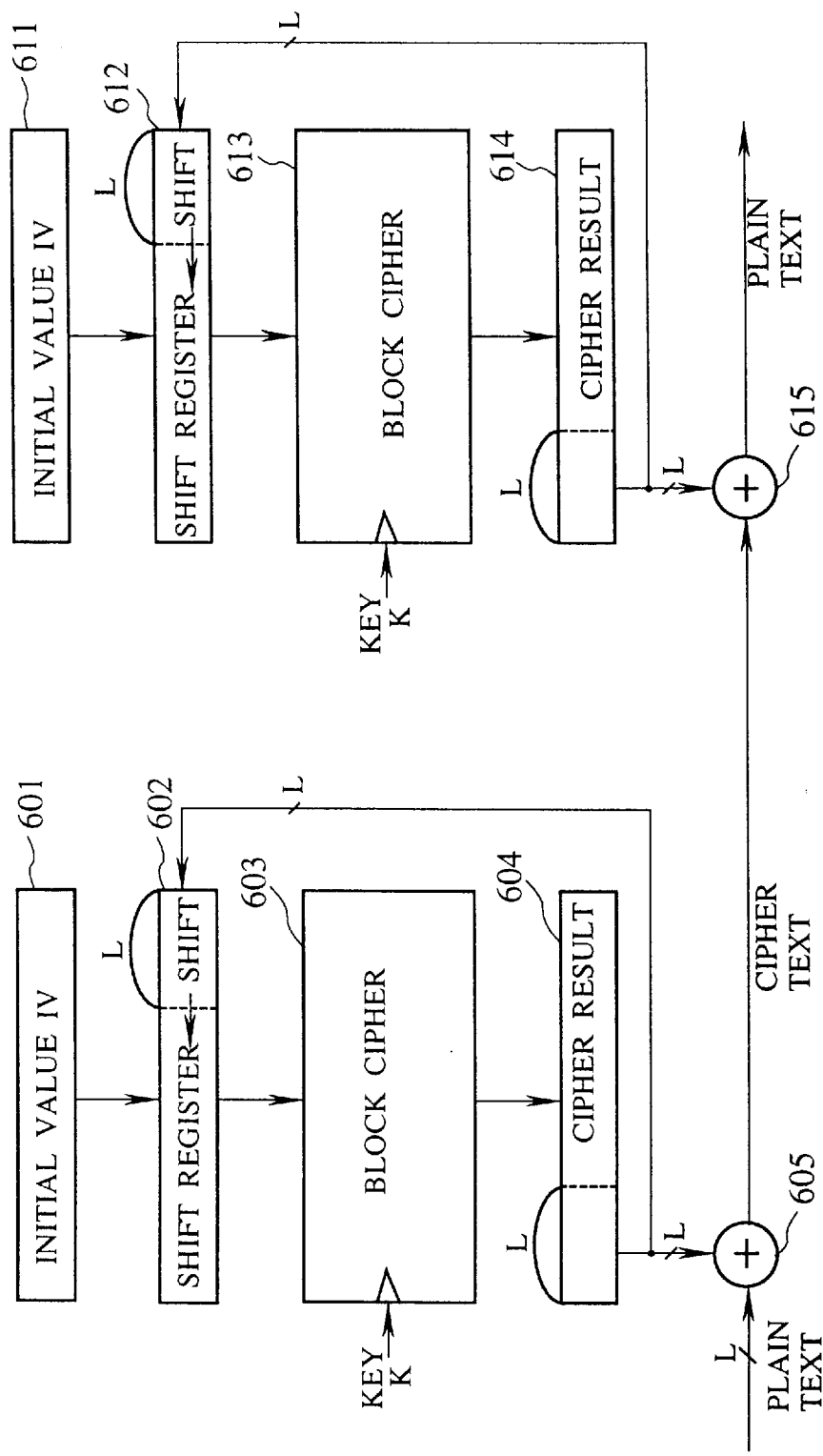
FIG. 8 is a diagram for explaining an OFB mode stream cipher scheme that can be used in the system of FIG. 1 as a file data cipher scheme.
Figure 9:
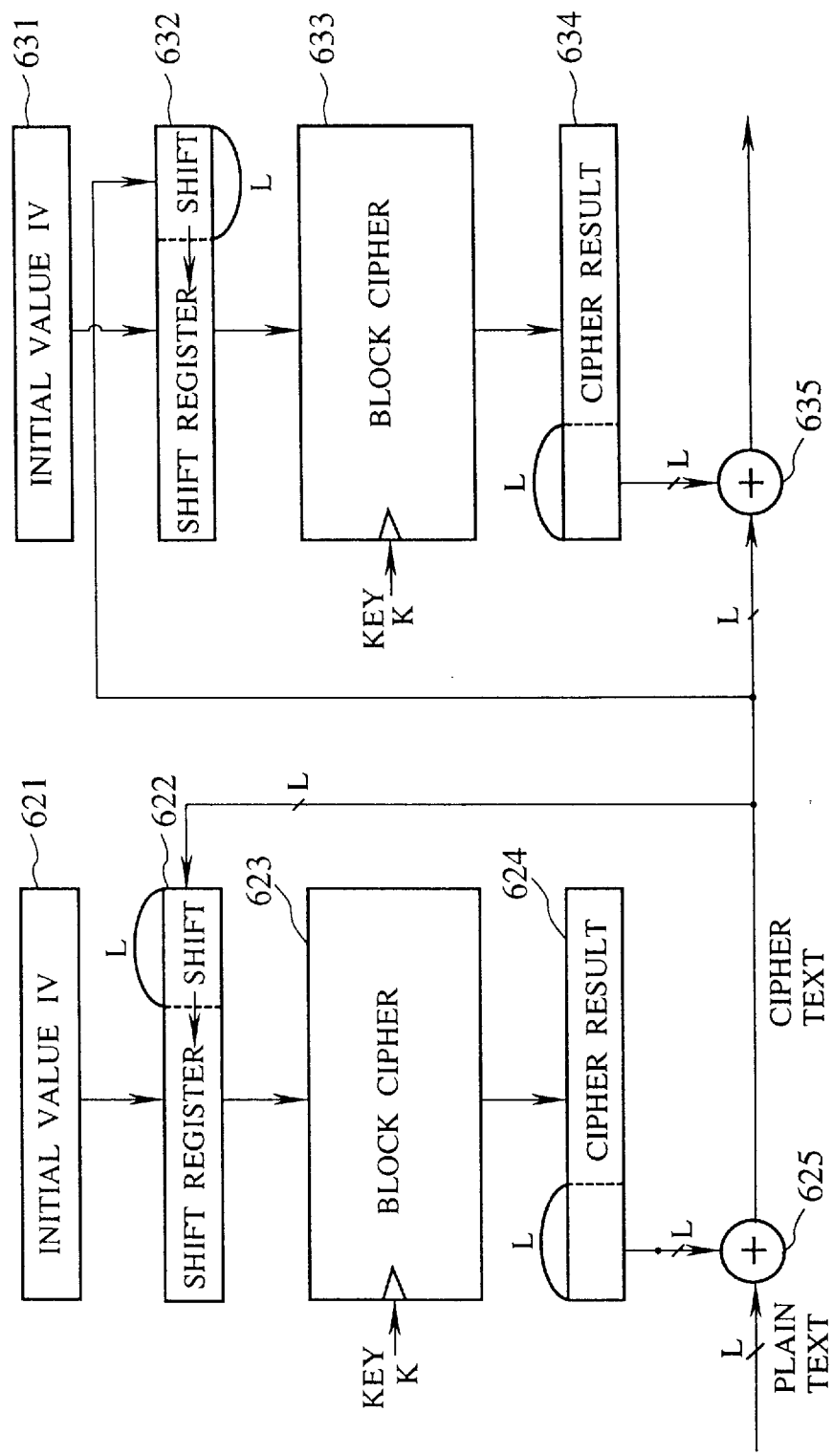
FIG. 9 is a diagram for explaining a CFB mode stream cipher scheme that can be used in the system of FIG. 1 as a file data cipher scheme.

In order to make such a re-utilization of the already enciphered data possible, the cipher scheme is required to satisfy the following condition. Namely, in a case the cipher block is divided at an arbitrary point, it must be possible to obtain the corresponding plain text from a fragment of that divided cipher block. Consequently, it is necessary to have a particular bit (or byte) of the plain text to be in correspondence to a particular bit (or byte) of the cipher text. As a natural consequence of that, there should not be a size increase due to the enciphering. As a cipher scheme with such a property, a scheme called stream cipher scheme is known, and a representative example of this scheme, there is a scheme for using the block cipher DES (Data Encryption Standard) in either the OFB (Output FeedBack) mode or the CFB (Cipher FeedBack) mode. The cipher procedure in the OFB mode is shown in FIG. 8, while the cipher procedure in the CFB mode is shown in FIG. 9.

First, with reference to FIG. 8, the operation principle in the OFB mode will be described. In this case, the transmitting side and the receiving side share a key K for the block cipher devices 603 and 613 and an initial value IV for shift registers 602 and 612 to be set in initial value registers 601 and 611.

At a time of enciphering, the transmitting side enciphers a content of the shift register 602 by the block cipher device 603, and L bits of the obtained cipher result in the cipher result register 604 are fed back to the shift register 602 while also subjected to the exclusive OR operation with respect to L bits of the plain text at the XOR circuit 605. By repeating this processing, the plain text is enciphered in units of L bits. Here, even though an amount which is enciphered by one processing is L bits, the enciphering is actually made bit by bit.

Similarly, at a time of deciphering, the receiving side deciphers a content of the shift register 612 by the block cipher device 613, and L bits of the obtained cipher result in the cipher result register 614 are fed back to the shift register 612 while also subjected to the exclusive OR operation with respect to L bits of the cipher text at the XOR circuit 615. By repeating this processing, the cipher text is deciphered in units of L bits. Again, even though an amount which is deciphered by one processing is L bits, the deciphering is actually made bit by bit.

First, with reference to FIG. 9, the operation principle in the CFB mode will be described. In this case, the transmitting side and the receiving side share a key K for the block cipher devices 623 and 633 and an initial value IV for shift registers 622 and 632 to be set in initial value registers 621 and 631.

At a time of enciphering, the transmitting side enciphers a content of the shift register 622 by the block cipher device 623, and L bits of the obtained cipher result in the cipher result register 624 are subjected to the exclusive OR operation with respect to L bits of the plain text at the XOR circuit 625, while L bits of the cipher text obtained by the XOR circuit 625 are fed back to the shift register 622.

Similarly, at a time of deciphering, the receiving side deciphers a content of the shift register 632 by the block cipher device 633, and L bits of the obtained cipher result in the cipher result register 634 are subjected to the exclusive OR operation with respect to L bits of the cipher text at the XOR circuit 635, while L bits of the received cipher text are fed back to the shift register 632.

Thus, this case of CFB mode differs from the above described case of OFB mode only in that the data fed back to the shift register at a time of enciphering/deciphering are set to be the cipher text rather than the output of the block cipher device, in the transmitting side as well as in the receiving side.

These modes are called L bit OFB mode or L bit CFB mode, using a number of bits utilized in one encipher/decipher processing (which coincides with a number of bits to be fed back to the shift register), which are representative examples of the stream cipher in bit unit. Similarly, the representative examples of the stream cipher in byte unit include 8 bit OFB mode and 8 bit CFB mode. In these modes, instead of enciphering/deciphering by taking the exclusive OR of 8 bits of the plain text and 8 bits of the cipher device output bit by bit, it is also possible to modify them to use the enciphering/deciphering by addition/subtraction of 8 bits, for example.

In the following, it is assumed that the minimum units of the data within each block are bytes.

In order to guarantee the strength of the cipher text using the stream cipher as described above, when the key K is fixed, it is preferable to change the initial value IV of the shift register for each plain text. Otherwise, the cipher text has weak points in that the exclusive OR of two plain texts can be obtained by taking the exclusive OR of the same position in two cipher texts, and that the two plain texts can be recognized as the same when two corresponding cipher texts have the identical top portion. For this reason, in this first embodiment, the initial value IV of the shift register is to be changed for each block to be enciphered/deciphered.

Figure 10:
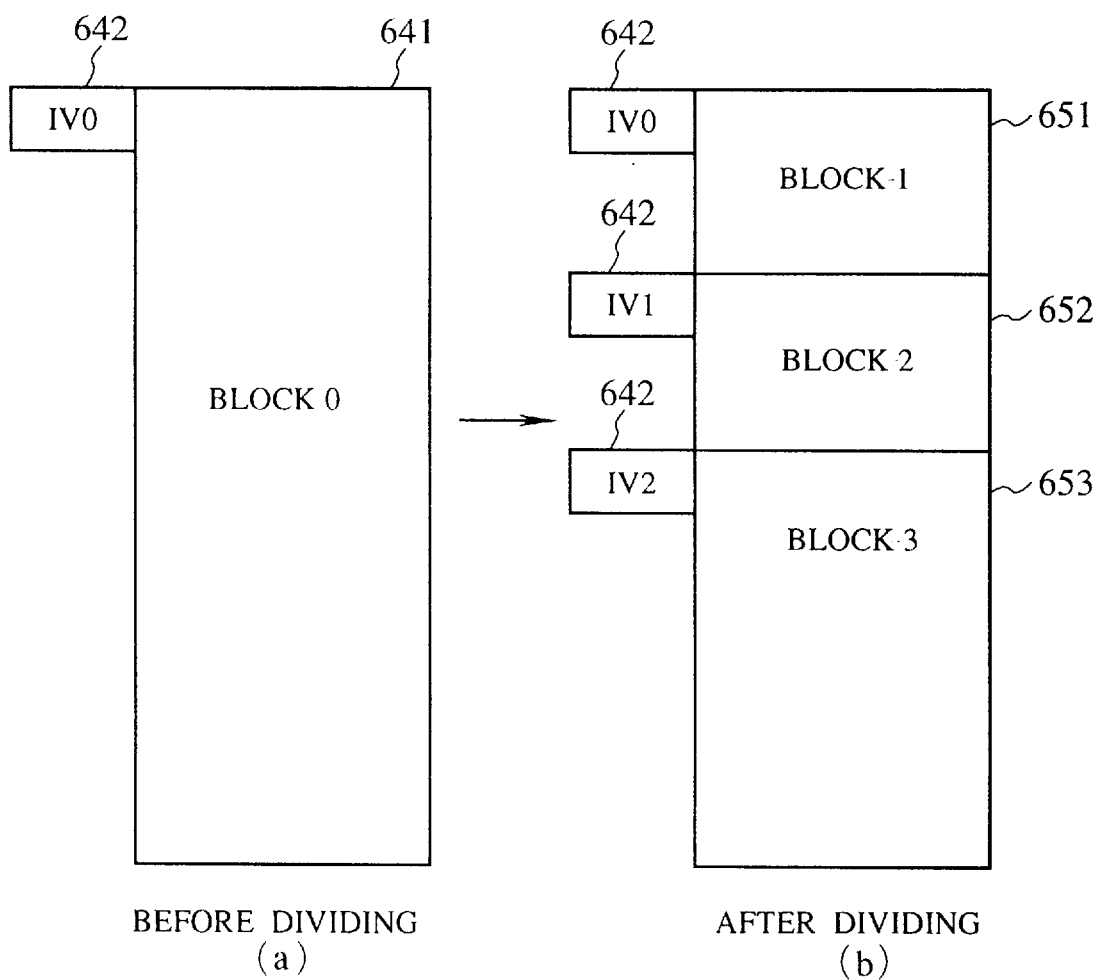
FIG. 10 is a diagram for explaining a cipher procedure in the system of FIG. 1 at a time of block data division.

Now, the cipher procedure at a time of the block data division using the cipher scheme of this first embodiment will be described with reference to FIG. 10. In this FIG. 10, a left side of an arrow indicates the data structure before the block data division, and the right side of an arrow indicates the data structure after the block data division. Here, FIG. 10 depicts an exemplary case in which a middle portion of a certain cipher block (block-0) is deleted, in which case this block is re-enciphered as three blocks for the top portion (block-1), the middle portion (block-2), and the bottom portion (block-3). For each block, there is provided a region 642 for storing the initial value data IV (IV0 to IV2). However, this initial value data IV is not to be enciphered.

In the first cipher scheme of this first embodiment, the L bit OFB mode or the L bit CFB mode is used, with L set to be a multiple of 8. The initial value data IV of each block is generated by means of the random number generation at a time of a new block creation. The block data are enciphered L bits by L bits in an order from the top as described above. There is a case in which the end of the block does not coincide with the L-th bit exactly, but even in such a case, the cipher is cut off at the length of the plain text. It is still possible to decipher the last portion even in such a case.

Figure 11:
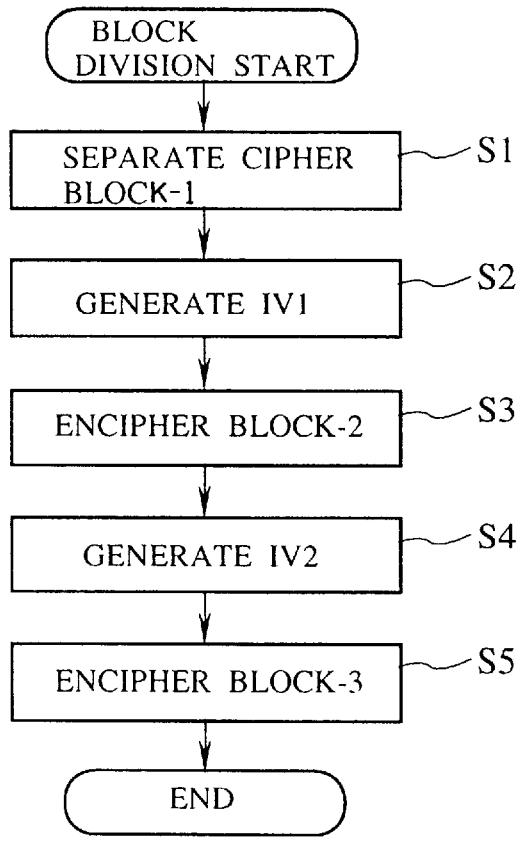
FIG. 11 is a flow chart of a cipher procedure in the system of FIG. 1 at a time of block data division for a case of using the first cipher scheme.

The cipher procedure at a time of the block data division as shown in FIG. 10 will be described with reference to the flow chart of FIG. 11.

First, the top portion before the deletion start position is separated as one block (block-1) as it is (step S1). Then, the initial value IV1 is determined by means of the random number generation (step S2), and by the OFB (or CFB) mode using this initial value IV1, data of the deletion portion (plain text corresponding to block-2) are enciphered to form a new block (block-2) (step S3). Next, another initial value IV2 is determined (step S4), and data of the bottom portion are enciphered to form a new block (block-3) (step S5).

This cipher procedure is characterized by the fact that the block of the top portion utilizes the original initial value IV0 as it is, so that there is no need to re-encipher this block.

Next, the second cipher scheme of this first embodiment which is characterized by the fact that there is absolutely no need to re-encipher any data will be described. In this case, the 8 bit CFB mode is used.

With respect to a new insertion block, the initial value data IV are generated by means of the random number generation, and the block data are enciphered byte by byte in an order from the top.

Figure 12:
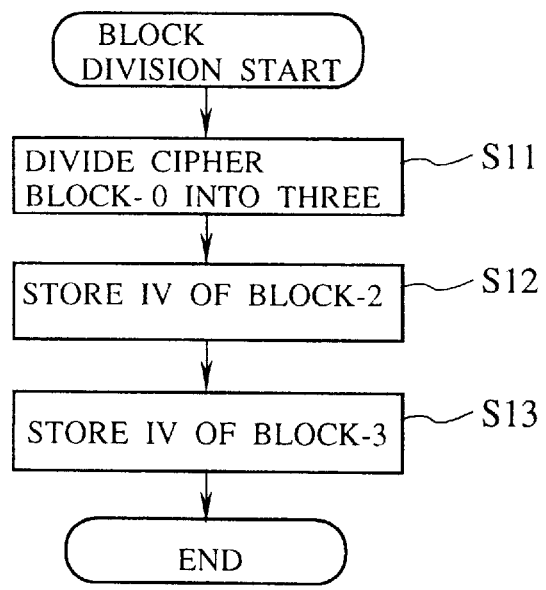
FIG. 12 is a flow chart of a cipher procedure in the system of FIG. 1 at a time of block data division for a case of using the second cipher scheme.

The cipher procedure at a time of the block data division as shown in FIG. 10 will be described with reference to the flow chart of FIG. 12.

First, the cipher block (block-0) is divided into three at individual division positions (step S11). Next, the last 8 bytes of the block-1 are stored as the initial value data IV of the block-2 (step S12). Then, the last 8 bytes of the block-2 are stored as the initial value data IV of the block-3 (step S13). At a time of storing the initial value data IV at the steps S12 and S13, there can be a case in which the previous block is less than 8 bytes long. In such a case, it is necessary to employ a special treatment in which the previous block is regarded as the initial value data IV+block data, such that the block data can be supplemented by as many bytes of the initial value data IV as necessary.

This second cipher scheme utilizes the property of the 8 bit CFB mode that the deciphering can be made from an arbitrary position, and it has an advantage that the re-enciphering in conjunction with the block division becomes totally unnecessary. This advantage also implies that, in a case of realizing the enciphered shared file system by the client server system, the server without the encipher/decipher function can carry out the block division processing, so that the efficient realization of the system becomes possible. It is also possible to expand the above cipher procedure to the general L bit CFB mode (with L set to be a multiple of 8), but the supplementary data become necessary for that purpose, because there can be a case in which the block-2 of FIG. 10 does not start from the partition at L bits from the top of the original block-0. The data of the block-2 are data enciphered in units of L bits from the top of the block-0, so that it is necessary to make it possible to reproduce the original partitions in units of L bits. To this end, u bits (u is an integer for which $u \leq L$) from the top of the block is used as the supplementary data for indicating that it is a fragmentary block, and at a time of deciphering, it is deciphered after the cipher text of (L-u) bits is added as a dummy at the top of the block data and the top (L-u) bits in the deciphered result are ignored. The subsequent data can be deciphered in units of L bits. Also, the initial value data IV to be stored at a time of the block division are set to be a content of 8 bytes immediately before the fragmentary bits (L-u bits) at the end of the previous block. In a case the previous block is too short, just as in a similar case of the 8 bit CFB mode explained above, the block data can be supplemented by the initial value data IV as much as necessary.

In the above, a case of the block division in conjunction with the deletion has been described, but in a case of the insertion, it becomes as follows. Namely, in a case of inserting a certain block in a middle of an already existing block, there is a need for a division of the already existing block corresponding to the procedure of FIG. 11 or FIG. 12 described above, as well as for the enciphering of a new insertion block data. Here, the enciphering of a new insertion portion is made by determining the initial value IV by means of the random number generation, and then by using the OFB (or CFB) mode using this initial value IV. Also, in a case of inserting a certain block between already existing blocks, no change is necessary for the already existing blocks, and it suffices to encipher the new insertion block alone.

In the following the features of the record management scheme according to this first embodiment will be summarized. Here, the shared file editing system using the enciphered difference pile up scheme shown in FIG. 2, the shared file editing system using the enciphered RCS scheme shown in FIG. 3, and the shared file editing system using the enciphered SCCS scheme shown in FIG. 4 will be compared.

First, regarding the asynchronous editing function without locking, the enciphered SCCS scheme is advantageous because the merge processing can be simplified as already explained above.

Next, regarding the extraction of the current version, the enciphered RCS scheme is most advantageous as it stores the current version as it is in a form of the enciphered data. The enciphered SCCS scheme is advantageous next, and it has a characteristic that an arbitrary version can be restored by the same level of processing.

Next, in view of a case in which it is desired to delete the old records in order to compress the file size, the enciphered RCS scheme and the enciphered SCCS scheme are both superior. This is because, in these schemes, the server which received a request to this end can delete the records by itself. In the enciphered difference pile up scheme, the old records can be deleted by an interaction from the client.

Here, it should be noted that, in a case of the enciphered SCCS scheme, the fusion of the blocks does not take place even when the old records are deleted, and only the separation of the unnecessary blocks is carried out. In a case of carrying out the fusion of the blocks as well, the interaction from the client becomes necessary. Also, it should be noted that, in the enciphered RCS scheme, what the server can do by itself is to delete the records in an order from the older side.

It is preferable to manage the record content to be not changed later on, and regarding such a completeness of the record content, the enciphered difference pile up scheme is superior. As explained earlier, the client is only allowed to sequentially add differences in this scheme, so that the completeness of the records can be guaranteed.

As described above, by applying one or both of the characteristic features of this first embodiment, it becomes possible to provide a shared file editing system which supports the file version management, which is capable of realizing the asynchronous editing while keeping the file contents secret from the file server, or a shared file editing system which supports the file version management, which is capable of realizing the asynchronous editing, or a file editing system capable of realizing a higher level of secrecy such that the file contents cannot be read out from the file server.

In the above, in enciphering the structured files, the data content is enciphered such that only the client can encipher/decipher it, but the data structure in a format that can also be recognized by the server has been shown, and in particular, the applications to the version management and the asynchronous editing have been described. The present invention is applicable to various other systems and schemes, such as a scheme for enciphering the program in units of subroutines, and a scheme for dealing with a plurality of data files which are linked together as in the hypertext, in which the data files are enciphered in units of data files and linked portions are not enciphered. In this manner, it becomes possible to realize an efficient manner of utilization in which the client can read out only the necessary portion while maintaining the secrecy of the module content with respect to the server.

Next, the second embodiment of a shared file editing system according to the present invention, in which the above described first feature concerning the file content secrecy with respect to the server and the above described second feature concerning the asynchronous editing are implemented on the client server type system will be described in detail.

In this second embodiment, the individual features related to the file structure, the record management scheme, the cipher scheme, and the asynchronous editing system are basically the same as those for the first embodiment described above, and their detailed descriptions will not be repeated here. In the following, the configuration and the operation characteristic to this second embodiment will be described.

Figure 13:
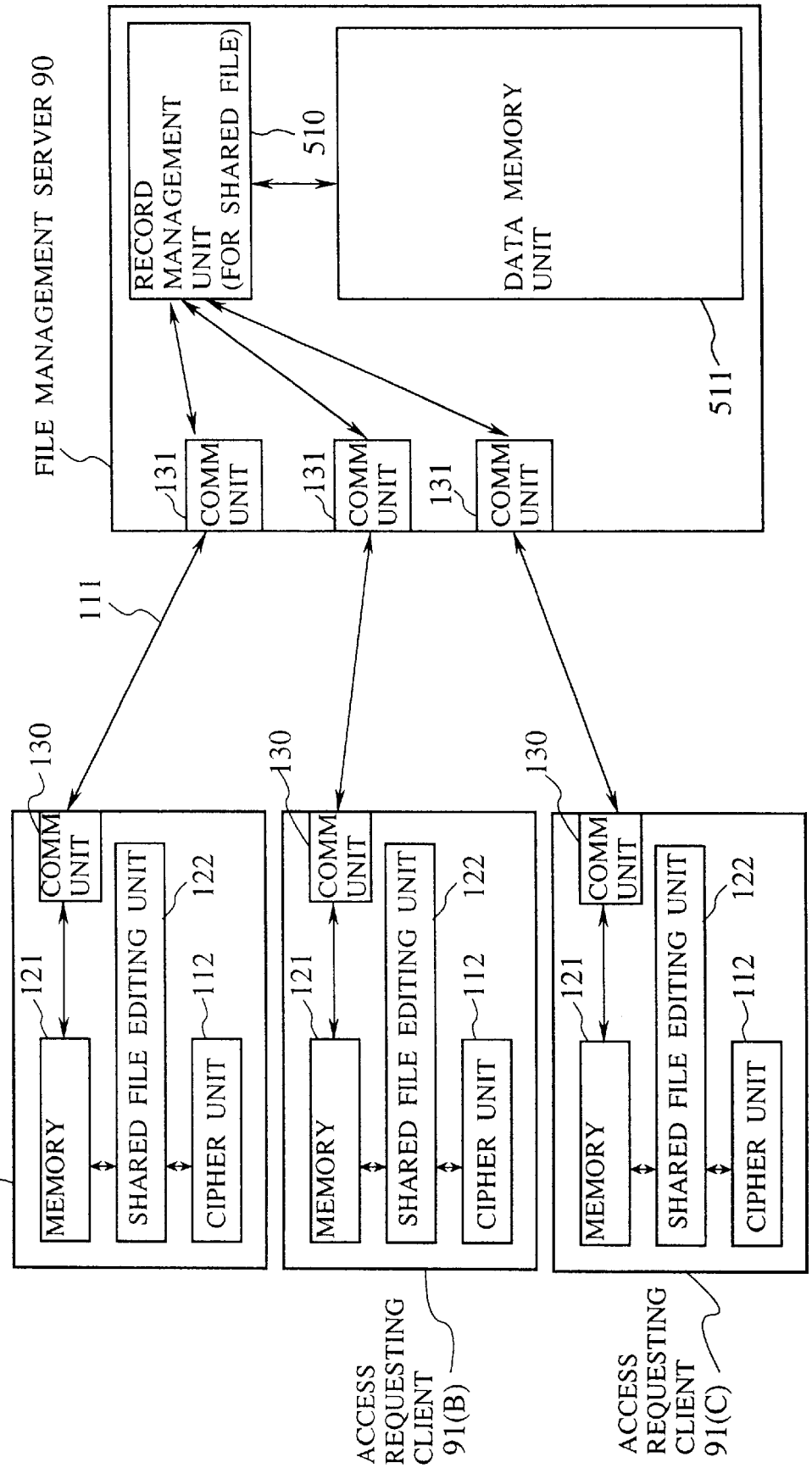
FIG. 13 is a block diagram of a first exemplary configuration in the second embodiment of a shared file editing system according to the present invention.

FIG. 13 shows a first configuration of the shared file editing system of this second embodiment, which generally comprises a plurality of clients 91 and a server 90.

The server 90 further comprises a communication (COMM) unit 131 for carrying out a communication with each client 91 through a communication path 111, a record management unit (for shared file) 510 for managing records for shared files, and a data memory unit 511 for storing a plurality of files, where the record management unit 510 and the data memory unit 511 correspond to the record management unit 510 and the the data memory unit 511 in the asynchronous editing system of FIG. 5 described above.

On the other hand, each client 91 further comprises a communication (COMM) unit 130 for carrying out a communication with the server 90 through the communication path 111, a memory 121 for storing files obtained from the server 90, a shared file editing unit 122 for editing the shared files, and a cipher unit 112 for enciphering/deciphering the files.

As shown in FIG. 14, the shared file editing unit 122 includes the editing unit 500, the editing procedure generation unit 501, the editing procedure conversion unit 502, and the record management information generation unit 503 corresponding to those in the asynchronous editing system of FIG. 5 described above.

As shown in FIG. 15, the cipher unit 112 includes a communication (COMM) unit 132 connected with the shared file editing unit 122, an encipher/decipher processing unit 1121 connected with the communication unit 132, and a key memory unit 1122 connected with the encipher/decipher processing unit 1121.

Now, as a plurality of clients 91 are provided in this second embodiment, requests for the following three types of operations occur at various timings:

(a) a reading of file data of a particular version (arrow from 510 to 500 in FIG. 5);

(b) a writing of a record management information which is an editing result (arrow from 503 to 510 in FIG. 5); and (c) a reading of record data necessary in converting the editing procedure (arrow from 510 to 502 in FIG. 5).

Here, a general procedure for dealing with these requests in this second embodiment will be described.

As described before, the editing procedure corresponding to one record management information comprises a combination of a plurality of insertions and deletions, and it is preferable to handle them together. That is, when a certain client 91 made changes at a plurality of positions in the file of a certain version, a new version is made at a timing at which all these changes are reflected in the data on the server 90 side. The write requests for the record management information are set in a queue one by one, and sequentially reflected into the file data as they are sequentially taken out by the record management unit 510 in First-in-First-out manner. Here, the record management unit 510 responds to the read requests ((a) and (c) mentioned above) from the client 91 whenever necessary, but in a case the read request for the current version of one file arrives during the updating of the file data for the same file at the record management unit 510, there is a need to transmit the version before the updating.

The client 91 requests the data of a certain version (version X) from the server 90 initially, and after storing the data in the memory 121, the editing is carried out at the editing unit 500, and the editing procedure data are generated at the editing procedure generation unit 501. In a case the version X is the latest version at a time of reading, the editing procedure is not converted and the record management information is generated immediately, and subsequently enciphered and transmitted to the server 90. At the receiving server 90 side, whether it is the record management information that can be merged with the latest version at that timing or not is judged, and if it cannot be merged, the record data are transmitted from the record management unit 510 to the client 91, to request the conversion of the editing procedure at the editing procedure conversion unit 502.

Here, the judgment as to whether it can be merged or not can be made by attaching a version number of the target data to a header of the record management information to be transmitted at the client 91 side, such that the server 90 side can compare the version number in the header with the version number of the latest version stored therein, and judge that it can be merged when they coincide, and that it cannot be merged otherwise. In addition, the record data to be transmitted to the client 91 when it cannot be merged can be the record data between the latest version and the version indicated by the version number in the header of the record management information for example. At the client 91 side, the prescribed editing procedure conversion is carried out to generate a new record management information, and this is sent to the server 90 again, such that the server 90 side judges whether it can be merged or not again.

Here, there is a possibility that the new record management information cannot be merged again. Namely, it is a case where the file version has been updated by the other client during the editing procedure conversion processing at this client 91. Consequently, there is a possibility for circulating through the loop of 510→502→503 in FIG. 5 many times.

In order to prevent such a repetitive processing, it is possible to utilize the lock function. Namely, at a timing at which the record data are transmitted to the client 91, the server 90 side sets the lock on the updating of the file data, and releases the lock at a timing at which the updating of the file data is completed after the record management information is received from that client 91. While the lock is set, the reading of the editing target file data is permitted, but the other processing is rejected at the server 90 side. The other client 91 whose request has been rejected will make a re-try after an appropriate amount of time. Here, the waiting period due to this lock mechanism can be considered as very short, but this lock mechanism is not absolutely necessary.

On the other hand, in a case the version X initially read out from the server 90 is not the latest version at a time of reading, for the purpose of the processing at the editing procedure conversion unit 502, the record data from that version X to the latest version are requested to the server 90. Thereafter, the operation similar to that already described above is carried out.

In the above procedure, the editing target file and the record data received by the client 91 and the record management information transmitted to the server 90 are all enciphered in units of structural units, and they are enciphered/deciphered by means of the cipher unit 112.

In this manner, in this second embodiment, the file content can be read out from the proper client who has the decipher key, and the file content cannot be read out from the server, so that the file editing system with a high secrecy for the file content can be realized.

Also, at the server, the updating with respect to the file content of the latest version is made always at a timing of the completion of the editing by each client, so that it becomes possible to realize the asynchronous editing by a plurality of clients, without utilizing the lock mechanism.

Also, it becomes possible to realize a manner of usage in which the version which is already old in time is edited, and the latest version is made out of it. Namely, for the shared file that can be asynchronously edited, it becomes possible to realize a manner of usage in which the editing target is not necessarily limited to the current version alone.

Also, in a case of executing the merge processing of the editing results obtained by the asynchronous editing, it is possible to realize a scheme in which only data necessary for the processing at the client side alone are transmitted from the server, and the merged result is returned to the server after the necessary processing is executed at the client side, so that the wasteful communication of portions related to unnecessary records can be eliminated, and consequently the system efficiency can be improved considerably.

As for the file data structure, by using the structure used in the SCCS scheme in which the data sequentially inserted from a top of the file are managed at inserted positions as blocks, and the blocks are sequentially divided in a case of the partial deletions, rather than the structure used in the RCS scheme in which the difference with respect to the immediately previous (or subsequent) version is simply left, the determination of the insertion/deletion positions required in the merge processing can be simplified considerably, so that the asynchronous editing becomes easier.

Also, as the cipher scheme for the data content in a case of using the data structure of the SCCS scheme suitable for the merge processing, the stream cipher in bit unit (or byte unit) can be utilized. This stream cipher has a property that a particular bit (or byte) of the plain text corresponds to a particular bit (or byte) of the cipher text. For this reason, when the enciphered blocks as sequentially divided, it suffices to separate the portion after the dividing point and re-encipher that separated portion alone, so that the overhead due to the re-enciphering can be reduced. In addition, it is also possible for the server side to confirm that the portion before the dividing point has not been changed.

As mentioned above, the shared file editing system of this second embodiment involves a loop of 510 →502 →503 in FIG. 5. In the following, the second configuration for this second embodiment which resolves this loop will be described.

In this second configuration, the file data structure of the modified SCCS scheme shown in FIG. 4 is used, and the cipher scheme of the 8 bit CFB mode among the stream cipher is used. This cipher scheme has a characteristic that the re-enciphering is totally unnecessary even at a time of dividing the blocks as already explained above.

Figure 16:
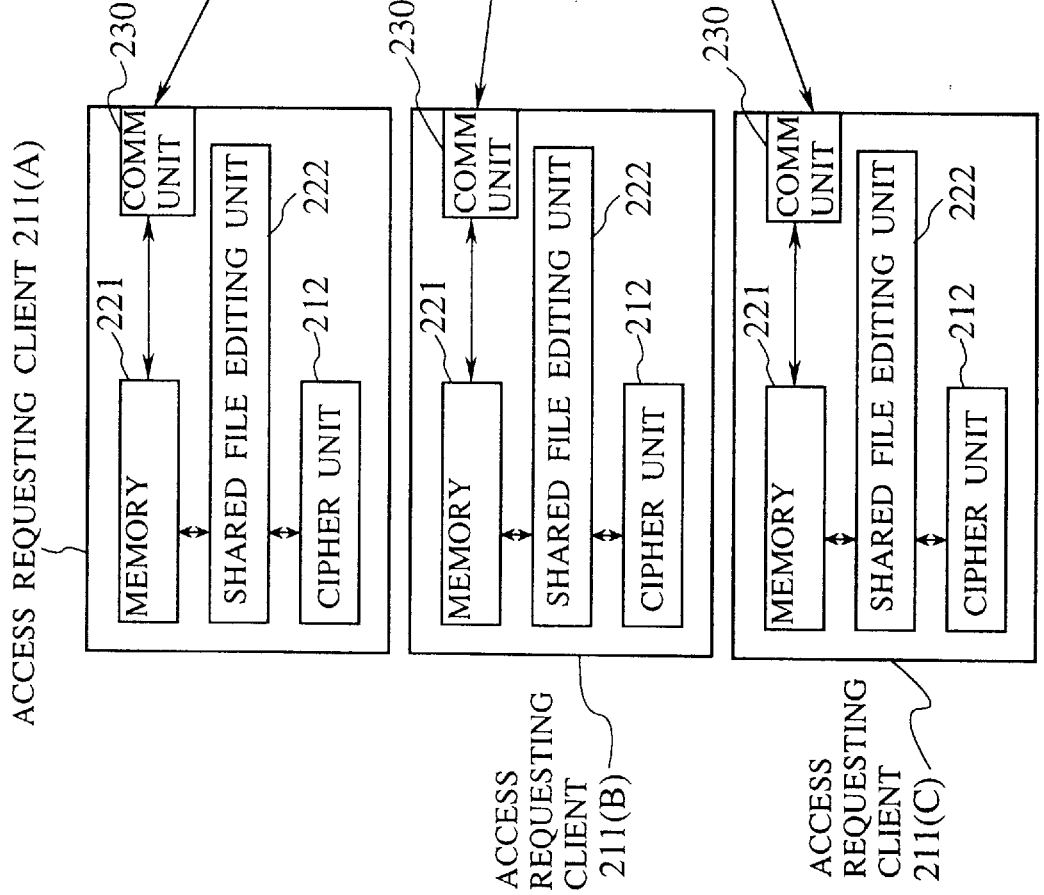
FIG. 16 is a block diagram of a second exemplary configuration in the second embodiment of a shared file editing system according to the present invention.

FIG. 16 shows this second configuration of the shared file editing system of this second embodiment, which generally comprises a plurality of clients 211 and a server 210.

The server 210 further comprises a communication (COMM) unit 231 for carrying out a communication with each client 91 through a communication path 111, an editing procedure conversion unit 502 for converting the editing procedure, a record management unit (for shared file) 510 for managing records for shared files, and a data memory unit 511 for storing a plurality of files, where the editing procedure conversion unit 502, the record management unit 510, and the data memory unit 511 correspond to the editing procedure conversion unit 502, the record management unit 510, and the the data memory unit 511 in the asynchronous editing system of FIG. 5 described above. Here, the editing procedure conversion unit 502 also functions as the record management information generation unit 503 of FIG. 5 as well.

On the other hand, each client 211 further comprises a communication (COMM) unit 230 for carrying out a communication with the server 210 through the communication path 111, a memory 221 for storing files obtained from the server 210, a shared file editing unit 222 for editing the shared files, and a cipher unit 212 for enciphering/deciphering the files.

Figure 17:
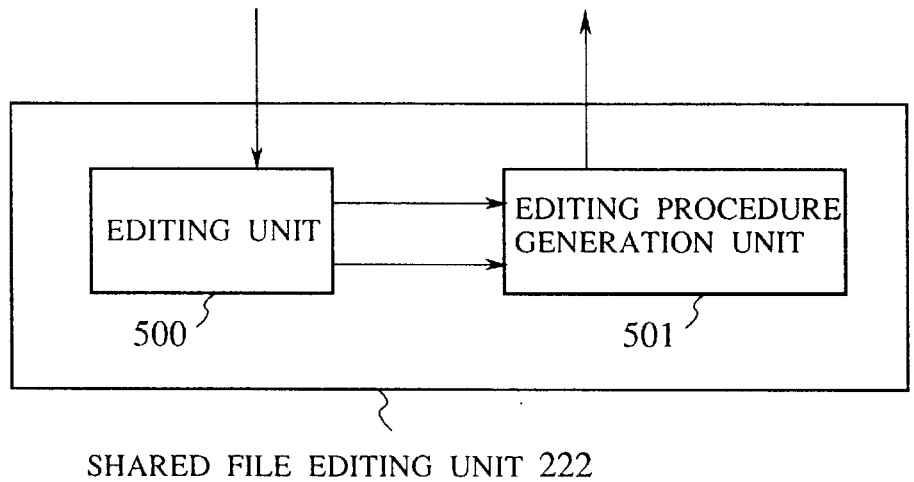
FIG. 17 is a block diagram of a shared file editing unit in the system of FIG. 16.

As shown in FIG. 17, the shared file editing unit 222 includes the editing unit 500 and the editing procedure generation unit 501, which are corresponding to those in the asynchronous editing system of FIG. 5 described above.

Now, as a plurality of clients 211 are provided in this second embodiment, requests for the following two types of operations occur at various timings:

(a) a reading of file data of a particular version (arrow from 510 to 500 in FIG. 5); and (b) a writing of editing procedure data obtained by converting an editing result (arrow from 501 to 502 in FIG. 5).

Here, an exemplary procedure for dealing with these requests in this second embodiment will be described.

The client 211 initially requests the data of a certain version from the server 210. Then, after the data of that version are deciphered and stored in the memory 221, the editing is carried out at the editing unit 500, and the editing procedure data are generated at the editing procedure generation unit 501. Here, the editing procedure data includes two data types of insertion data and deletion data. The insertion data comprises a set of an insertion position (a number of bytes from a top position for example) and an insertion block content, while the deletion data comprises a set of a deletion start position and a deletion end position.

For the insertion block content, the client 211 generates the initial value IV and enciphers the block by the 8 bit CFB mode. The other data (such as the insertion position and the deletion range) are not enciphered, and transmitted together with the enciphered insertion block content to the server 210.

At the server 210 which received this, the insertion position and the deletion range are converted (position conversion) into the position data with respect to the latest version at that timing by the editing procedure conversion unit 502. Then, the enciphered insertion block transmitted from the client is arranged at the converted insertion position, while the block division and the deletion time field entry are made for the converted deletion range by the record management unit 510. The result obtained so far is then set as the latest version.

In the above procedure, the important point is that the conversion of the editing procedure can be made in an enciphered state, and for this reason, the above described loop for the purpose of the editing procedure conversion in the above described general procedure can be resolved. As the file data structure and the cipher scheme for enabling the editing procedure conversion in the enciphered state, a combination of the modified SCCS scheme and the 8 bit CFB mode is used. The similar effect can also be obtained by using the other cipher scheme such as the L bit OFB mode or the L bit CFB mode for which the re-enciphering is unnecessary for the first block in a case of the block division, but extra data will be required as the editing procedure data to be transmitted from the client to the server in such a case, compared with a case described above.

In this manner, in this second embodiment, the file content can be read out from the proper client who has the decipher key, and the file content cannot be read out from the server, so that the file editing system with a high secrecy for the file content can be realized.

Also, at the server, the updating with respect to the file content of the latest version is made always at a timing of the completion of the editing by each client, so that it becomes possible to realize the asynchronous editing by a plurality of clients, without utilizing the lock mechanism.

Thus, in this second embodiment, the arrangement of the main features in the first configuration of FIG. 13 and the second configuration of FIG. 16 described above can be summarized as shown in FIG. 18 and FIG. 19, respectively.

Figure 18:
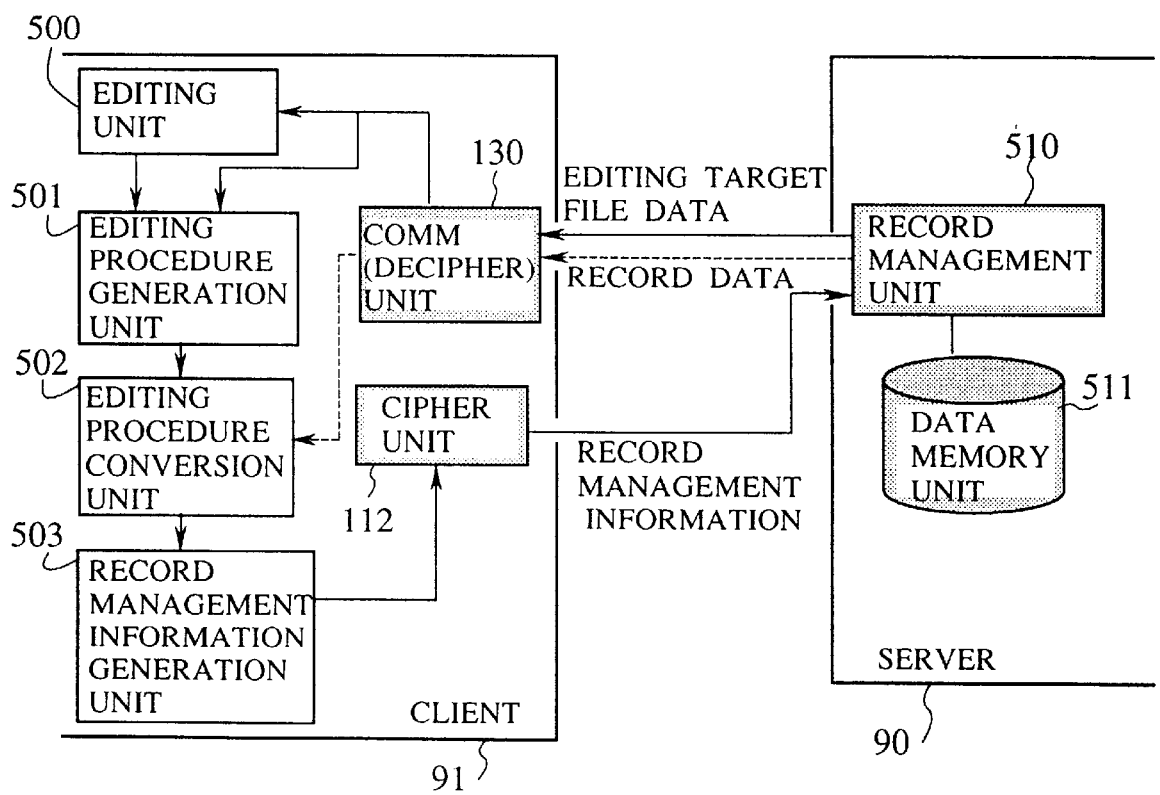
FIG. 18 is a block diagram summarizing main features in the first exemplary configuration of FIG. 13.

In the configuration of FIG. 18, the block identification information may be attached to the record management information to be transmitted from the client 91 to the server 90 by an operation of the record management information generation unit 503 on the client 91 side. In such a case, the block identification information is not enciphered while the entire record management information are enciphered by the cipher unit 112, so that the server 90 can manage the new data block indicated by the record management information according to the attached block identification information which is not enciphered and therefore recognizable on the server 90 side, even though the data content of the enciphered record management information is not recognizable to the server 90. Alternatively, the block identification information may not be attached to the record management information to be transmitted from the client 91 to the server 90, in which case the appropriate block identification information for identifying the new block data indicated by the record management information can be attached at the record management unit 510 on the server 90 side.

Figure 19:
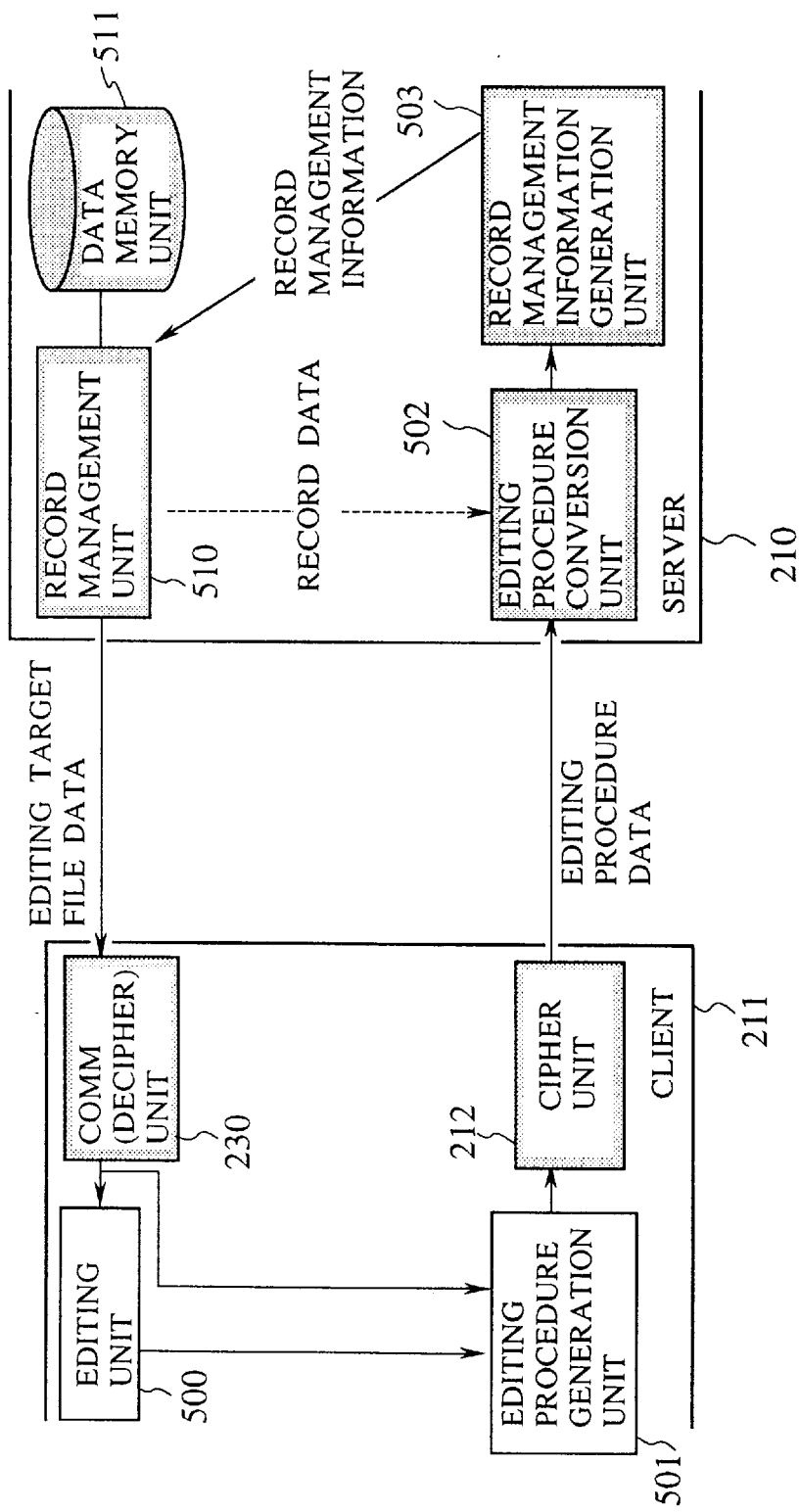
FIG. 19 is a block diagram summarizing main features in the second exemplary configuration of FIG. 16.

In the configuration of FIG. 19. only the editing procedure data are transmitted from the client 211 to the server 210, and the block identification information for identifying the new block data resulting from this editing procedure data is attached by the operation of the record management information generation unit 503 or the record management unit 510 on the server 210 side. Here, only the insertion data contents are enciphered by the cipher unit 212, while the other parts of the editing procedure data are not enciphered, such that the editing procedure conversion unit 502 on the server 210 side can carry out the conversion of the editing procedure data according to these other parts of the editing procedure data which are not enciphered and therefore recognizable on the server 210 side, along with the record data provided from the record management unit 510.

It is also possible to modify this configuration of FIG. 19 to provide the editing procedure conversion unit 502 on the client 211 side, between the editing procedure generation unit 501 and the cipher unit 212, to realize a hybrid of the configurations of FIGS. 18 and 19. In such a case, only the converted editing procedure data are transmitted from the client 211 to the server 210, and the block identification information for identifying the new block data resulting from this converted editing procedure data is attached by the operation of the record management information generation unit 503 or the record management unit 510 on the server 210 side. In this case, only the converted insertion data contents are enciphered by the cipher unit 212, while the other parts of the editing procedure data are not enciphered, such that the record management information generation unit 5023 on the server 210 side can carry out the generation of the record management information according to these other parts of the converted editing procedure data which are not enciphered and therefore recognizable on the server 210 side.

Now, the above described first feature concerning the file content secrecy with respect to the server and the above described second feature concerning the asynchronous editing are separately realizable. In the following, the embodiments of a shared file editing system implementing one of these features separately will be described in detail.

First, the third embodiment of a shared file editing system according to the present invention, in which the above described second feature concerning the asynchronous editing is implemented on the client server type system will be described in detail.

In this third embodiment, the individual features related to the file structure, the record management scheme, and the asynchronous editing system are basically the same as those for the first embodiment described above, and their detailed descriptions will not be repeated here. In the following, the configuration and the operation characteristic to this third embodiment will be described.

FIG. 20 shows a configuration of the shared file editing system of this third embodiment, which generally comprises a plurality of clients 701 and a server 710.

The server 710 further comprises a communication (COMM) unit 731 for carrying out a communication with each client 701 through a communication path 111, a merge processing unit 740 for carrying out the merge processing, and a data memory unit 511 for storing a plurality of files, where the data memory unit 511 corresponds to the the data memory unit 511 in the asynchronous editing system of FIG. 5 described above.

On the other hand, each client 701 further comprises a communication (COMM) unit 730 for carrying out a communication with the server 710 through the communication path 111, a memory 721 for storing files obtained from the server 710, and a shared file editing unit 722 for editing the shared files.

Figure 21:
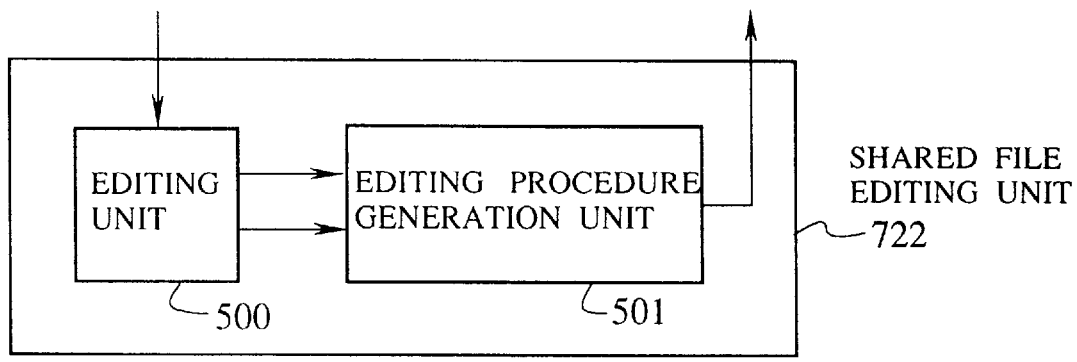
FIG. 21 is a block diagram of a shared file editing unit in the system of FIG. 20.

As shown in FIG. 21, the shared file editing unit 722 of the client 701 includes the editing unit 500 and the editing procedure generation unit 501, which are corresponding to those in the asynchronous editing system of FIG. 5 described above.

Figure 22:
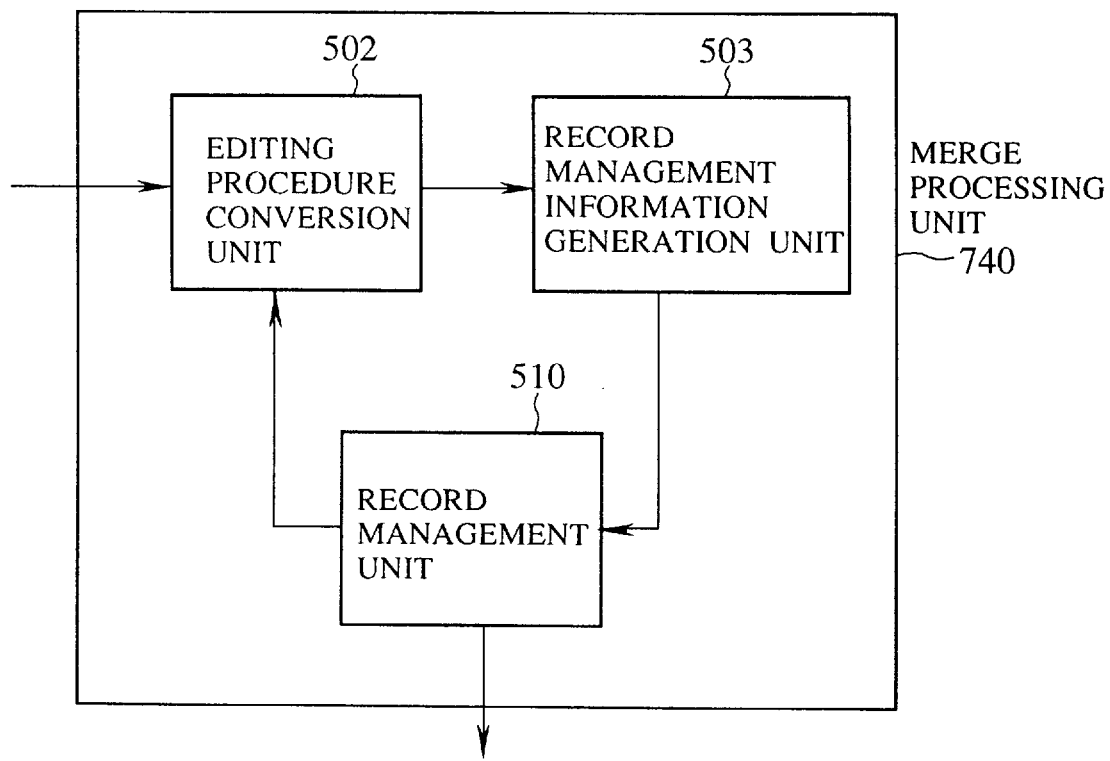
FIG. 22 is a block diagram of a merge processing unit in the system of FIG. 20.

As shown in FIG. 22, the merge processing unit 740 of the server 710 includes the editing procedure conversion unit 502, the record management information generation unit 503, and the record management unit 510, which are corresponding to those in the asynchronous editing system of FIG. 5 described above.

Now, as a plurality of clients 701 are provided in this third embodiment, requests for the following two types of operations occur at various timings:

(a) a reading of file data of a particular version (arrow from 510 to 500 in FIG. 5); and (b) a writing of editing procedure data obtained by converting an editing result (arrow from 501 to 502 in FIG. 5).

Here, an exemplary procedure for dealing with these requests in this second embodiment will be described.

In this case, the client 701 requests the file data of a particular version from the server 710, and after that file is stored in the memory 721, the editing is carried out at the editing unit 500, the editing procedure data are generated at the editing procedure generation unit 501, and the obtained editing procedure data are transmitted to the server 710.

At the server 710, the editing procedure data are entered into the queue one by one, and the merge processing unit 740 sequentially takes out the editing procedure data in the queue, converts them into the records and store them. Unlike a case of the system with cipher function described above, this third embodiment is characterized in that the server 710 by itself can carry out the editing procedure conversion with respect to the latest version. Namely, the client 701 carries out the editing procedure conversion according to the editing procedure data and the record data, and then store the result as the record. Consequently, the above mentioned loop of 510 →502 →503 in FIG. 5 is absent in this third embodiment, and therefore there is no need for the lock mechanism for the purpose of preventing the repetitive processing through the loop. In addition, the function of the shared file editing unit 722 provided on the client 701 side can also be reduced.

Here, just as in a case of the embodiment incorporating the first feature concerning the file content secrecy with respect to the server, it is also possible to use a configuration in which the editing procedure conversion unit 502 and the record management information generation unit 503 are provided on the client 701 side. In such a case, the operation of each element is substantially similar as described above for the second embodiment. It is also possible to move the editing procedure generation unit 501 from the shared file editing unit 722 provided on the client 701 to the server 710 side.

Thus, in this third embodiment, at the server, the updating with respect to the file content of the latest version is made always at a timing of the completion of the editing by each client, so that it becomes possible to realize the asynchronous editing by a plurality of clients, without utilizing the lock mechanism.

Also, it becomes possible to realize a manner of usage in which the version which is already old in time is edited, and the latest version is made out of it. Namely, for the shared file that can be asynchronously edited, it becomes possible to realize a manner of usage in which the editing target is not necessarily limited to the current version alone.

Also, in a case of executing the merge processing of the editing results obtained by the asynchronous editing, it is possible to realize a scheme in which only data necessary for the merging at the client side alone are transmitted from the server, and the merged result is returned to the server after the necessary processing is executed at the client side, so that the wasteful communication of portions related to unnecessary records can be eliminated, and consequently the system efficiency can be improved considerably.

As for the file data structure, by using the structure used in the SCCS scheme in which the data sequentially inserted from a top of the file are managed at inserted positions as blocks, and the blocks are sequentially divided in a case of the partial deletions, rather than the structure used in the RCS scheme in which the difference with respect to the immediately previous (or subsequent) version is simply left, the determination of the insertion/deletion positions required in the merge processing can be simplified considerably, so that the asynchronous editing becomes easier.

Next, the fourth embodiment of a file editing system according to the present invention, in which the above described first feature concerning the file content secrecy with respect to the server is implemented on the client server type system will be described in detail.

The file handled in this fourth embodiment includes a plurality of block data and block identification information, and each block data are enciphered in units of block data. The file data has the data structure such as that of FIG. 2, FIG. 3, or FIG. 4 described above, for example, but besides these, this fourth embodiment is also applicable to various other systems and schemes, such as a scheme for enciphering the program in units of subroutines, and a scheme for dealing with a plurality of data files which are linked together as in the hypertext, in which the data files are enciphered in units of data files and linked portions are not enciphered. In this manner, it becomes possible to realize an efficient manner of utilization in which the client can read out only the necessary portion while maintaining the secrecy of the module content with respect to the server.

Also, in this fourth embodiment, with respect to the files with the data structure as described above, the cipher scheme described above for the first embodiment is used.

Figure 23:
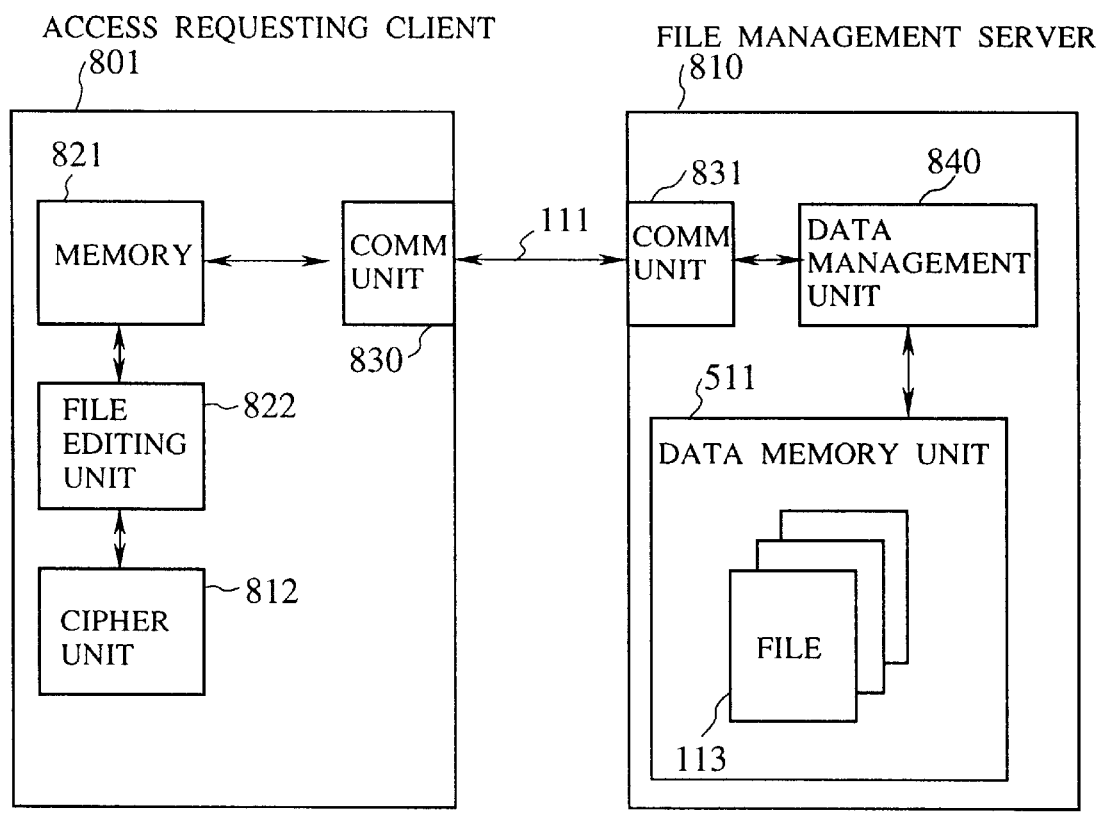
FIG. 23 is a block diagram of the fourth embodiment of a shared file editing system according to the present invention.

FIG. 23 shows a configuration of the file editing system of this fourth embodiment, which generally comprises a plurality of clients 801 and a server 810.

The server 810 further comprises a communication (COMM) unit 831 for carrying out a communication with each client 801 through a communication path 111, a data management unit 840 for managing the file data, and a data memory unit 511 for storing a plurality of files.

On the other hand, each client 801 further comprises a communication (COMM) unit 830 for carrying out a communication with the server 810 through the communication path 111, a memory 821 for storing files obtained from the server 810, a file editing unit 822 for editing the files, and a cipher unit 812 for enciphering/deciphering the files.

Figure 24:
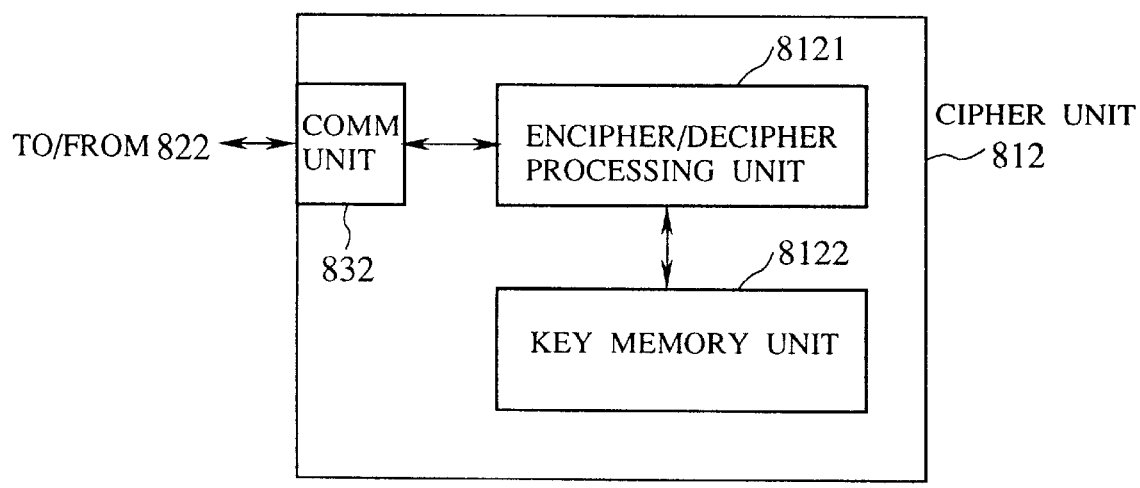
FIG. 24 is a block diagram of a cipher unit in the system of FIG. 23.

As shown in FIG. 24, the cipher unit 812 includes a communication (COMM) unit 832 connected with the file editing unit 822, an encipher/decipher processing unit 8121 connected with the communication unit 832, and a key memory unit 8122 connected with the encipher/decipher processing unit 8121.

In this configuration, the client 801 requests the file data of a particular version from the server 810, and after that file is stored in the memory 821, the editing is carried out at the file editing unit 822. At this point, the file is enciphered in units of block data as already mentioned above, so that the file is deciphered by using the decipher key registered in the key memory unit 8122 at the encipher/decipher processing unit 8121, After the editing of the file is finished, the file is enciphered by using the cipher key registered in the key memory unit 8122 at the encipher/decipher processing unit 8121, and transmitted to the server 810, such that the file in the data memory unit 511 is updated by the data management unit 840 at the server 810.

In this manner, in this fourth embodiment, it is possible to realize the file editing system with a high secrecy for the file content in which the file content cannot be read out from the server.

Also, the client can obtain only the necessary data block among the files through the communication, so that it is possible to reduce the amount of communication, and also it suffices to decipher/encipher the necessary blocks alone, so that it is possible to reduce the amount of processing at the client side, and consequently the buffer (memory) required for the client can also be reduced.

Now, in this fourth embodiment, it is also possible to apply the record management scheme as described above for the first embodiment, as follows.

In this case, the file data structure of FIG. 2, FIG. 3, or FIG. 4 described above is used. Also, with respect to the files with such a data structure, the cipher scheme described above for the first embodiment is used.

Here, the asynchronous editing is not carried out, so that it is possible to use the record management system in which the editing procedure conversion unit 502 in the asynchronous editing system of FIG. 5 is omitted and the editing procedure generation unit 501 and the record management information generation unit 503 can be connected directly, and the record management unit 510 is set as the data management unit 840 which is modified to have a function to manage the data memory unit 511 alone. This record management system is distributedly arranged in the file editing unit 822 and the data management unit 840.

Here, as long as the editing unit 500 is implemented on the file editing unit 822 of the client 801, and the data management unit 840 and the data memory unit 511 are implemented on the server 810, the other elements may be distributedly arranged in any desired form.

Here, as a preferable form, the data management unit 840 and the data memory unit 511 alone are implemented on the server 810 while all the other elements are implemented on the client 801, as in FIG. 23, will be described.

In this configuration, the client 801 requests the file data of a particular version from the server 810, and after that file is stored in the memory 821, the editing is carried out at the file editing unit 500. At this point, the file is enciphered in units of block data as already mentioned above, so that the file is deciphered by using the decipher key registered in the key memory unit 8122 at the encipher/decipher processing unit 8121, After the editing of the file is finished, the editing procedure data are generated at the editing procedure generation unit 501. Then, the obtained editing procedure data are converted into the record data in a format suitable for the record management scheme used at the record management information generation unit 503. Then, the record data are enciphered by using the cipher key registered in the key memory unit 8122 at the encipher/decipher processing unit 8121, and transmitted to the server 810, such that the file in the data memory unit 511 is updated by the data management unit 840 at the server 810.

In this manner, the file version management and the file data secrecy with respect to the file management server can be realized simultaneously.

Also, in a case the file data structure of the difference pile up scheme shown in FIG. 2 is used, the completeness of the record can be guaranteed by the file management server side alone.

Also, in a case the file data structure of the RCS scheme shown in FIG. 3 is used, the reading of the file in the current version and the deletion of old records can be made easier in the file version management.

Also, in a case the file data structure of the modified SCCS scheme shown in FIG. 4 is used, the deletion of old records in the file version management can be made easier.

Also, in a case of using the stream cipher as the cipher scheme, in the enciphering at a time of block division, a portion from a top of the block to the division point can be re-utilized in the enciphered state, and it suffices to re-encipher only a portion after the division point. It is also possible to use the cipher scheme in which absolutely no re-enciphering is necessary. This cipher scheme is advantageous in a case of sequentially dividing blocks as in the SCCS scheme.

Next, the fifth embodiment of a shared file editing system according to the present invention will be described in detail. In this fifth embodiment, the shared file editing system of FIG. 13, FIG. 16, or FIG. 20 described above is further equipped with an additional function for delaying an execution of a deletion of a version in response to a deletion request for a certain version of a certain file, until no client remains to be editing that certain version of that certain file.

In the system employing the record management, it is possible to provide a function for deleting some versions among the records. Such a deletion of a version may be made when the client executes a deletion command for example, or in a case the system automatically deletes any version for which more than a prescribed period of time has elapsed since its creation.

In the shared file editing system with the asynchronous editing function according to the present invention, at a time of deleting a version, there should not be any client who is editing that deletion target version. This is because the file management server carries out the merge processing for converting the version accessed by the client into the latest version in the file management server in such a system, and if a version is deleted while that version is edited by some client in such a system, the merge processing for the editing made by that client would become impossible.

In this fifth embodiment, in order to realize the version deletion function, the file management server is provided with means for counting a number of clients who are editing each version of each file, in correspondence to each version of each file managed by the file management server. By this means, the file management server can judge whether there exists any client who is editing each version of each file. Namely, when the count value for a specified version of a specified file is 0, it implies that there is no client who is editing that version of that file, whereas when that count value is not equal to 0, it implies that there exists a client who is editing that version of that file.

Then, the file management server of this fifth embodiment is further provided with means for delaying the execution of the deletion of a version when the deletion of a certain version of a certain file is requested and the count value for that version of that file is not equal to 0, until that count value becomes 0. By this means, the file management server is not going to delete that version of that file while there exists a client who is editing that version of that file which is the deletion target, so that the merge processing for the editing made by that client can be carried out without a trouble.

Figure 25:
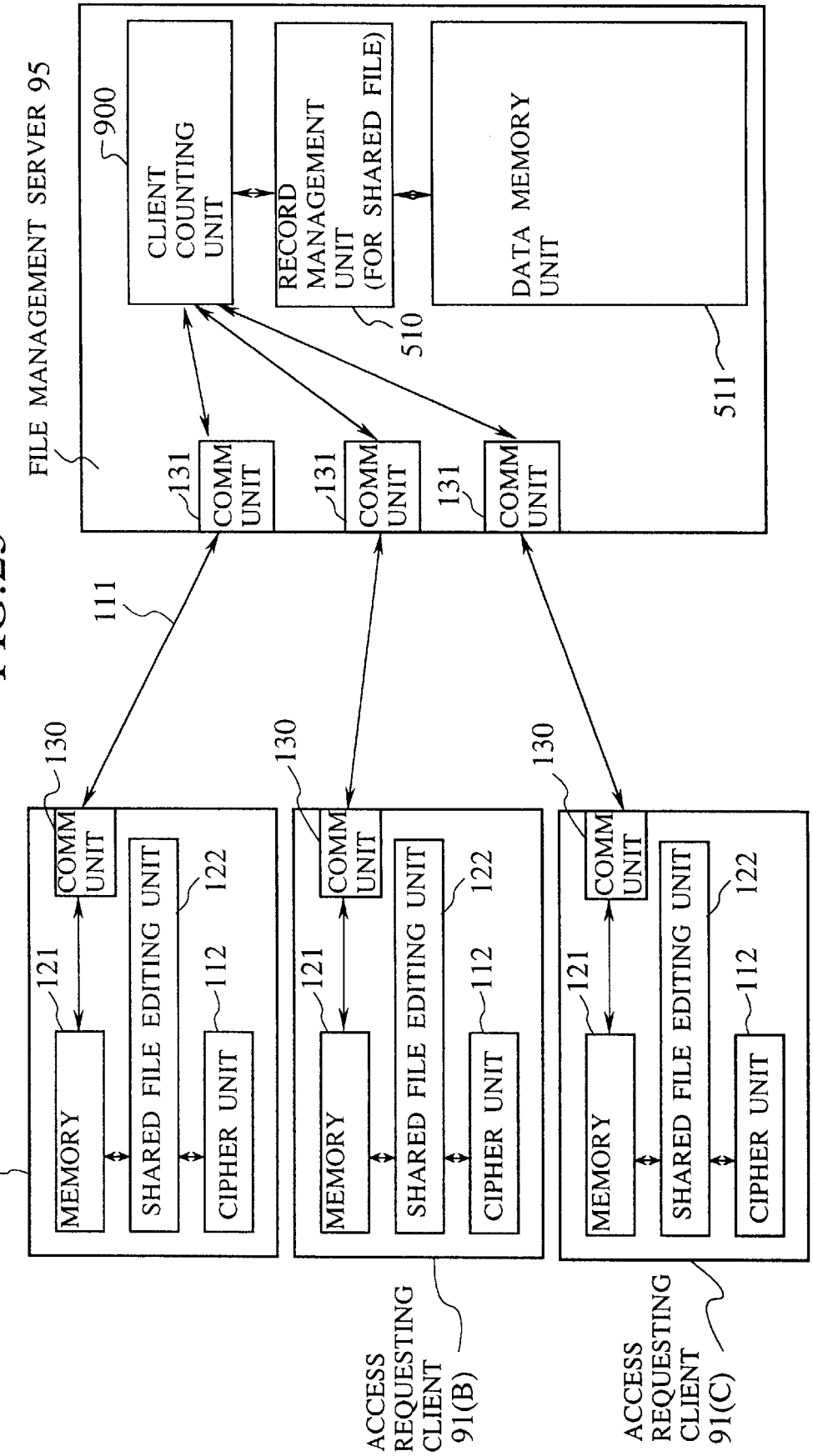
FIG. 25 is a block diagram of the fifth embodiment of a shared file editing system according to the present invention.

FIG. 25 shows a configuration of the shared file editing system of this fifth embodiment as outlined above, which is based on the shared file editing system of FIG. 13 described above.

In this configuration of FIG. 25, each access requesting client 91 and the communication path 111 are substantially similar as those in FIG. 13. The file management server 95 differs from that of FIG. 13 in that it further includes a client counting unit 900.

Figure 26:
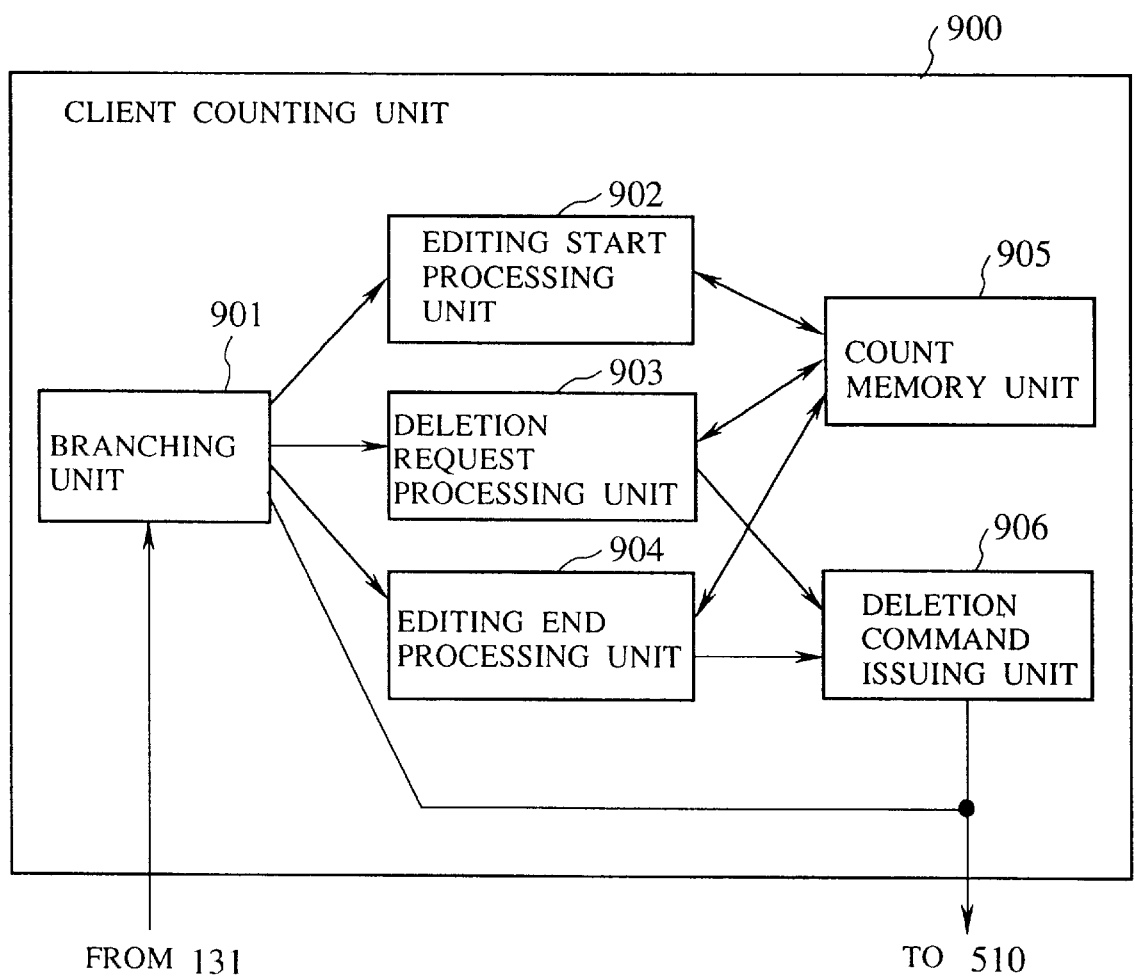
FIG. 26 is a block diagram of a client counting unit in the system of FIG. 25.

As shown in FIG. 26, this client counting unit 900 comprises a branching unit 901, an editing start processing unit 902, a deletion request processing unit 903, and an editing end processing unit 904, a count memory unit 905, and a deletion command issuing unit 906.

The basic functions of this client counting unit 900 include the counting how many clients are editing each version of each file in correspondence to each version of each file managed by the file management server 95, and the delaying of the execution of a deletion of a version when the deletion of a certain version of a certain file is requested from a certain client but the count value for that version of that file counted by the client counting means 900 is not equal to 0, until that count value becomes 0.

Here, the basic role of the count memory unit 905 in the client counting unit 900 is that, for each version of each file, it stores the count value (an integer) and a deletion delay flag (1 bit indicating truth or false) in correspondence. The count value is a counter for counting how many clients are editing that version of that file, while the deletion delay flag is a flag for indicating that the execution of the deletion is delayed because the count value is not equal to 0.

Figure 27:
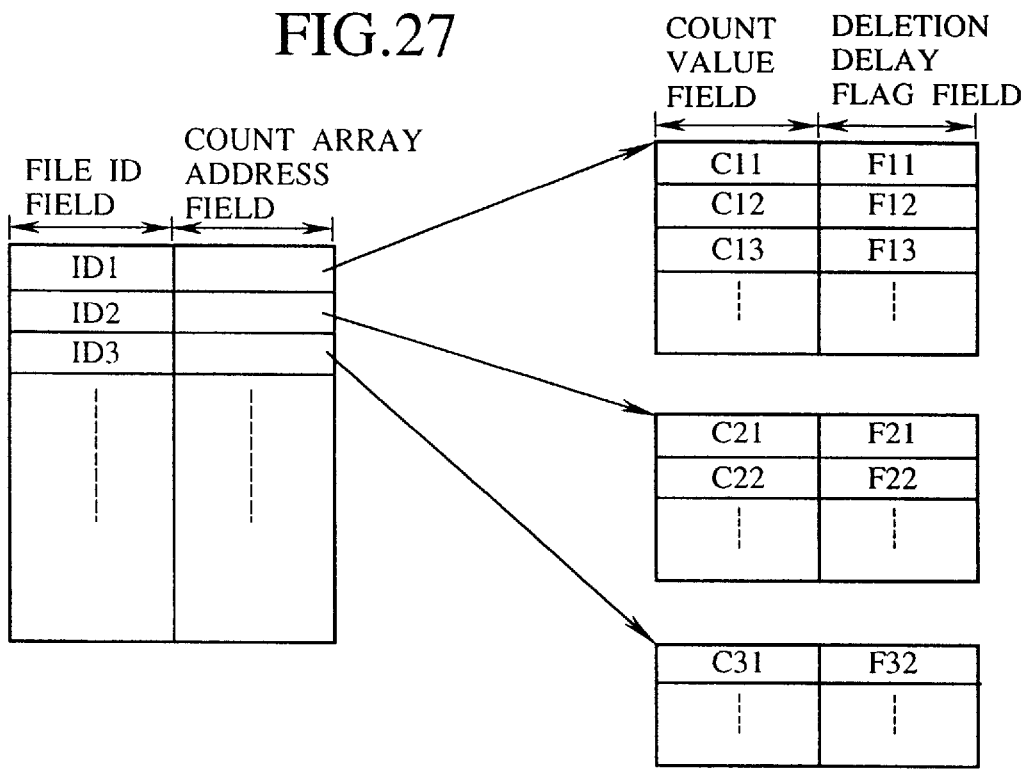
FIG. 27 is a diagram for explaining an exemplary data structure for a count memory unit in the client counting unit of FIG. 26.

An exemplary data structure of the data stored in the count memory unit 905 is shown in FIG. 27, which is in a form of array in two steps. The array of the first step sets a correspondence between the file IDs and the arrays of the second step, which is in a form of an array of entries where each entry has a pair of the file ID and a count array address. Each array of the second step stores the count values and the deletion delay flags for different versions of each file, which is in a form of an array of entries where each entry has a pair of the count value and the deletion delay flag. In this array of the second step, the version number is used for indexing the array. Thus, for example, C11, C12, and C13 shown in FIG. 27 are the count values for the versions with version numbers 1, 2, and 3 of the file with the file ID1, while F11, F12, and F13 shown in FIG. 27 are the deletion delay flags for the versions with version numbers 1, 2, and 3 of the file with the file ID1. Here, the initial value of each count value is set to be 0, and the initial value of each deletion delay flag is set to be false (or a value indicating false such as "0").

In this fifth embodiment, the client 91 makes the editing start declaration to the file management server 95 immediately before starting the editing of the file. This editing start declaration is made by transmitting a command word indicating that it is the editing start declaration, followed by the file ID of the file to be a target of the editing and the version number of the version to be edited, from the client 91 to the file management server 95, through the communication path 111.

The communication data received by the file management server 95 are then entered into the branching unit 901. At the branching unit 901, the first one word of the communication data is read out, and when it is judged that it is the command word indicating that it is the editing start declaration, the following file ID and the version number in the communication data are entered into the editing start processing unit 902.

At the editing start processing unit 902, when the input from the branching unit 901 is received, an access to the count memory unit 905 is made to increase the count value corresponding to the specified version of the specified file ID by one.

On the other hand, the communication data received at the branching unit 901 are also given to the record management unit 510 either as they are or as the file ID and the version number are processed appropriately. Then, after the editing start declaration is processed as described above, the editing of the file by the client 91 is carried out, At this point, the file editing mechanism is similar to that in the configuration of FIG. 13 described above.

Next, a processing mechanism for a case of deleting a version of a file will be described, In this fifth embodiment, the version deletion request is also made by transmitting a command word indicating that it is the version deletion request, followed by the file ID of the file to be a target of the deletion and the version number of the version to be deleted, from the client 91 to the file management server 95, through the communication path 111.

The communication data received by the file management server 95 are then entered into the branching unit 901. At the branching unit 901, the first one word of the communication data is read out, and when it is judged that it is the command word indicating that it is the version deletion request, the following file ID and the version number in the communication data are entered into the deletion request processing unit 903.

Figure 28:
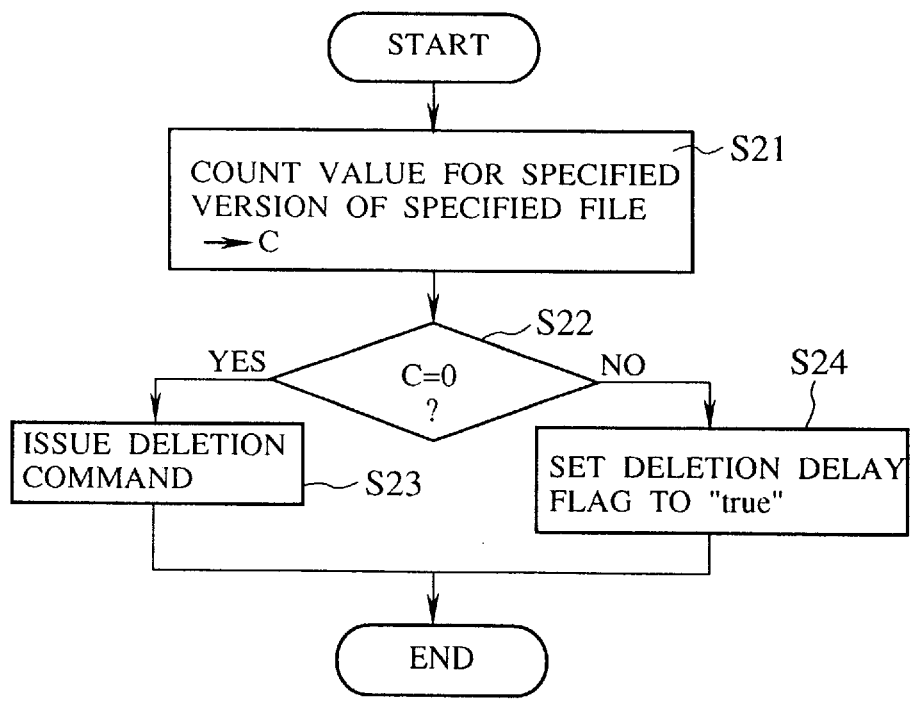
FIG. 28 is a flow chart for an operation of a deletion request processing unit in the client counting unit of FIG. 26.

At the deletion request processing unit 903, when the input from the branching unit 901 is received, the processing according to the flow chart of FIG. 28 is carried out as follows.

At the deletion request processing unit 903, the count memory unit 905 is accessed first, and the count value C for the specified version number of the specified file ID is obtained (step S21).

Next, whether that count value C is equal to 0 or not is judged (step S22). When that count value C is equal to 0, the command for deleting the specified version of the specified file is issued from the deletion command issuing unit 906 to the record management unit 510 (step S23), whereas when that count value C is not equal to 0, the count memory unit 905 is accessed and the deletion delay flag for the specified version number of the specified file ID is set to be true (or a value indicating true such as "1") (step S24).

Next, the processing at an end of the editing will be described. In this fifth embodiment, the client 91 makes the editing end declaration to the file management server 95 immediately after ending the editing of the file. This editing end declaration is made by transmitting a command word indicating that it is the editing end declaration, followed by the file ID of the file for which the editing is finished and the version number of the version for which the editing is finished, from the client 91 to the file management server 95, through the communication path 111.

The communication data received by the file management server 95 are then entered into the branching unit 901. At the branching unit 901, the first one word of the communication data is read out, and when it is judged that it is the command word indicating that it is the editing end declaration, the following file ID and the version number in the communication data are entered into the editing end processing unit 904. Here, whenever necessary, the communication data received at the branching unit 901 are also given to the record management unit 510 either as they are or as the file ID and the version number are processed appropriately.

Figure 29:
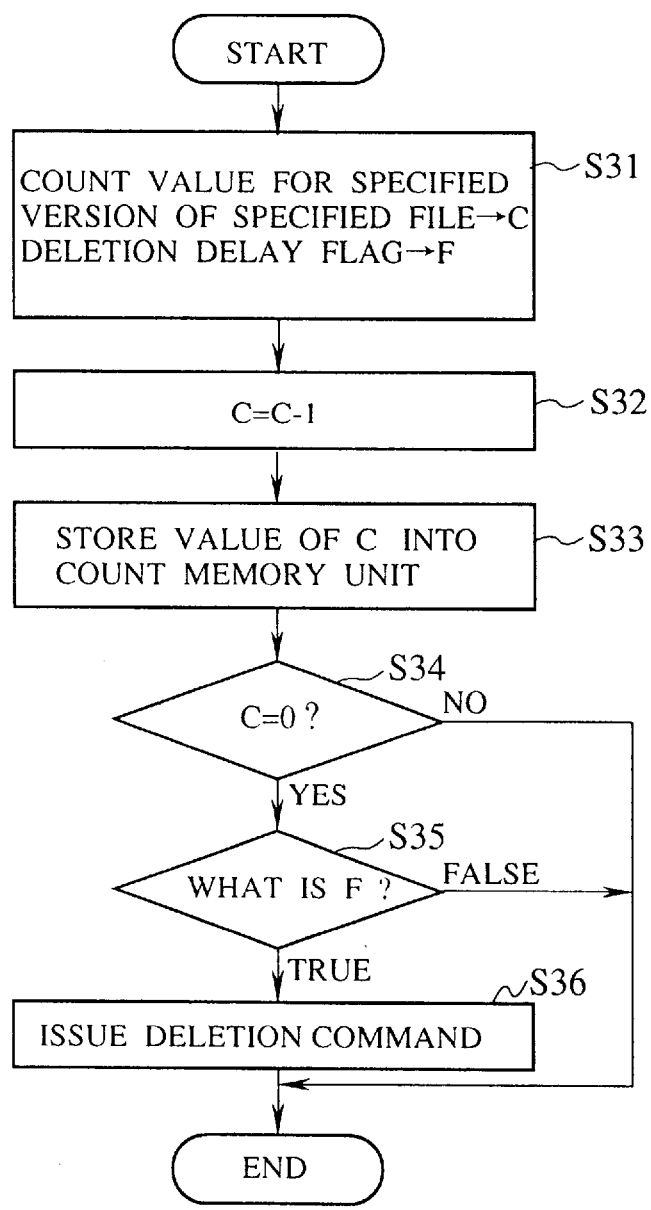
FIG. 29 is a flow chart for an operation of an editing end processing unit in the client counting unit of FIG. 26.

At the editing end processing unit 904, when the input from the branching unit 901 is received, the processing according to the flow chart of FIG. 29 is carried out as follows.

At the editing end processing unit 904, the count memory unit 905 is accessed first, and the count value C and the deletion delay flag F for the specified version number of the specified file ID is obtained (step S31). Then, that count value C is reduced by one (step S32), and the resulting count value C is stored into count memory unit 905 (step S33).

Next, whether that count value is equal to 0 or not is judged (step S34). When that count value C is not equal to 0, the processing at the editing end processing unit 904 is finished. On the other hand, when that count value C is equal to 0, whether that deletion delay flag F is true or false is judged (step S35). When that deletion delay flag F is false, the processing at the editing end processing unit 904 is finished. On the other hand, when that deletion delay flag F is true, the command for deleting the specified version of the specified file is issued from the deletion command issuing unit 906 to the record management unit 510 (step S36).

It is to be noted that, at the branching unit 901, when the first one word of the communication data is read out, and when it is judged as none of the command words for the editing start declaration, the version deletion request, and the editing end declaration described above, the communication data are entered into the record management unit 510 as they are.

Next, an exemplary deletion command execution processing at the record management unit 510 will be described. Here, the deletion command processing procedure differs depending on which one of the difference pile up scheme, the RCS scheme, and the modified SCCS scheme is used by the record management unit 510, so that an example for each of these three cases will be described one by one.

In the following explanation, the following symbols will be used.

r: a version number of the deletion target version f: a version number of the oldest version stored by the record management unit 510 among the records for the target file (In many cases, f=1, but when the version 1 had been deleted by the version deletion command in the past, f may take a value other than 1)

n: a version number of the latest version (current version) stored by the record management unit 510 among the records for the target file p(x): a version number of a version immediately previous to a certain version x among the versions stored by the record management unit 510 (In many case, p=x−1, but if the version x−1 had been deleted in the past, p=x−2, and if the version x−2 had also been deleted in the past, p=x−3, and so on)

s(x): a version number of a version immediately subsequent to a certain version x among the versions stored by the record management unit 510 (In many case, s=x+1, but if the version x+1 had been deleted in the past, s=x+2, and if the version x+2 had also been deleted in the past, s=x+3, and so on)

V[x]: (content of) version x

V[x]−V[y]: a difference between version x and version y

Figure 30:
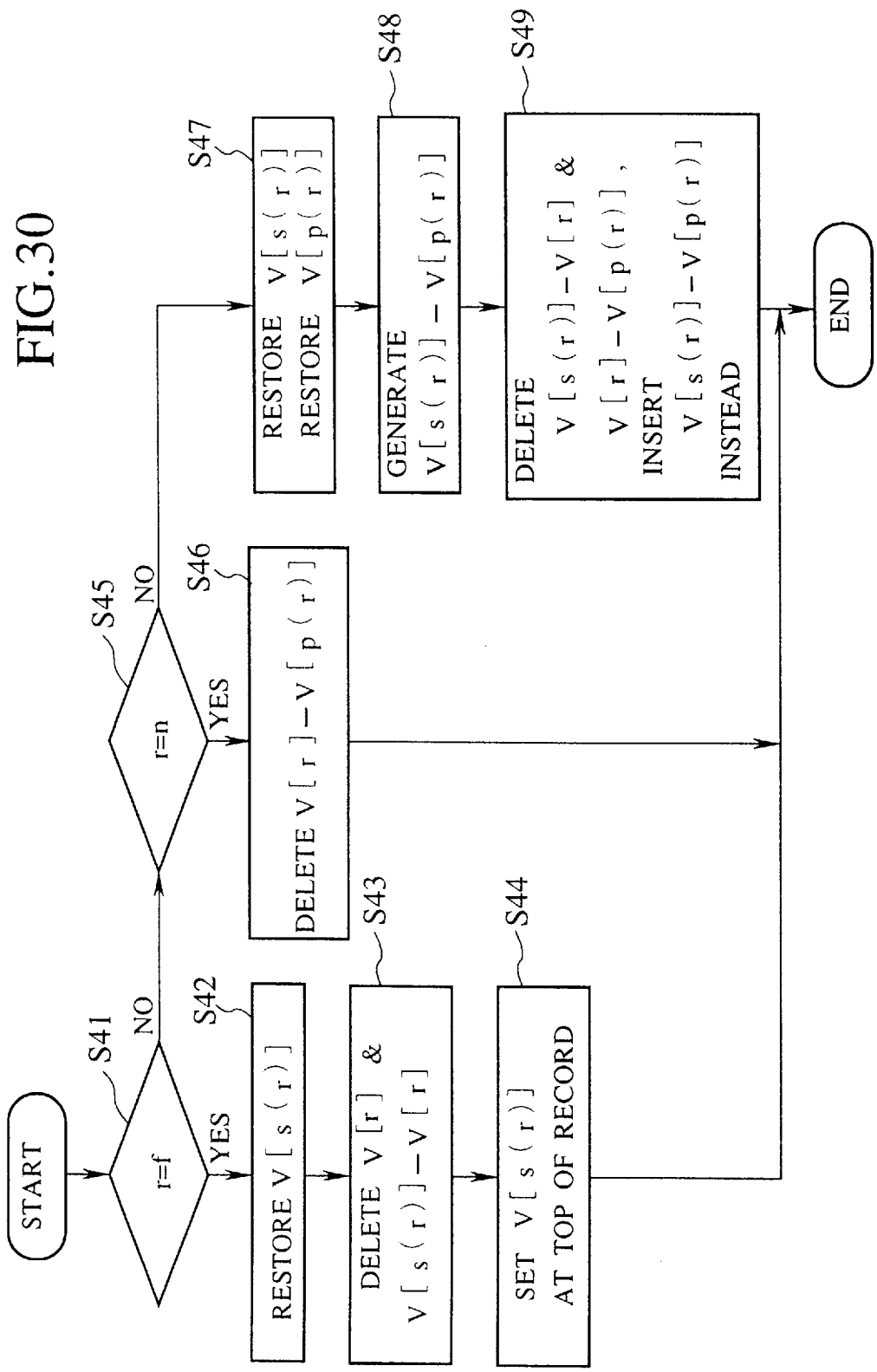
FIG. 30 is a flow chart for a deletion command execution processing by a record management unit in the system of FIG. 25 for a case of using the difference pile up scheme of FIG. 2.

First, a case in which the record management unit 510 is carrying out the record management according to the difference pile up scheme will be explained. FIG. 30 shows a flow chart for the deletion command execution processing in this case.

(i) A case in which the deletion target is not the first version of the records or the current version (a case of r≠f at the step S41 and r≠n at the step S45)

In this case, the previous version (V[p(r)]) and the subsequent version (V[s(r)]) of the deletion target version are restored (step S47), a difference (V[s(r)]−V[p(r)]) between these two versions is obtained (step S48), and the differences (V[s(r)]−V[r]) and (V[r]−V[p(r)]) of the deletion target version with respect to its previous and subsequent versions are replaced by the obtained difference (V[s(r)]−V[p(r)]) (step S49).

(ii) A case in which the deletion target is the first version of the records (a case of r=f at the step S41)

In this case, the subsequent version (V[s(r)]) of the deletion target version is restored (step S42), the first version (V[r]) of the records and a difference between the first version and its subsequent version (V[s(r)]−V[r]) are deleted (step S43), and V[s(r)] is set to be a new first version of the records (step S44).

(iii) A case in which the deletion target is the last version (current version) of the records (a case of r=n at the step S45)

In this case, a difference (V[r]−V[p(r)]) between that version and its previous version is deleted (step S46).

Figure 31:
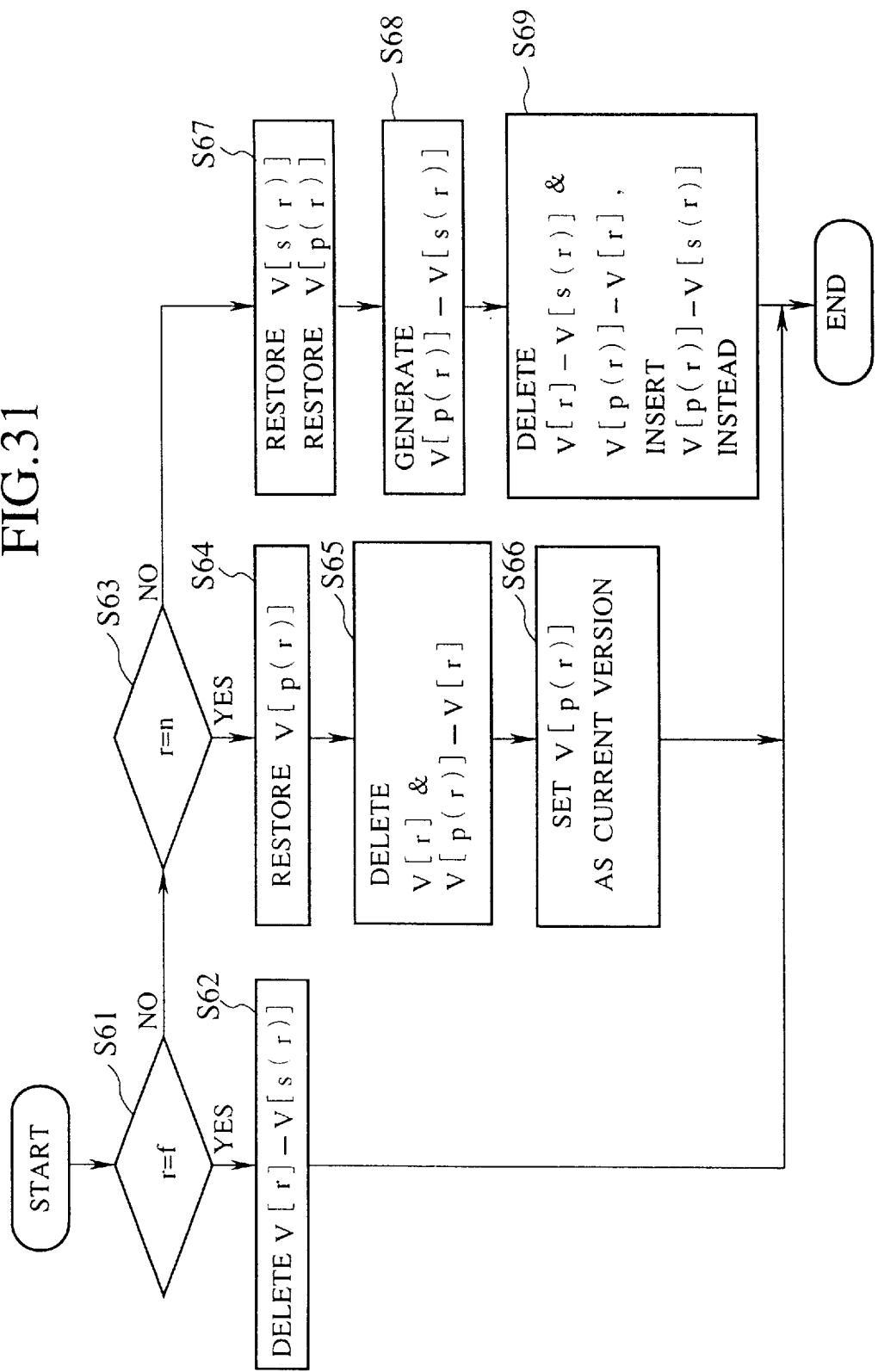
FIG. 31 is a flow chart for a deletion command execution processing by a record management unit in the system of FIG. 25 for a case of using the RCS scheme of FIG. 3.

Next, a case in which the record management unit 510 is carrying out the record management according to the RCS scheme will be explained. FIG. 31 shows a flow chart for the deletion command execution processing in this case.

(i) A case in which the deletion target is not the first version of the records or the current version (a case of r≠f at the step S61 and r≠n at the step S65)

In this case, the previous version (V[p(r)]) and the subsequent version (V[s(r)]) of the deletion target version are restored (step S67), a difference (V[p(r)]−V[s(r)]) between these two versions is obtained (step S68), and the differences (V[p(r)]−V[r]) and (V[r]−V[s(r)]) of the deletion target version with respect to its previous and subsequent versions are replaced by the obtained difference (V[p(r)]−V[s(r)]) (step S69).

(ii) A case in which the deletion target is the first version of the records (a case of r=f at the step S61)

In this case, a difference (V[r]−V[s(r)]) between that version and its previous version is deleted (step S62).

(iii) A case in which the deletion target is the last version (current version) of the records (a case of r=n at the step S63)

In this case, the previous version (V[p(r)]) of the current version is restored (step S64), a difference between the current version and its previous version (V[p(r)]−V[r]) is deleted (step S65), and V[p(r)] is set to be a new current version (step S66).

Figure 32:
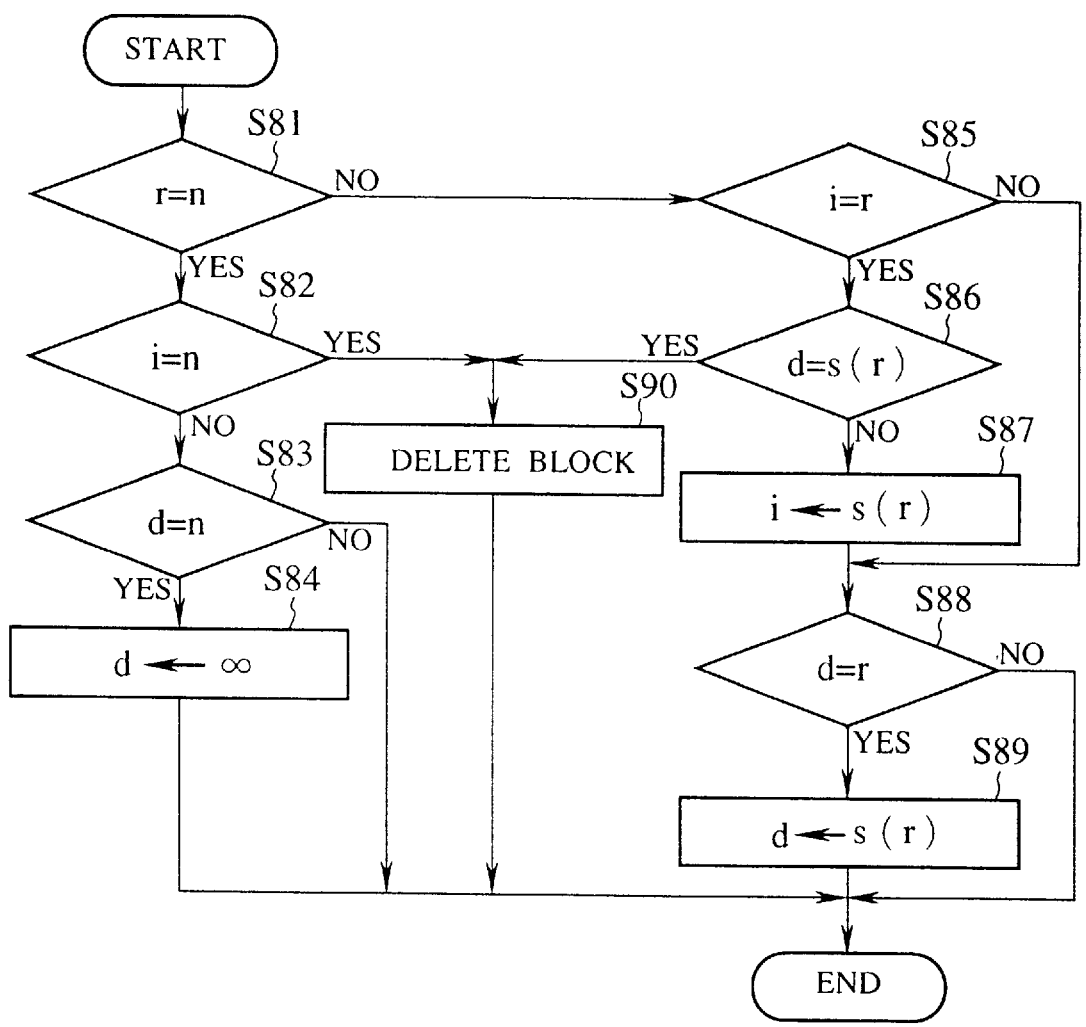
FIG. 32 is a flow chart for a deletion command execution processing by a record management unit in the system of FIG. 25 for a case of using the modified SCCS scheme of FIG. 4.

Next, a case in which the record management unit 510 is carrying out the record management according to the modified SCCS scheme will be explained. FIG. 32 shows a flow chart for the deletion command execution processing in this case. Here, the flow chart of FIG. 32 shows the deletion processing procedure for one block constituting the record. The deletion processing at the record management unit 510 is carried out by applying this procedure to all the blocks which contain the deletion target version.

In the following explanation, the following symbols will also be used.

i: a creation time of a block which is a processing target d: a deletion time of a block which is a processing target Here, the block which is not yet deleted even in the current version will be designated by d=∞.

(i) A case in which the deletion target is not the current version (a case of r≠n at the step S81)

In this case, for those blocks which existed only in the deletion target version (i=r at the step S85 and d=s(r) at the step S86), these blocks are deleted from the record data (step S90).

For those blocks which are created in the deletion target version (i=r at the step S85 and d≠s(r) at the step S86), these blocks are regarded as created in the subsequent version (V[s(r)]) of the deletion target version (step S87).

For those blocks which are deleted in the deletion target version (i≠r at the step S85 and d=r at the step S88), these blocks are regarded as deleted in the subsequent version (V[s(r)]) of the deletion target version (step S89).

(ii) A case in which the deletion target is the current version (a case of r=n at the step S81)

In this case, for those blocks which are created in the current version (i=n at the step S82), these blocks are deleted from the record data (step S90).

For those blocks which are deleted in the current version (i≠n at the step S82 and d=n at the step S83), these blocks are regarded as the blocks which have not been deleted (d=∞) (step S84).

Here, after the above processing is applied to all the blocks, for arbitrary neighboring two blocks in the records, if they have the identical creation time and the identical deletion time, these two blocks may be united together.

It is to be noted that, in the above, a case of deleting one version by one deletion command has been explained, but even in the general version management system, by processing the deletion request for a plurality of versions by decomposing it into a plurality of deletion commands for each one of the target versions, it is easy to obtain the similar effect as providing a function to delete a plurality of versions by one deletion command, As described, according to this fifth embodiment, a number of clients who are editing each version of each file is stored for each version of each file, and the execution of the deletion is delayed until no client remains to be editing the deletion target version of the target file, even when there is a request for deleting that version of that file from the user, so that no client can delete the version during the editing, and therefore it is possible to realize the asynchronous editing system in which the merge processing can be executed without a trouble.

Here, the deletion of the record in this fifth embodiment has been made as the deletion request is issued from the client to the file management server, but it is also possible to consider a configuration in which the deletion request is generated from element other than the client. For example, for any record for which a prescribed period of time has elapsed since its creation, the deletion request can be generated automatically within the server, Also, in a case it is sufficient to support the asynchronous editing for the latest version alone, and no editing for the past versions is included, it suffices to use a configuration in which the deletion request for a previous version is generated automatically within the server at a timing of a creation of a new version.

It is to be noted that this fifth embodiment has been a case in which the client counting unit is added to a configuration of FIG. 13 in which the file content secrecy function and the asynchronous editing function are implemented on the client server type system, but it is also possible to add the client counting unit to a configuration of FIG. 16 or FIG. 20 in which the asynchronous editing function is implemented on the client server type system. In such a case, a configuration and a function of the client counting unit can be substantially the same as described above for a case of using a configuration of FIG. 13.

Next, the sixth embodiment of a shared file editing system according to the present invention will be described in detail. In this sixth embodiment, the shared file editing system of FIG. 13, FIG. 16, or FIG. 20 described above is further equipped, when the block data of a certain file are enciphered, with a function for delaying an execution of a deletion of a version in response to a deletion request for a certain version of a certain file, until no client remains to be editing that certain version of that certain file as in FIG. 25 described above, and an additional function for reconstructing the block data of that certain file.

As mentioned above, in the system employing the record management, it is possible to provide a function for deleting some versions among the records. This sixth embodiment provides a function for deleting the record of a certain version when the block data are enciphered. In addition, this sixth embodiment also provides a function for reducing a number of blocks by reconstructing the block data.

In order to realize such additional functions, in this sixth embodiment, the client is provided with means for reconstructing the block data of the file. By this means, the client can delete the record of a certain version and reconstruct the file data into the desired blocks.

Figure 33:
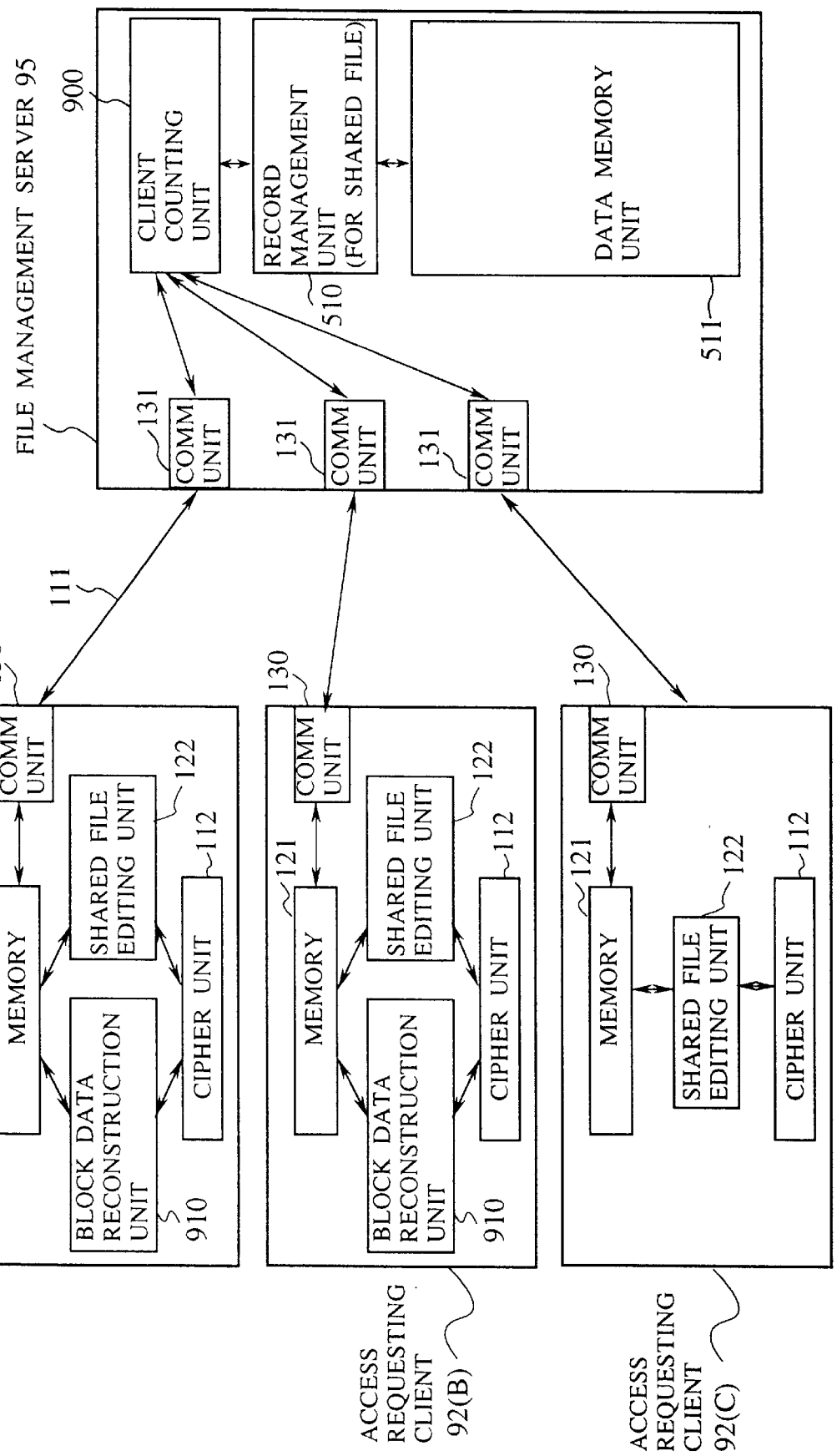
FIG. 33 is a block diagram of the sixth embodiment of shared file editing system according to the present invention.

FIG. 33 shows a configuration of the shared file editing system of this sixth embodiment as outlined above, which is based on the shared file editing system of FIG. 25 described above.

In this configuration of FIG. 33, the file management server 95 and the communication path 111 are substantially similar as those in FIG. 25. Each access requesting client 92 differs from that of FIG. 25 in that it further includes a block data reconstruction unit 910. Here, this block data reconstruction unit 910 may not necessarily be provided in every one of the clients 92 of the system. Thus, in this sixth embodiment, the version deletion request for a certain file is executed when the count value of the client counting unit 900 is equal to 0, just as in the fifth embodiment described above.

Now, an exemplary execution processing for deleting the record of a certain version in a case the block data are enciphered will be explained. Here, the version deletion processing procedure differs depending on which one of the difference pile up scheme, the RCS scheme, and the modified SCCS scheme is used by the record management unit 510, so that an example for each of these three cases will be described one by one.

In the following explanation, the following symbols will be used.

r: a version number of the deletion target version f: a version number of the oldest version stored by the record management unit 510 among the records for the target file (In many case, f=1, but when the version 1 had been deleted by the version deletion command in the past, f may take a value other than 1)

n: a version number of the latest version (current version) stored by the record management unit 510 among the records for the target file p(x): a version number of a version immediately previous to a certain version x among the versions stored by the record management unit 510 (In many case, p=x−1, but if the version x−1 had been deleted in the past, p=x−2, and if the version x−2 had also been deleted in the past, p=x−3, and so on)

s(x): a version number of a version immediately subsequent to a certain version x among the versions stored by the record management unit 510 (In many case, s=x+1, but if the version x+1 had been deleted in the past, s=x+2, and if the version x+2 had also been deleted in the past, s=x+3, and so on)

V[x]: (content of) version x

V[x]−V[y]: a difference between version x and version y

Figure 34:
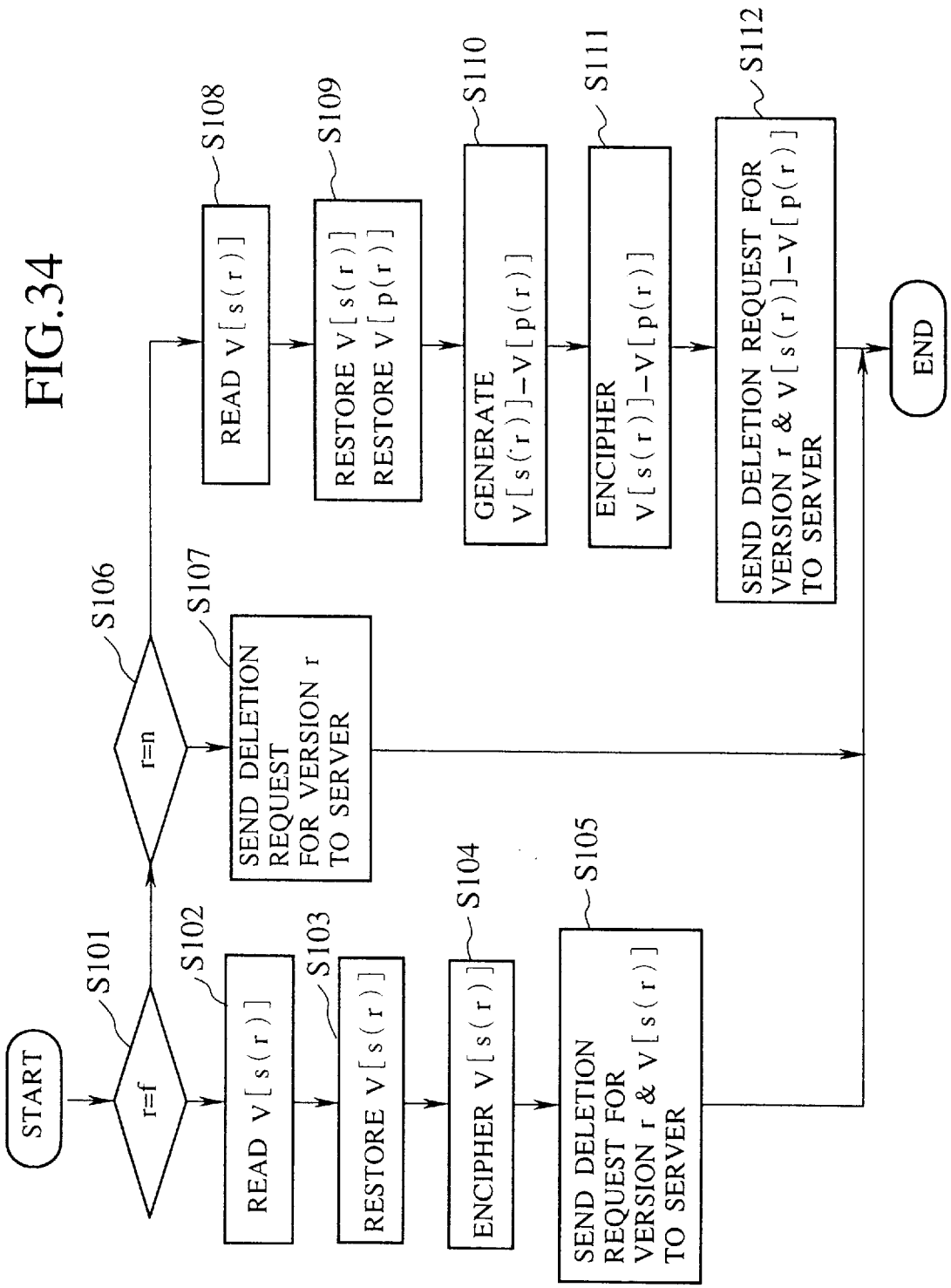
FIG. 34 is a flow chart for an operation of a block data reconstruction unit in the system of FIG. 33 during a deletion command execution processing in the system of FIG. 33 for a case of using the difference pile up scheme of FIG. 2.
Figure 35:
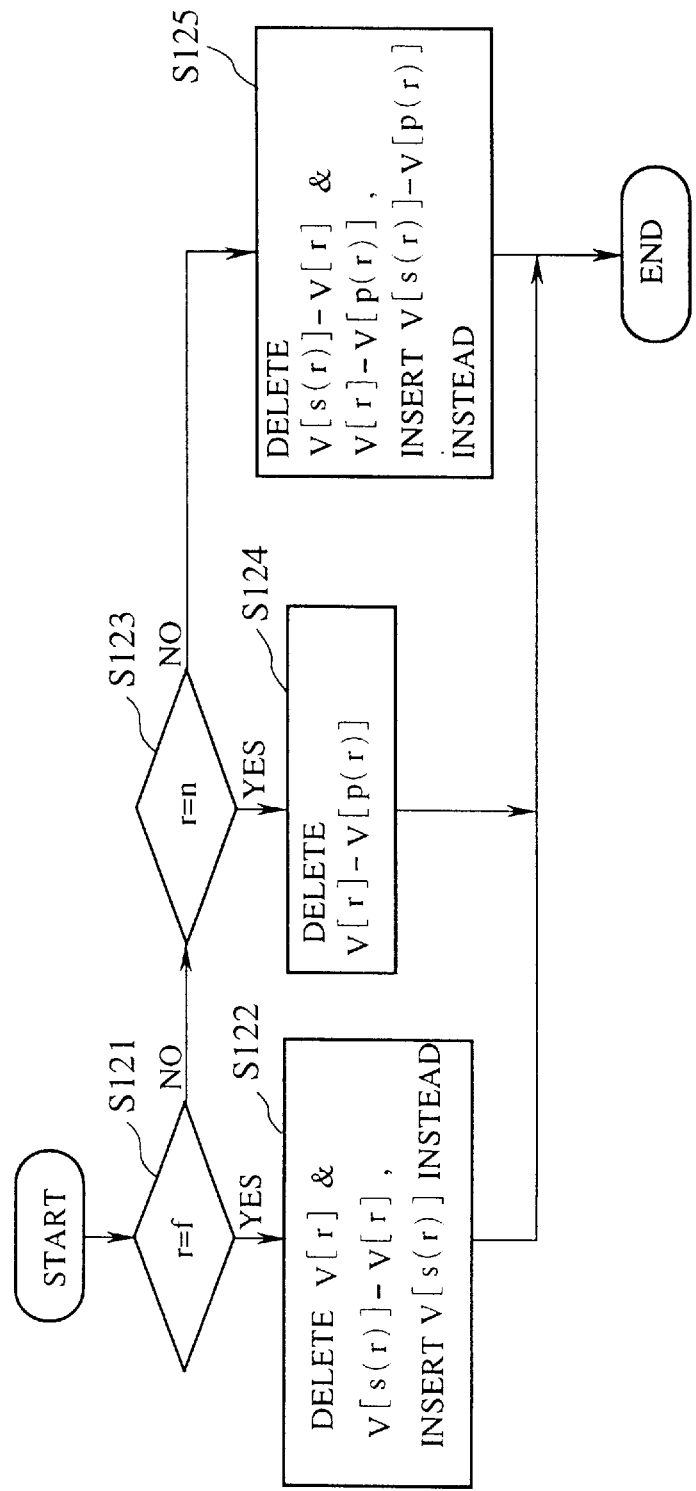
FIG. 35 is a flow chart for an operation of a record management unit in the system of FIG. 33 during a deletion command execution processing in the system of FIG. 33 for a case of using the difference pile up scheme of FIG. 2.

First, a case in which the record management unit 510 is carrying out the record management according to the difference pile up scheme will be explained. FIG. 34 shows a flow chart for the processing procedure at the block data reconstruction unit 910 in the client 92 in this case, while FIG. 35 shows a flow chart for the processing procedure at the record management unit 510 in the server 95 which received the deletion request from the client 92 in this case.

First, the processing procedure of the client 92 will be described with reference to FIG. 34.

(i) A case in which the deletion target is not the first version of the records or the current version (a case of r≠f at the step S101 and r≠n at the step S106)

In this case, the subsequent version (V[s(r)]) of the deletion target version is read out from the server 95 (step S108). Here, (a plurality of) enciphered block data are transmitted from the server 95.

Then, the transmitted block data are deciphered by the cipher unit 112, and the subsequent version (V[s(r)]) and the previous version (V[p(r)]) of the deletion target version are restored (step S109). Here, V[p(r)] can be obtained from V[s(r)] read out at the step S108.

Then, a difference (V[s(r)]−V[p(r)]) between these two versions is obtained (step S110).

Then, the obtained difference (V[s(r)]−V[p(r)]) is enciphered by the cipher unit 112 as a new block data (step S111).

Finally, this enciphered block data and the deletion request for the version r are transmitted to the server 95 (step S112).

(ii) A case in which the deletion target is the first version of the records (a case of r=f at the step S101)

In this case, the subsequent version (V[s(r)]) of the deletion target version is read out from the server 95 (step S102). Here, (a plurality of) enciphered block data are transmitted from the server 95.

Then, the transmitted block data are deciphered by the cipher unit 112, and the subsequent version (V[s(r)]) of the deletion target version is restored (step S103).

Then, the obtained (V[s(r)]) is enciphered by the cipher unit 112 as a new block data (step S104).

Finally, this enciphered block data and the deletion request for the version r are transmitted to the server 95 (step S105).

(iii) A case in which the deletion target is the last version (current version) of the records (a case of r=n at the step S106)

In this case, the deletion request for the version r is transmitted to the server 95 (step S107).

Next, the processing procedure of the server 95 which received the deletion request from the client 92 will be described with reference to FIG. 35.

(i) A case in which the deletion target is not the first version of the records or the current version (a case of r≠f at the step S121 and r≠n at the step S123)

In this case, a block data (V[s(r)]−V[r]) and a block data (V[r]−V[p(r)]) are deleted, and a block data (V[s(r)]−V[p(r)]) transmitted from the client 92 is inserted instead (step S125).

(ii) A case in which the deletion target is the first version of the records (a case of r=f at the step S101)

In this case, a block data V[r] and a block data (V[s(r)]−V[r]) are deleted, and a block data (V[s(r)] transmitted from the client 92 is inserted instead (step S122).

(iii) A case in which the deletion target is the last version (current version) of the records (a case of r=n at the step S106)

In this case, a block data (V[r]−V[p(r)]) is deleted (step S124).

By the above procedure, the record of the version r can be deleted.

Figure 36:
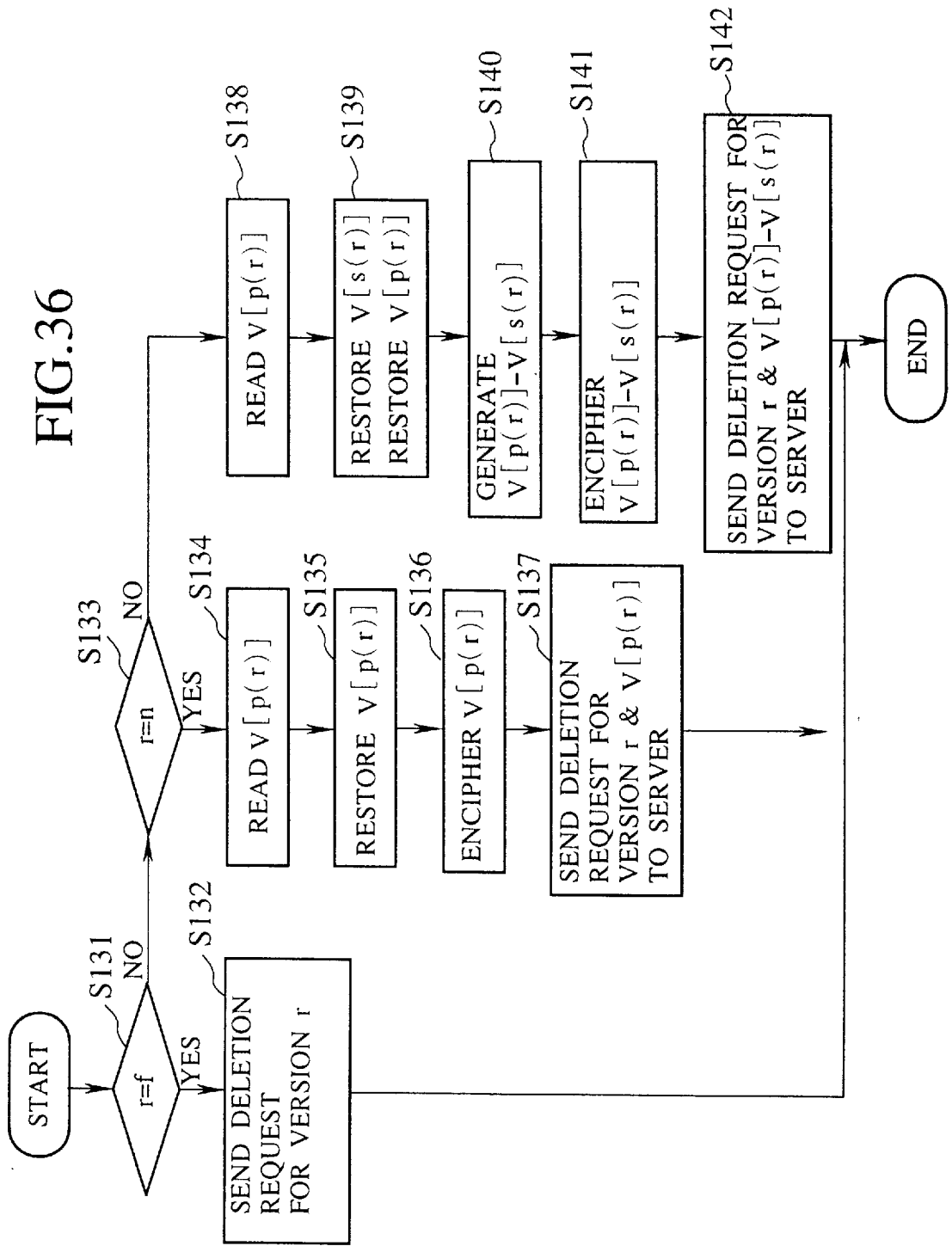
FIG. 36 is a flow chart for an operation of a block data reconstruction unit in the system of FIG. 33 during a deletion command execution processing in the system of FIG. 33 for a case of using the RCS scheme of FIG. 3.
Figure 37:
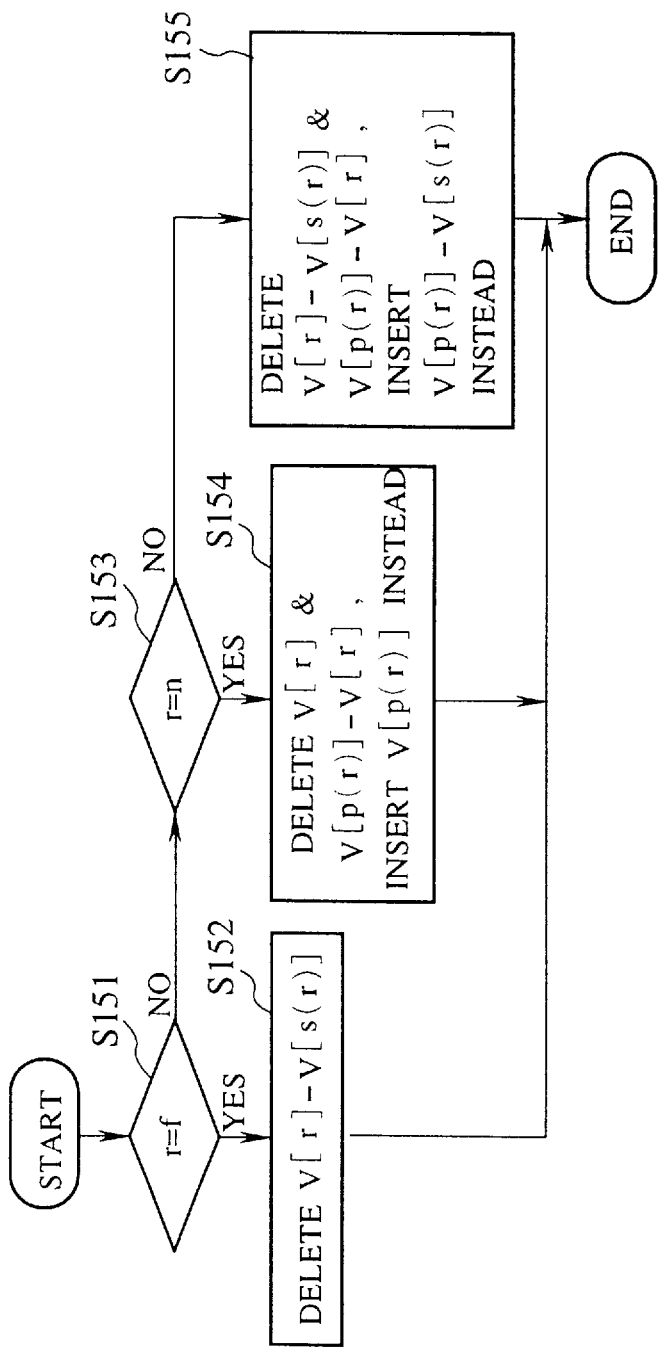
FIG. 37 is a flow chart for an operation of a record management unit in the system of FIG. 33 during a deletion command execution processing in the system of FIG. 33 for a case of using the RCS scheme of FIG. 3.

Next, a case in which the record management unit 510 is carrying out the record management according to the RCS scheme will be explained. FIG. 36 shows a flow chart for the processing procedure at the block data reconstruction unit 910 in the client 92 in this case, while FIG. 37 shows a flow chart for the processing procedure at the record management unit 510 in the server 95 which received the deletion request from the client 92 in this case.

First, the processing procedure of the client 92 will be described with reference to FIG. 36.

(i) A case in which the deletion target is not the first version of the records or the current version (a case of r≠f at the step S131 and r≠n at the step S133)

In this case, the previous version (V[p(r)]) of the deletion target version is read out from the server 95 (step S138). Here, (a plurality of) enciphered block data containing the latest version are transmitted from the server 95.

Then, the transmitted block data are deciphered by the cipher unit 112, and the subsequent version (V[s(r)]) and the previous version (V[p(r)]) of the deletion target version are restored (step S139). Here, V[s(r)] can be obtained from V[p(r)] read out at the step S138.

Then, a difference (V[p(r)]−V[s(r)]) between these two versions is obtained (step S140).

Then, the obtained difference (V[p(r)]−V[s(r)]) is enciphered by the cipher unit 112 as a new block data (step S141).

Finally, this enciphered block data and the deletion request for the version r are transmitted to the server 95 (step S142).

(ii) A case in which the deletion target is the first version of the records (a case of r=f at the step S131)

In this case, the deletion request for the version r is transmitted to the server 95 (step S132).

(iii) A case in which the deletion target is the last version (current version) of the records (a case of r=n at the step S133)

In this case, the previous version (V[p(r)]) of the deletion target version is read out from the server 95 (step S134). Here, (a plurality of) enciphered block data containing the latest version are transmitted from the server 95.

Then, the transmitted block data are deciphered by the cipher unit 112, and the previous version (V[p(r)]) of the deletion target version is restored (step S135).

Then, the obtained (V[p(r)]) is enciphered by the cipher unit 112 as a new block data (step S136).

Finally, this enciphered block data and the deletion request for the version r are transmitted to the server 95 (step S137).

Next, the processing procedure of the server 95 which received the deletion request from the client 92 will be described with reference to FIG. 37.

(i) A case in which the deletion target is not the first version of the records or the current version (a case of r≠f at the step S151 and r≠n at the step S153)

In this case, a block data (V[r]−V[s(r)]) and a block data (V[p(r)]−V[r]) are deleted, and a block data (V[p(r)]−V[s(r)]) transmitted from the client 92 is inserted instead (step S155).

(ii) A case in which the deletion target is the first version of the records (a case of r=f at the step S151)

In this case, a block data (V[r]−V[S(r)]) is deleted (step S152).

(iii) A case in which the deletion target is the last version (current version) of the records (a case of r=n at the step S153)

In this case, a block data V[r] and a block data (V[p(r)]−V[r]) are deleted, and a block data V[p(r)] transmitted from the client 92 is inserted instead (step S154).

By the above procedure, the record of the version r can be deleted.

Next, a case in which the record management unit 510 is carrying out the record management according to the modified SCCS scheme will be explained. As mentioned above, in the modified SCCS scheme, the blocks are sequentially divided as the version progresses. When the number of blocks increases, the overhead due to the block identification information and the block processing increases, so that it is preferable not to allow a number of blocks to increase too much.

As shown in FIG. 32, in a case of carrying out the record management by the modified SCCS scheme, the record management unit 510 of the server 95 can execute the version record deletion command. Consequently, it is possible to use a configuration in which the version deletion is carried out by the record management unit 510 of the server 95, while the block reconstruction is carried out by the block data reconstruction unit 910 of the client 92. In such a case, the processing procedure is as follows.

The client 92 transmits the deletion command for the version r to the server 95 first.

Then, the record management unit 510 of the server 95 deletes the record of the version r by the procedure of FIG. 32.

Then, the client 92 reads out the files of V[s(r)] or V[n], and carries out the block reconstruction at the block data reconstruction unit 910 and the enciphering at the cipher unit 112, and then returns the reconstructed block data to the server 95. Here, the block data that can be reconstructed are those block data which are continuous in their positions and which have the identical creation time and deletion time. After these blocks are deciphered, they are reconstructed and enciphered as an arbitrary new block data, and then transmitted to the server 95.

Finally, the record management unit 510 of the server 95 replaces the old block with the transmitted new block data.

It is to be noted that the feature for reconstructing the block data according to this sixth embodiment may be incorporated into the file editing system with the file content secrecy feature alone such as that of FIG. 23 described above.

Next, the seventh embodiment of a shared file editing system according to the present invention will be described in detail. In this seventh embodiment, the shared file editing system of FIG. 13, FIG. 16, or FIG. 20 described above is further equipped with an additional function which enables the client who already possesses a certain version of a certain file to read out only necessary portion of another version newly, rather than reading the entire file of that another version.

Figure 38:
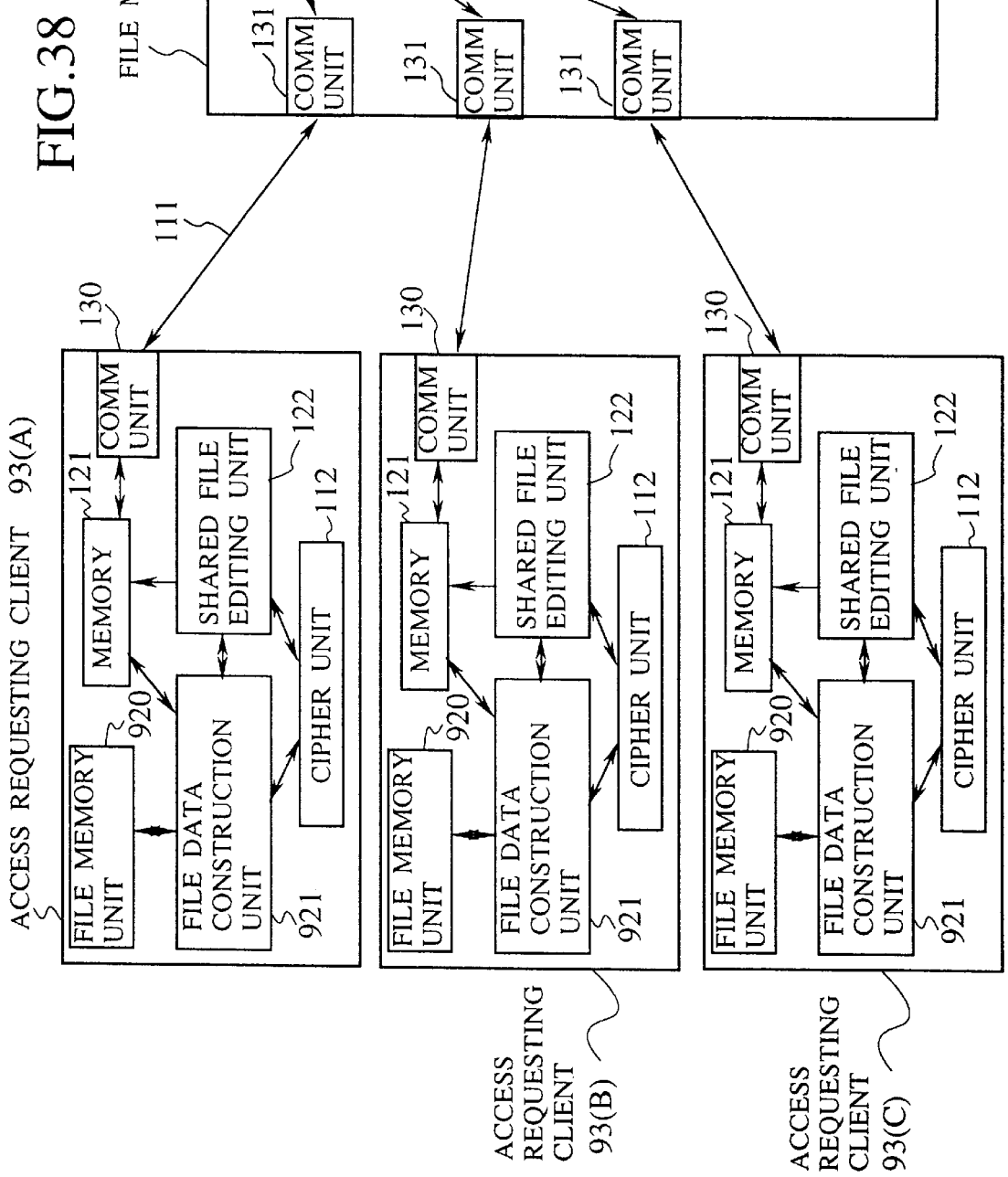
FIG. 38 is a block diagram of the seventh embodiment of a shared file editing system according to the present invention.

FIG. 38 shows a configuration of the shared file editing system of this seventh embodiment as outlined above, which is based on the shared file editing system of FIG. 13 described above.

In this configuration of FIG. 38, the communication path 111 is substantially similar as that in FIG. 13. The file management server 96 differs from that of FIG. 13 in that it further includes a difference information construction unit 930, while each access requesting client 93 differs from that of FIG. 13 in that it further includes a file memory unit 920 and a file data construction unit 921.

The client 93 stores the previously accessed file along with its version information in the file memory unit 920. In a case of reading out another version (such as the latest version) of the same file from the server 96, the client 93 notifies the currently possessed version information and the desired version information to the server 96. Then, the difference information construction unit 930 of the server 96 constructs the difference data between the desired version and the already possessed version according to the above two version informations notified from the client 93, and returns the constructed difference data to the client 93. Then, the file data construction unit 921 of the client 93 constructs the desired version from the currently possessed file data and the difference data transmitted from the server 96. Then, the constructed desired version is handed over to the shared file editing unit 122 for carrying out the editing with respect to the desired version.

In general, the difference data between versions are smaller than the data of the entire file, so that the amount of communication data can be reduced, and the high speed read out operation can be realized in this seventh embodiment.

Here, a method for constructing the difference data at the difference information construction unit 930 of the server 96 differs depending on which one of the difference pile up scheme, the RCS scheme, and the modified SCCS scheme is used by the record management unit 510, so that an example for each of these three cases will be described one by one.

In the following explanation, the following symbols will be used.

c: a version number of the file already possessed by the client 93 r: a version number of a desired version to be newly read out by the client 93

V[x]: (content of) version x

V[x]−V[y]: a difference between version x and version y

First, the processing procedure for the difference information construction unit 930 in a case in which the record management unit 510 is carrying out the record management according to the difference pile up scheme will be explained.

(i) A case of reading out a version newer than the already possessed version (r>c)

In this case, as the difference pile up scheme is a scheme which piles up the difference between versions, it suffices to select the difference block data between the version r and the version c.

(ii) A case of reading out a version older than the already possessed version (r<c)

In this case, the following two methods are available.

(a) V[r] is repeated without constructing the difference data.

In a case the block data are enciphered, the server cannot construct the difference data, so that this method should be employed.

(b) The server restores V[r] and V[c], and obtains V[r]−V[c].

This method is possible when the block data are not enciphered.

Next, the processing procedure for the difference information construction unit 930 in a case in which the record management unit 510 is carrying out the record management according to the RCS scheme will be explained. FIG. 31 shows a flow chart for the deletion command execution processing in this case.

(i) A case of reading out a version newer than the already possessed version (r>c)

In this case, the following two methods are available.

(a) V[r] is repeated without constructing the difference data.

In a case the block data are enciphered, the server cannot construct the difference data, so that this method should be employed.

(b) The server restores V[r] and V[c], and obtains V[r]−V[c].

This method is possible when the block data are not enciphered.

(ii) A case of reading out a version older than the already possessed version (r>c)

In this case, as the RCS scheme is a scheme which leaves the difference between versions in backward direction as a record, it suffices to select the difference block data between the version r and the version c.

Figure 39:
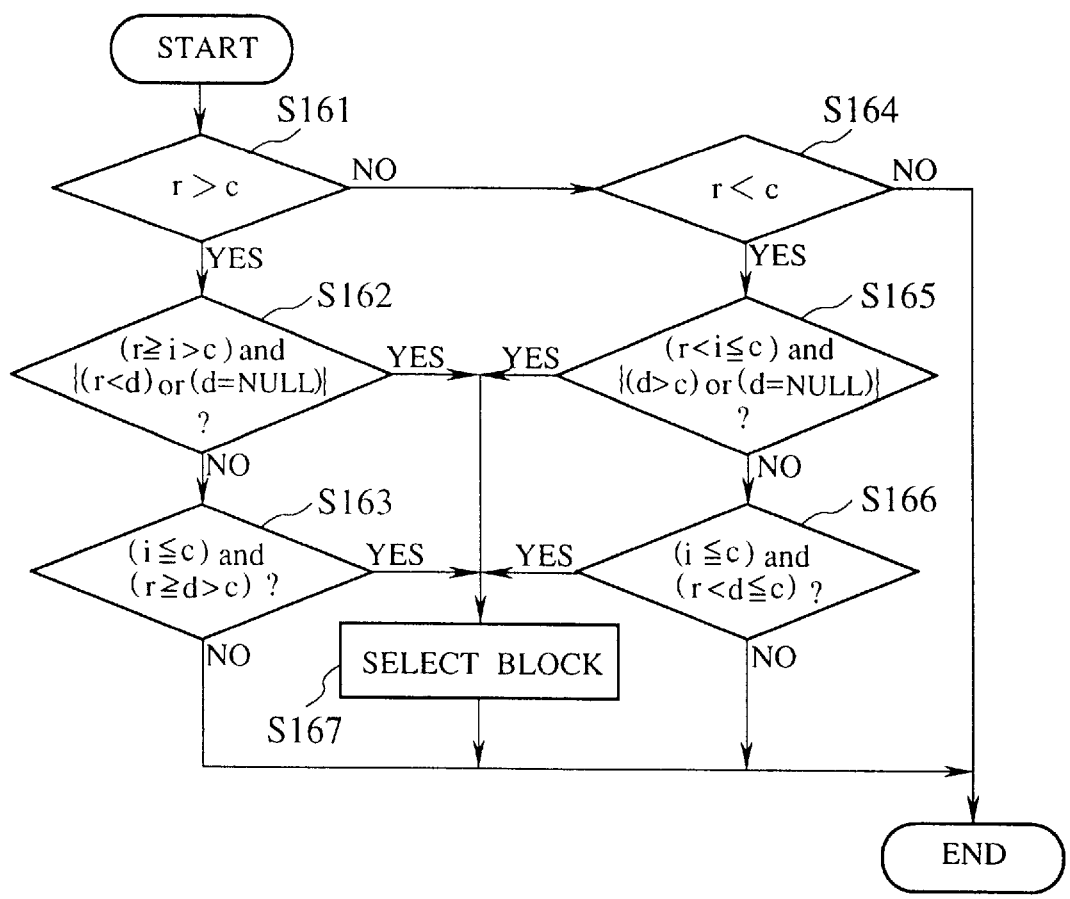
FIG. 39 is a flow chart for an operation of a difference information construction unit in the system of FIG. 38 for a case of using the modified SCCS scheme of FIG. 4.

Next, the processing procedure for the difference information construction unit 930 in a case in which the record management unit 510 is carrying out the record management according to the modified SCCS scheme will be explained. FIG. 39 shows a flow chart for the processing procedure for the difference information construction unit 930 to select the difference block from the blocks constituting the record of the file. Here, the flow chart of FIG. 39 shows the difference block selection processing procedure for one block constituting the record. The difference block selection processing at the difference information construction unit 930 is carried out by applying this procedure to all the blocks.

In the following explanation, the following symbols will also be used.

i: a creation version number of a block which is a processing target d: a deletion version number of a block which is a processing target Here, the block which is not yet deleted will be designated by d=NULL.

(i) A case of reading out a version newer than the already possessed version (r>c at the step S161)

In this case, a block satisfying either one of the following two conditions is selected (step S167).

(a) A block which has been created during a period from the version c to the version r, and which has not been deleted at a time of the version r, i.e., (r≧i>c) and {(r<d) or (d=NULL)} (step S162).

(b) A block which had already been created at a time of the version c and which had been deleted during a period from the version c to the version r, i.e., (i≦c) and (r≧d>c) (step S163).

(ii) A case of reading out a version older than the already possessed version (r<c at the step S164)

In this case, a block satisfying either one of the following two conditions is selected (step S167).

(a) A block which has been created during a period from the version r to the version c, and which has not been deleted at a time of the version c, i.e., (r<i≦c) and {(d<c) or (d=NULL)} (step S165).

(b) A block which had already been created at a time of the version c and which had been deleted during a period from the version r to the version c, i.e., (i≧c) and (r<d≦c) (step S166).

After selecting the difference block by the above procedure, the difference information construction unit 930 converts the selected difference block data into the difference information with respect to the version already possessed by the client 93, and transmits the obtained change information to the client 93. For example, for the insertion data, the insertion position with respect to the version possessed by the client 93 is obtained and transmitted together with the insertion block data. For the deletion data, the deletion range with respect to the version possessed by the client 93 is obtained and transmitted as it is. By means of this, the client 93 can construct the desired version easily, and the amount of communication data from the server 96 to the client 93 can be kept small.

It is to be noted that the feature for constructing the desired version on the client side according to this seventh embodiment may be incorporated into the file editing system with the file content secrecy feature alone such as that of FIG. 23 described above.

Next, the eighth embodiment of a shared file editing system according to the present invention will be described in detail. In this eighth embodiment, the shared file editing system of FIG. 13, FIG. 16, or FIG. 20 described above which has the asynchronous editing function is further equipped with an additional function for handling the conflict in editing due to asynchronously occurring write operations from a plurality of clients with respect to a certain file.

Figure 40:
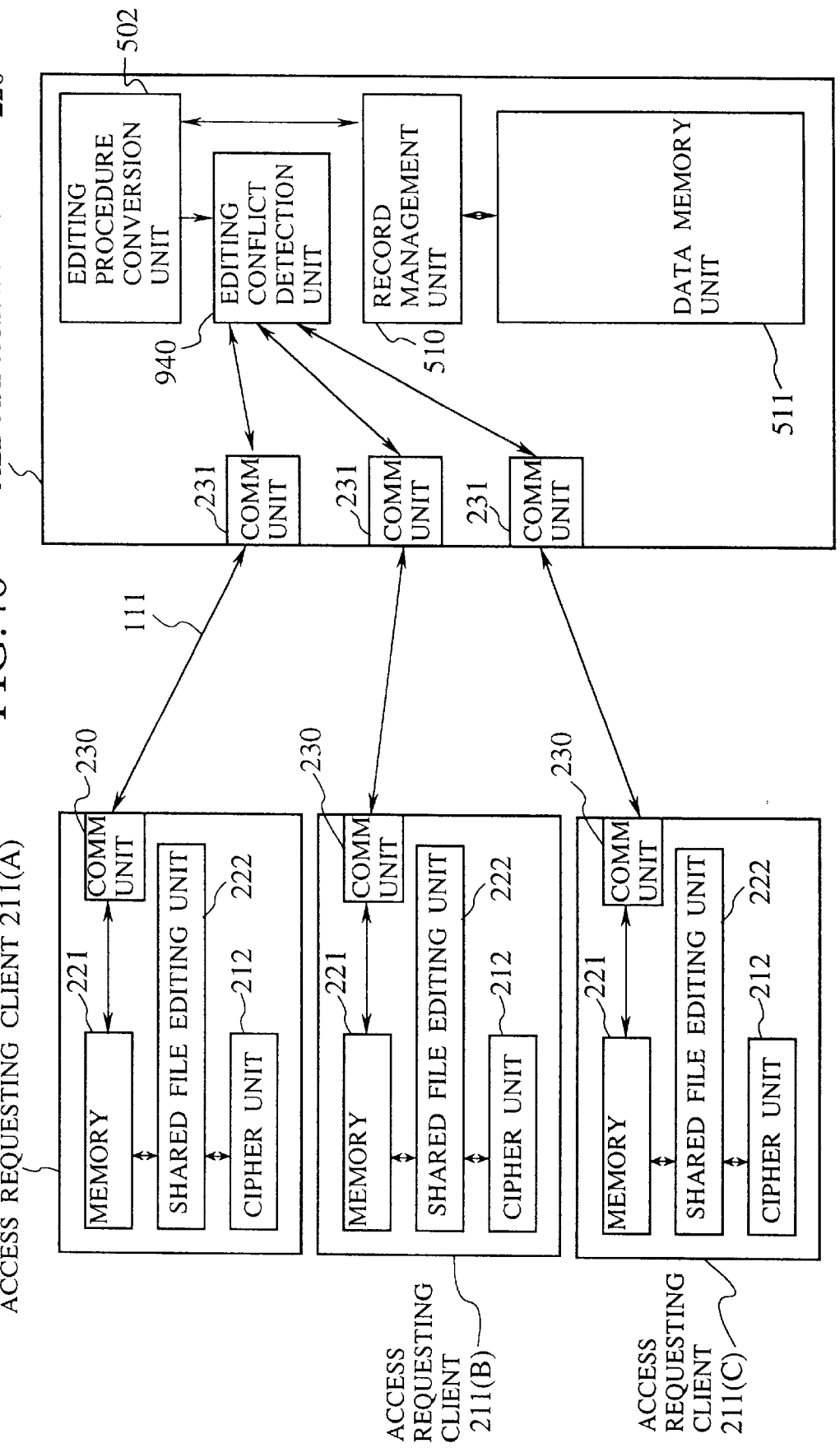
FIG. 40 is a block diagram of the eighth embodiment of a shared file editing system according to the present invention.

FIG. 40 shows a configuration of the shared file editing system of this eighth embodiment as outlined above, which is based on the shared file editing system of FIG. 16 described above.

In this configuration of FIG. 40, each access requesting client 211 and the communication path 111 are substantially similar as those in FIG. 16. The file management server 220 differs from that of FIG. 16 in that it further includes an editing conflict detection unit 940.

In this eighth embodiment, just as in a case of FIG. 16, the data write requests from a plurality of the clients 211 occur at various timings. At the server 220, the write request from each client 211 is converted into the position data with respect to the latest version at that timing by the editing procedure conversion unit 502. Then, at the editing conflict detection unit 940, whether the converted editing data is in conflict with the editing result made by the other clients 211 or not is detected. The obtained detection result is then returned to that each client 211.

Here, the conflict in editing can be judged according to the following criteria for example.

(a) The insertion position of the insertion data has already been deleted.

(b) The insertion position of the insertion data has the other data already inserted.

(c) The deletion range has other data already inserted.

(d) A part of the deletion range has already been deleted.

At the record management unit 510, the detection result of the editing conflict detection unit 940 is not received, and the data transmitted from the client 211 and converted by the editing procedure conversion unit 502 are stored as the latest version.

Here, the data updating by the server 220 may be possible or impossible depending on the management scheme used by the record management unit 510 and whether or not the block data are enciphered. In a case the block data are not enciphered, the data updating by the server 220 is possible for any of the difference pile up scheme, the RCS scheme, and the modified SCCS scheme. In a case the block data are enciphered, the data updating by the server 220 is possible only for the modified SCCS scheme.

Next, the ninth embodiment of a shared file editing system according to the present invention will be described in detail. In this ninth embodiment, the shared file editing system of the eighth embodiment described above is further modified such that the editing conflict detection unit 940 notifies the detection result to the record management unit 510 and the record management unit 510 judges whether or not to carry out the data updating according to the notified detection result.

FIG. 41 shows a configuration of the shared file editing system of this ninth embodiment as outlined above, which is based on the shared file editing system of FIG. 40 described above.

In this configuration of FIG. 41, each access requesting client 211 and the communication path 111 are substantially similar as those in FIG. 40. The file management server 225 differs from that of FIG. 40 in that the output of the editing conflict detection unit 940 is also supplied to the record management unit 510.

In this ninth embodiment, when the editing conflict with the other clients does not occur, the data transmitted from the client 211 and converted by the editing procedure conversion unit 502 are stored as the latest version, whereas when the editing conflict with the other clients occurs, the data updating by the server 225 is not carried out. In this case, the latest version to which the writing was actually made can be known as free of the editing conflict with the other clients, so that there is an advantage that the contradiction in meaning is unlikely to occur. The client 211 receives the notification of the detection result obtained by the editing conflict detection unit 940, so that in a case the writing was not made, the client 211 can read out the latest version from the server and carry out a different editing which avoids the occurrence of th e conflict.

Next, the tenth embodiment of a shared file editing system according to the present invention will be described in detail. In this tenth embodiment, the shared file editing system is formed such that it can be utilized from the already existing application program.

Figure 42:
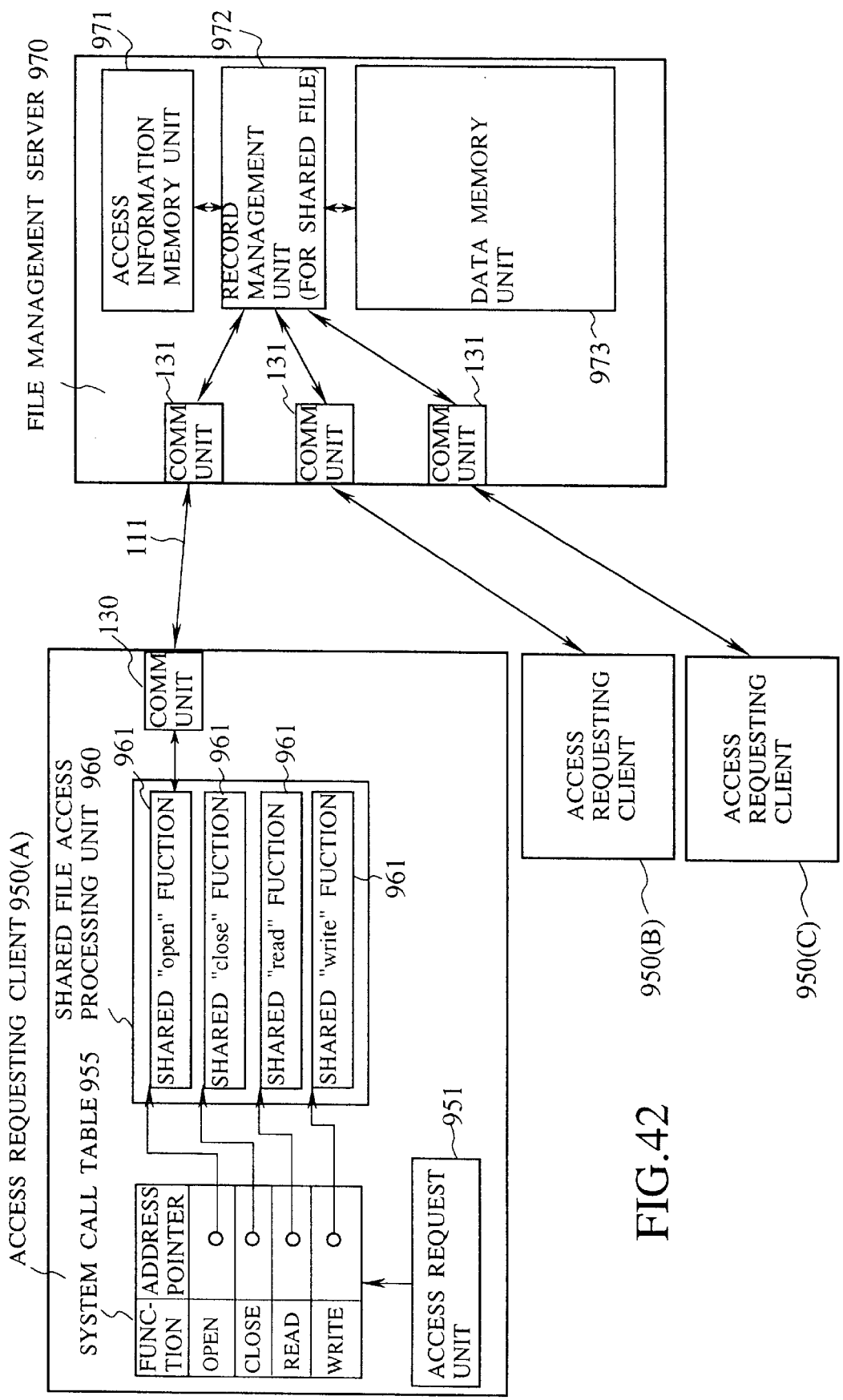
FIG. 42 is a block diagram of the tenth embodiment of a shared file editing system according to the present invention.

FIG. 42 shows a configuration of the shared file editing system of this tenth embodiment as outlined above, which generally comprises a plurality of access requesting clients 950 and a file management server 970 which are connected through a communication path 111. The file management server 970 further includes a communication (COMM) unit 131, an access information memory unit 971, a record management unit (for shared file) 972, and a data memory unit 973. Each access requesting client 950 further includes an access request unit 951, a system call table 955, a shared file access processing unit 960, and a communication (COMM) unit 130. Each access requesting client 950 and the file management server 970 can communicate through the communication path 111 by means of the respective communication (COMM) units 130 and 131.

In this tenth embodiment, the access request unit 951 is assumed to be the already existing application program, and the access request issued from the access request unit 951 is to be executed by the system call provided by the operating system.

In this tenth embodiment, the access request unit 951 refers to the functions corresponding to the system calls listed in the system call table 955, and executes one of open/close/read/write functions. The data in the system call table 955 which refer to the functions of the system calls in the operating system are rewritten from the connection data (address pointers) to open function/close function/read function/write function provided by the operating system into the connection data (address pointers) to shared open function/shared close function/shared read function/shared write function which are provided by the shared file access processing unit 960. These shared open function/shared close function/shared read function/shared write function 961 are then transmitted through the communication (COMM) unit 130 to the file management server 970.

Therefore, when the access request unit 951 comprising the already existing application program executes the open function/close function/read function/write function, actually the shared open function/shared close function/shared read function/shared write function 961 are going to be executed.

Here, the shared open function/shared close function/shared read function/shared write function 961 actually correspond to the processing according to the shared file access request for carrying out "open", the processing according to the shared file access request for carrying out "close", the processing according to the shared file access request for carrying out "read", and the processing according to the shared file access request for carrying out "write", respectively. It is to be noted that, in FIG. 42, the shared open function/shared close function/shared read function/shared write function 961 are provided separately, but the processing common to all these functions 961 may be provided as one process and shared by these four functions.

The file management server 970 receives the shared open function/shared close function/shared read function/shared write function 961 from the access requesting client 950, and hand them to the record management unit 972. Then, the record management unit 972 can carry out the reading or the writing of the desired data from the data memory unit 973 according to the information of the access information memory unit 971. Then, the executed access request is recorded as data in the access information memory unit 971.

FIG. 43 shows an example of the access record list 980 in the access information memory unit 971. This access record list 980 is a list for storing the access requests to the files of the file management server 970. This access record list 980 has six fields for a file ID 981, a mode 982, an open time 983, a close time 984, a version 985, and a current 986.

The file ID 981 is an identifier uniquely assigned to each shared file access request for "open" given from the access request unit 951 to the record management unit 972. After the "open" request, the shared file access requests from the access request unit 951 are managed by using the file ID 981. This file ID 981 is issued to the access request unit 951 whenever the shared file access request for "open" is received by the record management unit 972.

The mode 982 indicates a mode of the open request to this file, where "r" indicates that it is read only mode, and "w" indicates that it is either write only mode or read and write mode.

The open time 983 indicates a time at which the open request to this file was issued. In this example, the file represented as ID1 is indicated as opened at a time t1. Also, the close time 984 indicates a time at which the close request to this file was issued. In this example, the file represented as ID1 is indicated as still open as the close time 984 is not entered, whereas the file represented as ID2 is indicated as closed at a time t5.

Here, the time is used to indicate the timing relationship among the occurrence times of various events, and may be given by an internal clock of a computer, or the version number used for the file management may be utilized as the time. Also, this time is used only by the record management unit 972, so that there is no need for the other element such as the access requesting client 950 to be able to refer to this time directly.

The version 985 indicates the version of the file from which the open request to this file has been issued. Usually, the system call "open" is a request with respect to the latest version, so that this version 985 is usually given by the latest version at a time of issuance of the open request.

The current 986 is a value (seek pointer) which indicates the currently accessed position, for the currently accessing access request. This seek pointer indicates the read out position (relative position within the file) to the shared file access request for "read" which comes next. In a case of the "open" in the read only mode, the initial value is set to be 0 as a default. The record management unit 972 manages the asynchronous accesses from the access requesting clients 950, and carries out the read and the write of the desired data with respect to the data memory unit 973 according to the contents of the access information memory unit 971. Here, the operation of the record management unit 972 itself is similar to that in the previous embodiments described above, so that its explanation will be omitted.

According to this tenth embodiment described above, the already existing application software program can be utilized as the access requesting client for carrying out the asynchronous editing in this system, without requiring any change at all in the program itself, by simply rewriting the values of the address pointers in the system call table 955 provided by the operating system.

Next, the eleventh embodiment of a shared file editing system according to the present invention will be described in detail. This eleventh embodiment is a modification of the tenth embodiment described above, which is aiming at the same purpose as the tenth embodiment.

Figure 44:
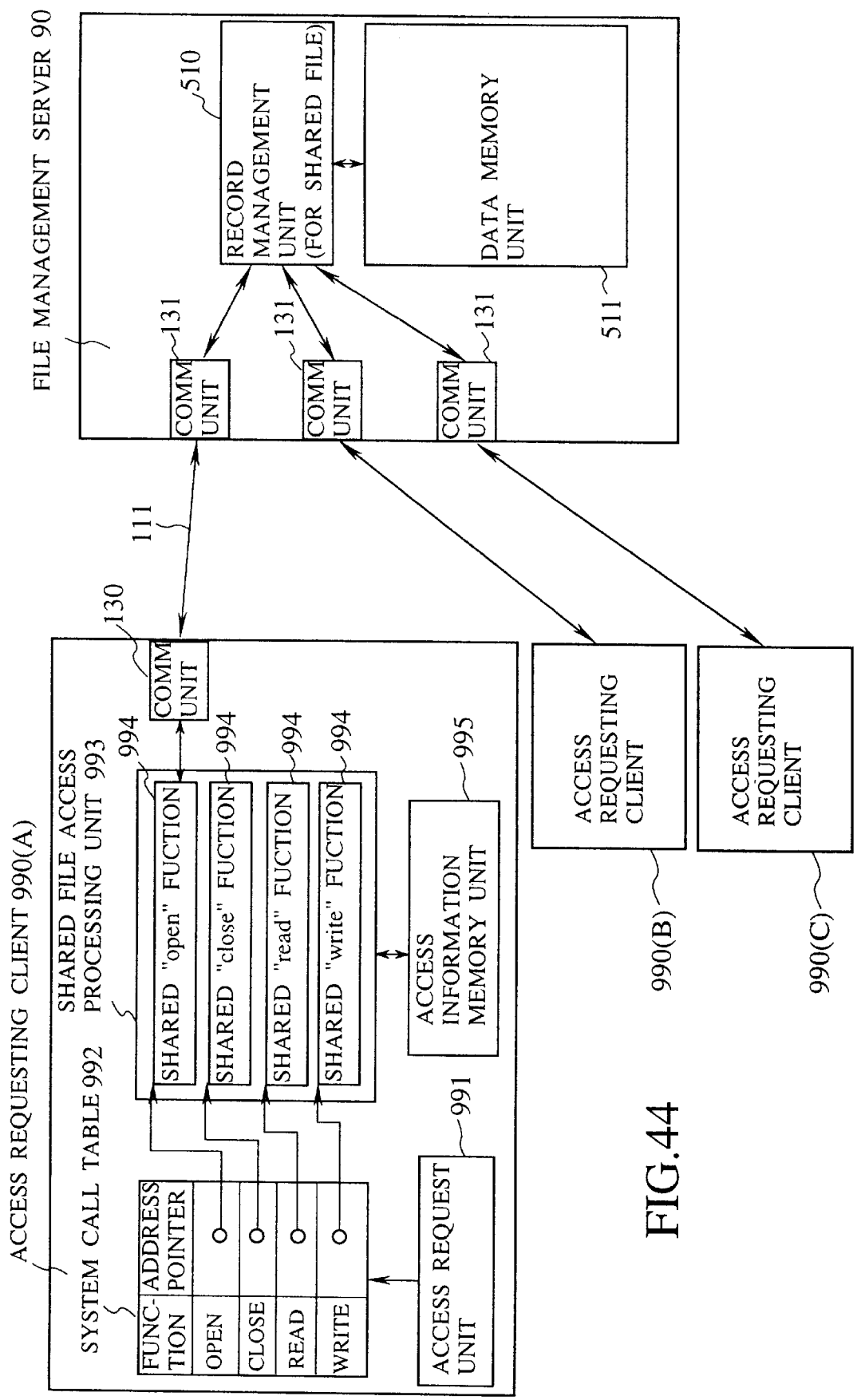
FIG. 44 is a block diagram of the eleventh embodiment of a shared file editing system according to the present invention.

FIG. 44 shows a configuration of the shared file editing system of this eleventh embodiment, which differs from the configuration of FIG. 42 in that the access information memory unit 971 provided in the file management server 970 in FIG. 42 is now provided as the access information memory unit 995 in the access requesting client 990 in FIG. 44. In this case, the file management server 90 including the record management unit 510, the data memory unit 511, and the communication (COMM) unit 131 is substantially similar to that in the configuration of FIG. 13 described above.

In this eleventh embodiment, the access requesting client 990 stores the shared file access information from its own access request unit 991 into the access information memory unit 995. The content of the access information memory unit 995 can be similar to that shown in FIG. 43 described above, for example.

The shared file access processing unit 993 reads out the information in the access information memory unit 995, and transmits the request to the file management server 90 by adding necessary information to the shared open function/ shared close function/shared read function/shared write function 994 as the arguments of the respective functions.

For example, when the read system call for reading 10 bytes from the file with the file ID of ID1 is issued from the access request unit 991, the shared file access processing unit 993 reads out the version information 985 and the current position information 986 concerning the file ID of ID1 from the access information memory unit 995, and adds these informations along with the file ID of ID1 and the number of bytes to be read out to the argument of the shared open function, and then transmits it tot he file management server 90.

The request transmitted from the access requesting client 990 to the file management server 90 contains the current access information of the access requesting client in addition to the usual information given by the system call of the operating system, so that the record management unit 510 can take out the desired data from the data memory unit 511 according to that information.

As described, even in this eleventh embodiment, the already existing application software program can be utilized as the access requesting client for carrying out the asynchronous editing in this system, without requiring any change at all in the program itself, by simply rewriting the values of the address pointers in the system call table 992 provided by the operating system.

It is to be noted that the feature for enabling the use of the already existing application program with respect to the shared files according to the tenth and eleventh embodiments may be utilized as a feature for enabling the use of the already existing application program with respect to the enciphered files, by replacing the access functions for the shared files in the above description by the access functions for the enciphered files, in the file editing system with the file content secrecy feature alone such as that of FIG. 23 described above.

It is also to be noted that, in the various embodiments described above, the communication through a communication path between communication units provided on the client and the server may be realized in a form of a network communication between the client computer device and the server computer device, or in a form of a data transfer between the client program and the server program within a single computer device.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A file editing system, comprising:
   a file management server device for managing files, each file containing a plurality of block data and block identification information for each block data; and
   at least one client device, which makes an access to the file management server device to obtain the block data corresponding to a desired version of a desired file managed by the file management server device, the client device including:
   deciphering means for deciphering the block data obtained from the file management server device, by using a prescribed decipher key;
   editing means for editing the desired version of the desired file formed by the block data deciphered by the deciphering means;
   editing procedure generation means for generating editing procedure data indicating a procedure to obtain an editing made in the desired version of the desired file by the editing means and including insertion data to be inserted into the desired file;
   enciphering means for enciphering the insertion data included in the editing procedure data generated by the editing procedure generation means, by using a prescribed cipher key, to obtain enciphered editing procedure data; and
   communication means for transmitting the enciphered editing procedure data obtained by the enciphering means to the file management server device;
   wherein the file management server device includes:
   editing procedure conversion means for converting the enciphered editing procedure data for the desired version of the desired file received from the client device into enciphered editing procedure data for a latest version of the desired file:
   record management information generation means for generating record management information indicating a result of the editing made by the editing means, according to the enciphered editing procedure data for the latest version of the desired file obtained by the editing procedure conversion means; and record management means for carrying out a record management of the desired file according to the record management information obtained by the record management information generation means and the block identification Information for each block data.

2. The system of claim 1, wherein the record management means uses record data indicating a relationship between the desired version and the latest version in carrying out the record management of the desired file, and the editing procedure conversion means generates the converted enciphered editing procedure data for the latest version of the desired file by referring to said relationship between the desired version and the latest version indicated by the record data.

3. The system of claim 1, wherein the file management server device has a file managing means for managing each file in a form of a first block data in which an originally created file content is enciphered, a subsequent block data in which difference between a file content before each editing and a file content after each editing is enciphered, and the block identification information attached to each block data which identifies each block data.

4. The system of claim 1, wherein the file management server device has file managing means for managing each file in a form of a latest block data in which a latest edited file content is enciphered, a previous block data in which difference between a file content before each editing and a file content after each editing is enciphered, and the block identification information attached to each block data which identifies each block data.

5. The system of claim 1, wherein the file management server device has file managing means for managing each file in a form of insertion block data in which each content inserted into each file is respectively enciphered, deletion block data in which each content deleted from each file is respectively enciphered, and the block identification information attached to each block data which identifies a creation time and a deletion time of each block data.

6. The system of claim 5, wherein the file management server device has file managing means for managing each block data in a state of being enciphered in units of blocks by an 8 bit CFB mode type cipher scheme, and the enciphering means enciphers the insertion data by the 8 bit CFB mode type cipher scheme.

7. The system of claim 1, wherein the file management server device has file managing means for managing each block data in a state of having at least an insertion data portion of each block data enciphered by a stream cipher scheme, and the enciphering means enciphers the insertion data by the stream cipher scheme.

8. The system of claim 1, wherein the block identification information for the block data resulting from the editing made by the editing means is attached to the record management information in a course of one of record management information generation by the record management information generation means and the record management by the record management means.

9. A method of file editing in a file editing system formed by a file management server device and at least one client device, comprising the steps of:

managing files at a file management server device, each file containing a plurality of block data and block identification information for each block data;

making an access to the file management server device to obtain the block data corresponding to a desired version of a desired file managed by the file management server device, at the client device;

deciphering the block data obtained from the file management server device, by using a prescribed decipher key, at the client device;

editing the desired version of the desired file formed by the block data deciphered by the deciphering step, at the client device;

generating editing procedure data indicating a procedure to obtain an editing made in the desired version of the desired file by the editing step and including insertion data to be inserted into the desired file, at the client device;

enciphering the insertion data included in the editing procedure data generated by the editing procedure data generating step, by using a prescribed cipher key, to obtain enciphered editing procedure data at the client device;

transmitting the enciphered editing procedure data obtained by the enciphering step from the client device to the file management server device;

converting the enciphered editing procedure data for the desired version of the desired file received from the client device into enciphered editing procedure data for a latest version of the desired file, at the file management server device;

generating record management information indicating a result of the editing made by the editing step, according to the enciphered editing procedure data for the latest version of the desired file obtained by the converting step, at the file management server device; and carrying out a record management of the desired file at the file management server device, according to the record management information obtained by the record management information generating step and the block identification information for each block data.

10. A client device for accessing a server device which manages files, each file containing a plurality of block data and block identification information for each block data, whereby the client device obtains the block data corresponding to a desired version of a desired file managed by the server device, the client device comprising a deciphering unit for deciphering the block data obtained from the server device, by using a prescribed decipher key;

an editing unit for editing the desired version of the desired file formed by the block data deciphered by the deciphering unit;

an editing procedure generation unit for generating editing procedure data indicative of a procedure to obtain an editing made in the desired version of the desired file by the editing unit and including insertion data to be inserted into the desired file;

an enciphering unit for enciphering the insertion data included in the editing procedure data generated by the editing procedure generation unit, by using a prescribed cipher key, to obtain enciphered editing procedure data; and a communication unit for transmitting the enciphered editing procedure data obtained by the enciphering unit to the server device.

11. A method for accessing a server device which manages files, each file containing a plurality of block data and block identification information for each block data, the method comprising the steps of:

obtaining the block data corresponding to a desired version of a desired file managed by the server device;

deciphering the block data obtained from the server device, by using a prescribed decipher key;

editing the desired version of the desired file formed by the block data deciphered by the deciphering step;

generating editing procedure data indicative of a procedure to obtain an editing made in the desired version of the desired file by the editing step and including insertion data to be inserted into the desired file;

enciphering the insertion data included in the editing procedure data generated by the generating step, by using a prescribed cipher key, to obtain enciphered editing procedure data; and transmitting the enciphered editing procedure data, obtained by the enciphering step, to the server device.

12. A computer-implemented article of manufacture, comprising:

a computer usable medium having computer readable program code means embodied therein for causing a computer to function as a client device for accessing a server device which manages files, each file containing a plurality of block data and block identification information for each block data, whereby the client device obtains the block data corresponding to a desired version of a desired file managed by the server device, the computer readable program code means including:

a first computer readable program code that causes said computer to decipher the block data obtained from the server device, by using a prescribed decipher key;

a second computer readable program code that causes said computer to edit the desired version of the desired file formed by the block data deciphered by the first computer readable program code;

a third computer readable program code that causes said computer to generate editing procedure data indicative of a procedure to obtain an editing made in the desired version of the desired file by the second computer readable program code and including insertion data to be inserted into the desired file;

a fourth computer readable program code that causes said computer to encipher the insertion data included in the editing procedure data generated by the third computer readable program codes, by using a prescribed cipher key, to obtain enciphered editing procedure data; and a fifth computer readable program code that causes said computer to transmit the enciphered editing procedure data obtained by the fourth computer readable program code to the server device.

13. A server device for managing files, each file containing a plurality of block data and block identification information for each block data, wherein a client device accesses the server device to obtain the block data corresponding to a desired version of a desired file managed by the server device, the server device comprising:

an editing procedure conversion unit that converts enciphered editing procedure data for the desired version of the desired file received from the client device into enciphered editing procedure data for a latest version of the desired file, the enciphered editing procedure data being indicative of a procedure to obtain an editing made in the desired version of the desired file by the client device and including insertion data to be inserted into the desired file where the insertion data are enciphered by using a prescribed cipher key;

a record management information generation unit that generates record management information indicative of a result of the editing made by the client device, according to the enciphered editing procedure data for the latest version of the desired file obtained by the editing procedure conversion unit; and a record management unit that carries out a record management of the desired file according to the record management information generated by the record management information generation unit and the block identification information for each block data.

14. A method for managing files at a server device, each file containing a plurality of block data and block identification information for each block data, wherein a client device accesses the server device to obtain the block data corresponding to a desired version of a desired file managed by the server device, the method comprising the steps of:

converting enciphered editing procedure data for the desired version of the desired file, received from the client device, into enciphered editing procedure data for a latest version of the desired file, the enciphered editing procedure data being indicative of a procedure to obtain an editing made in the desired version of the desired file by the client device and including insertion data to be inserted into the desired file where the insertion data are enciphered by using a prescribed cipher key;

generating record management information indicative of a result of the editing made by the client device, according to the enciphered editing procedure data for the latest version of the desired file obtained by the converting step; and carrying out a record management of the desired file according to the record management information generated by generating step and the block identification information for each block data.

15. A computer-implemented article of manufacture, comprising:

a computer usable medium having computer readable program code means embodied therein for causing a computer to function as a server device for managing files, each file containing a plurality of block data and block identification information for each block data, wherein a client device accesses the server device to obtain the block data corresponding to a desired version of a desired file managed by the server device, the computer readable program code means including:

a first computer readable program code that causes said computer to convert enciphered editing procedure data for the desired version of the desired file received from the client device into enciphered editing procedure data for a latest version of the desired file, the enciphered editing procedure data being indicative of a procedure to obtain an editing made in the desired version of the desired file by the client device and including insertion data to be inserted into the desired file where the insertion data are enciphered by using a prescribed cipher key;

a second computer readable program code that causes said computer to generate record management information indicative of a result of the editing made by the client device, according to the enciphered editing procedure data for the latest version of the desired file obtained by the first computer readable program code; and a third computer readable program code that causes said computer to carry out a record management of the desired file according to the record management information generated by the second computer readable program code and the block identification information for each block data.

* * * * *